Figure 1:
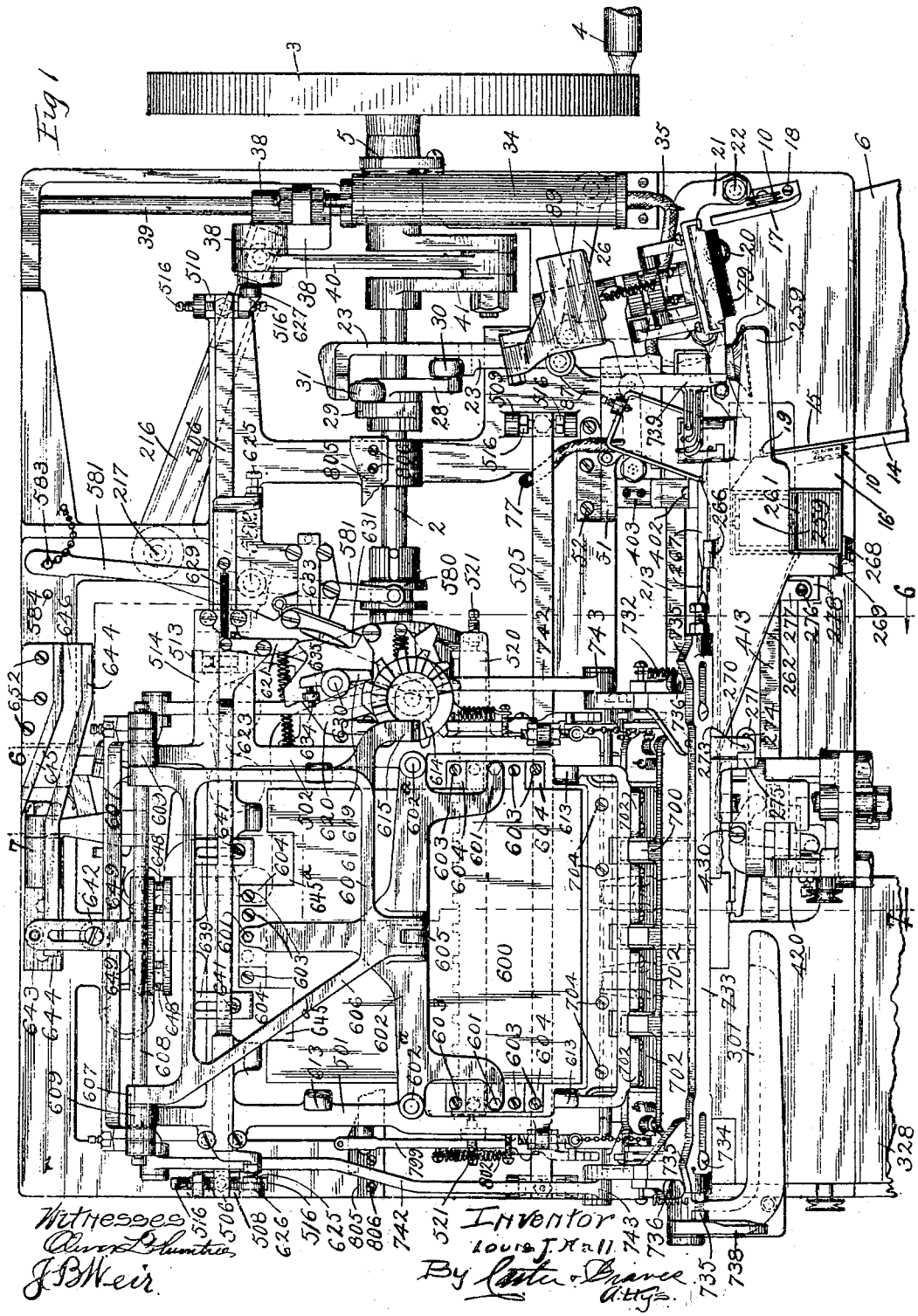

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.

27 SHEETS—SHEET 2.

Witnesses.

Inventor
Louis J. Hall
By, Atty's.

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 3.
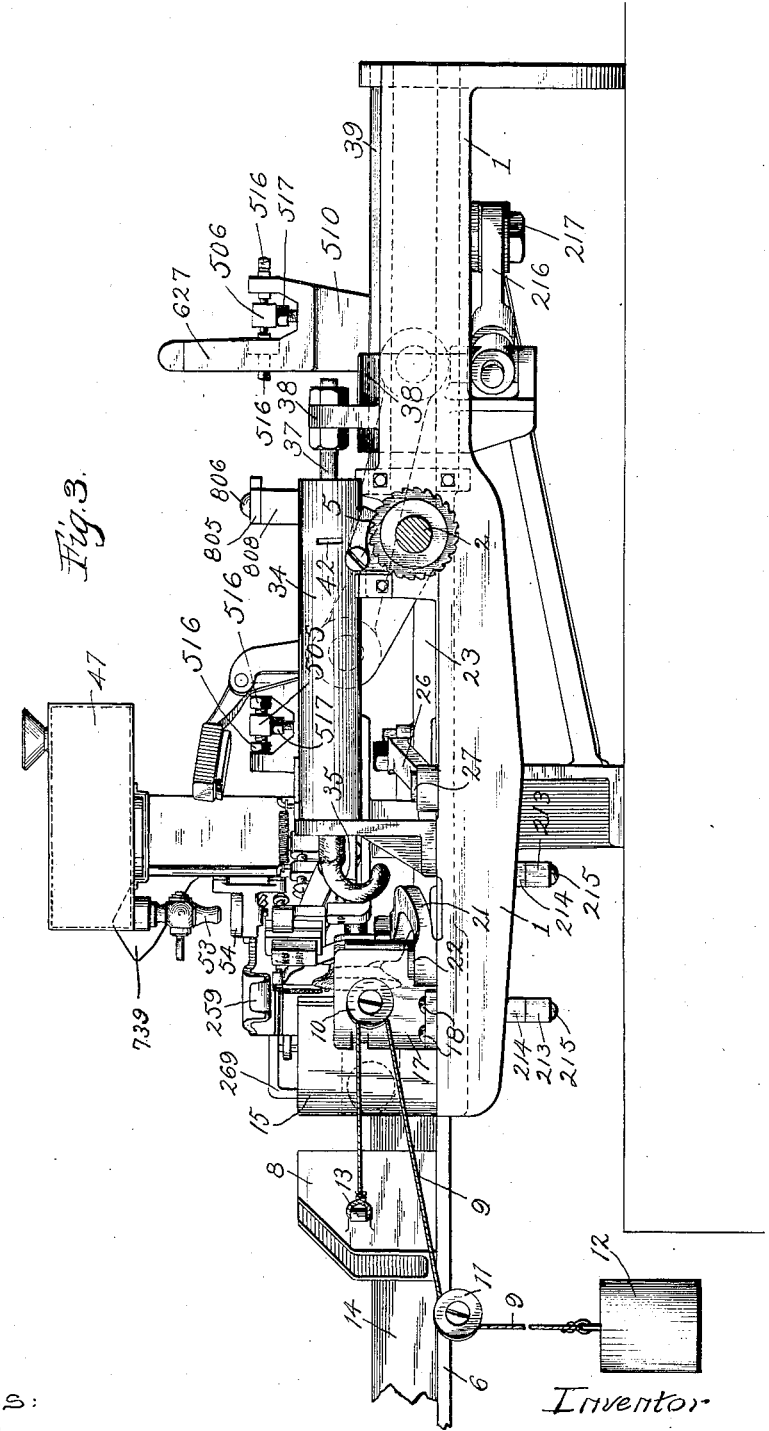
Witnesses:
Inventor
Louis J. Hall.
By
Att'ys.

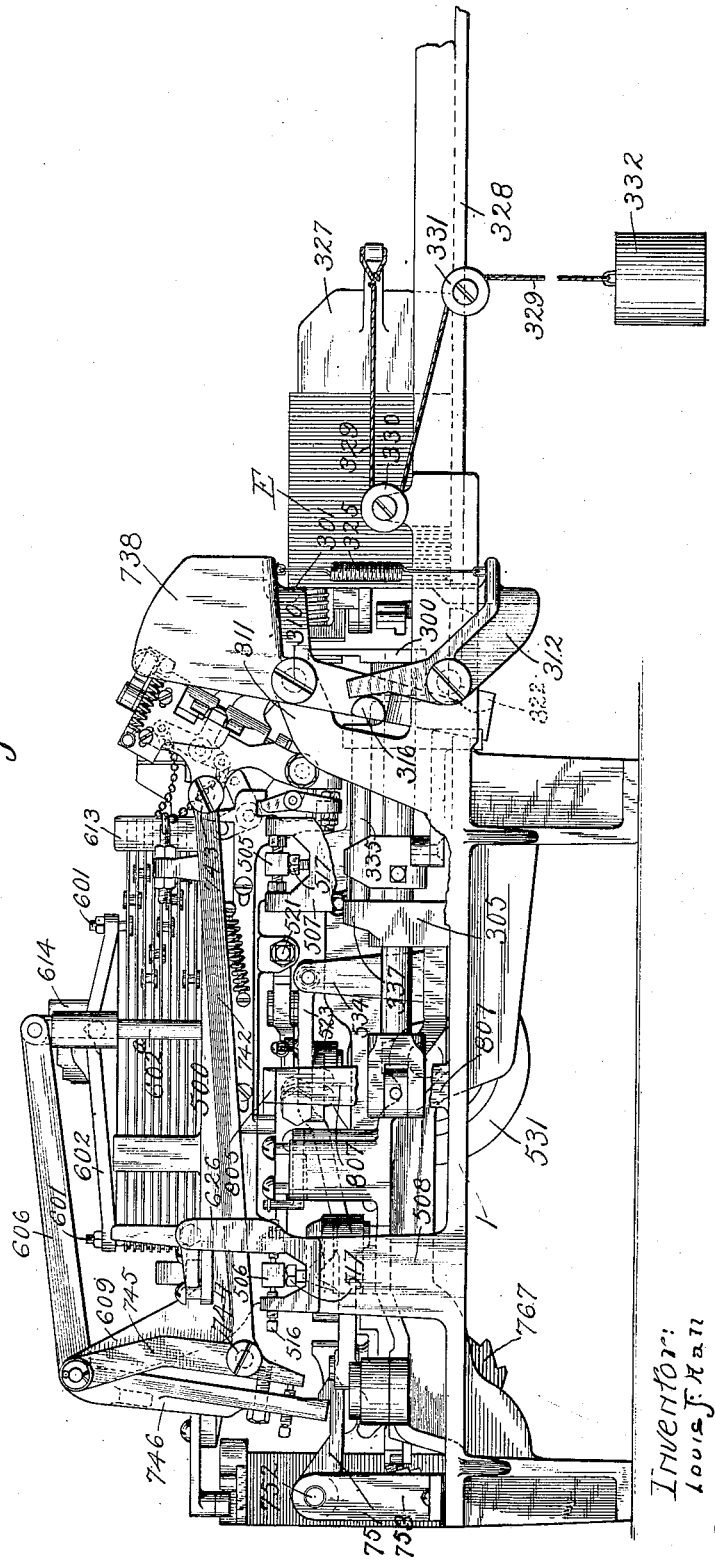

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 5.
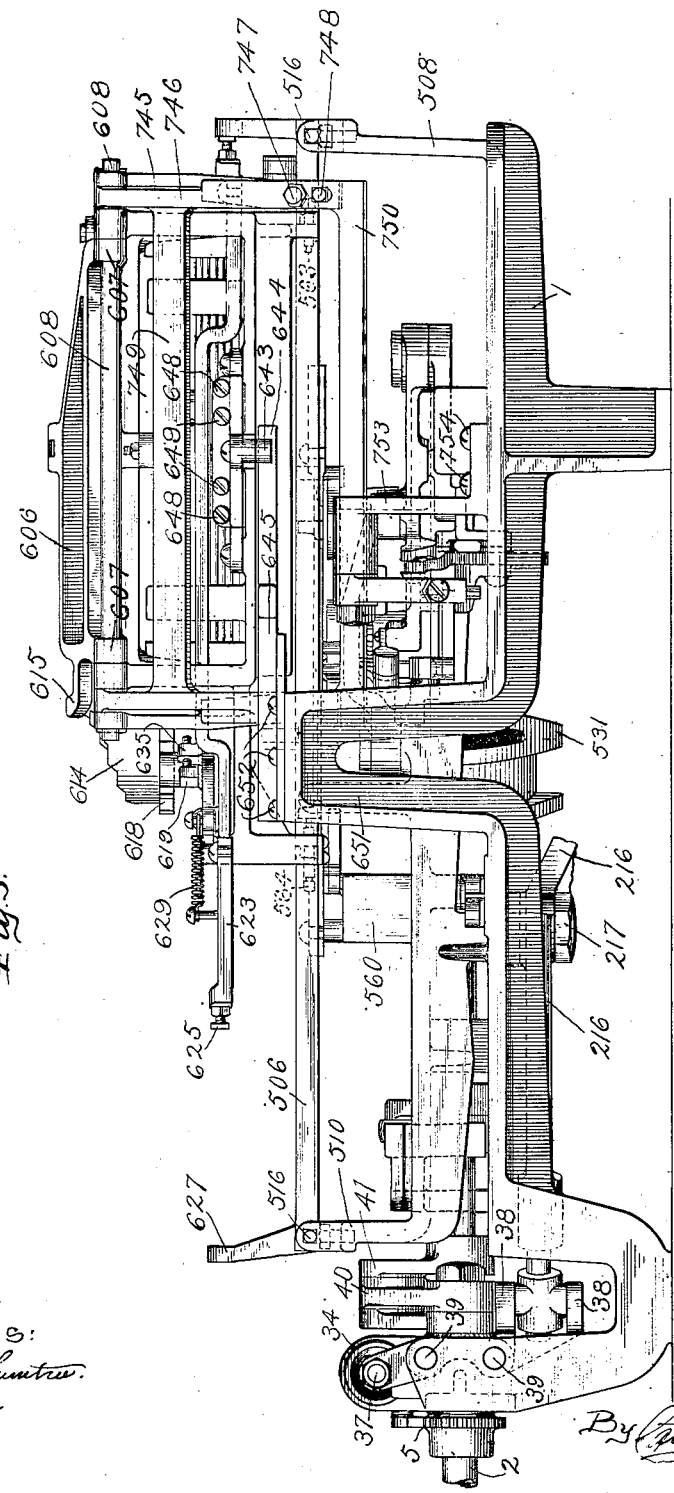

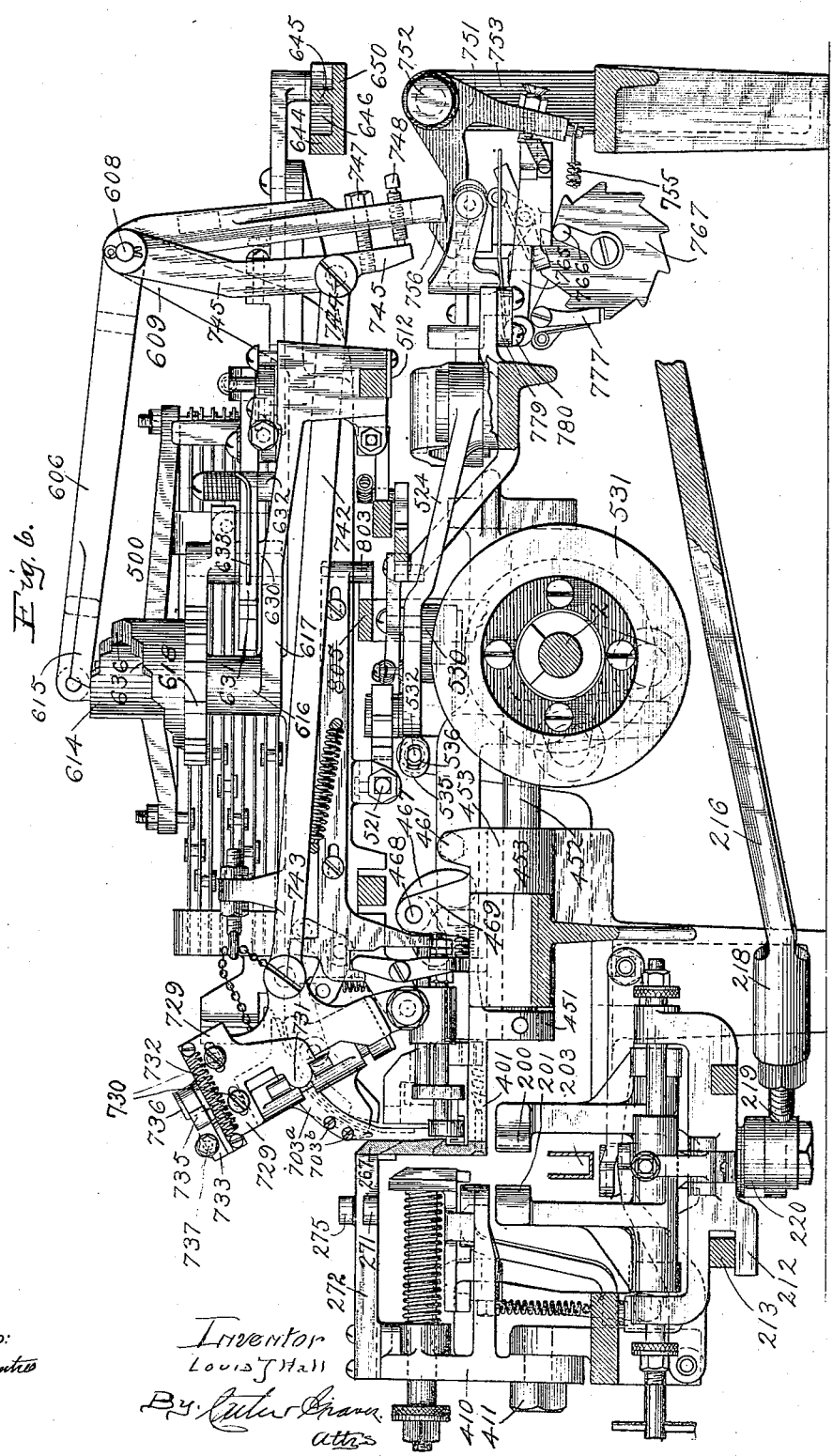

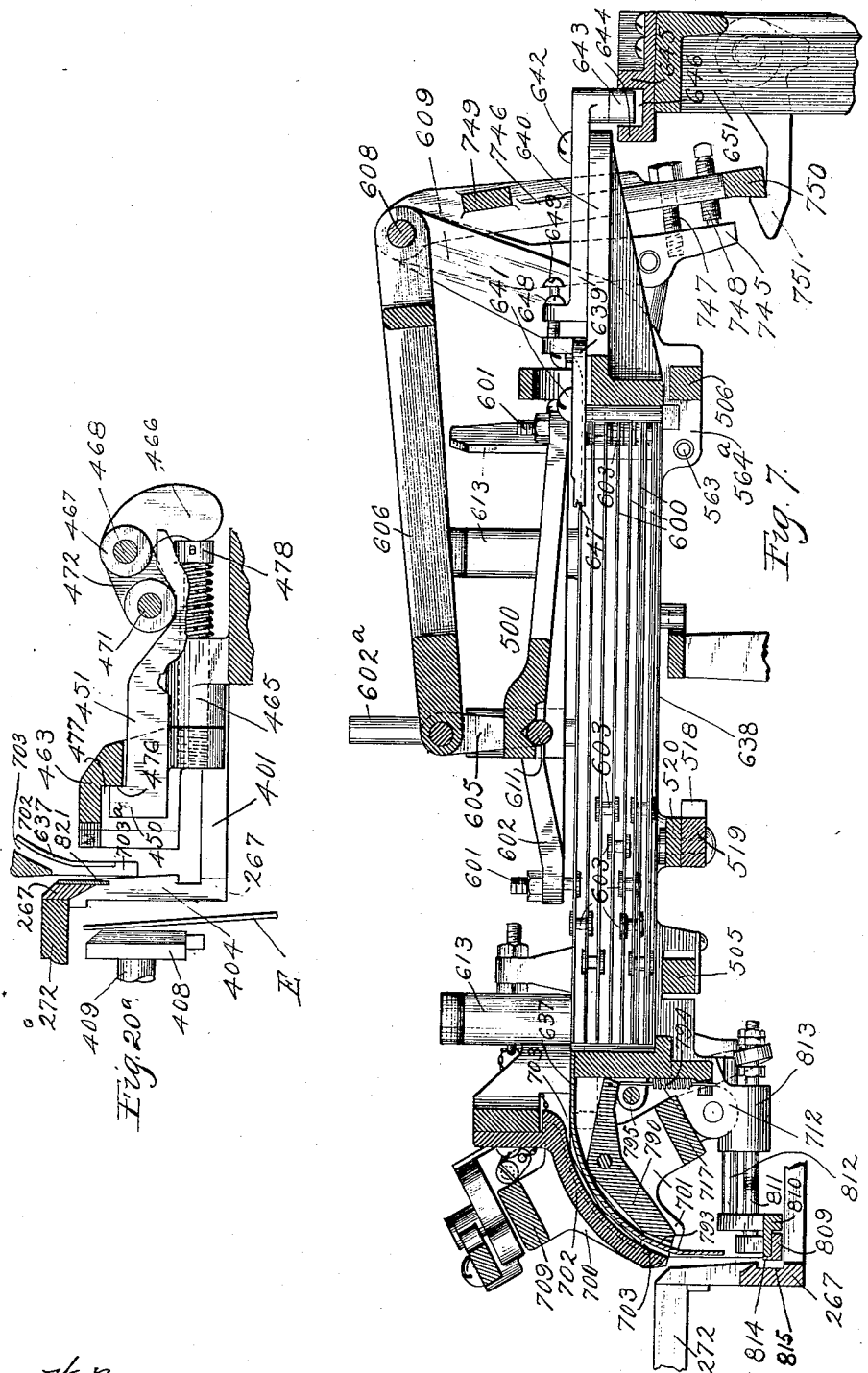

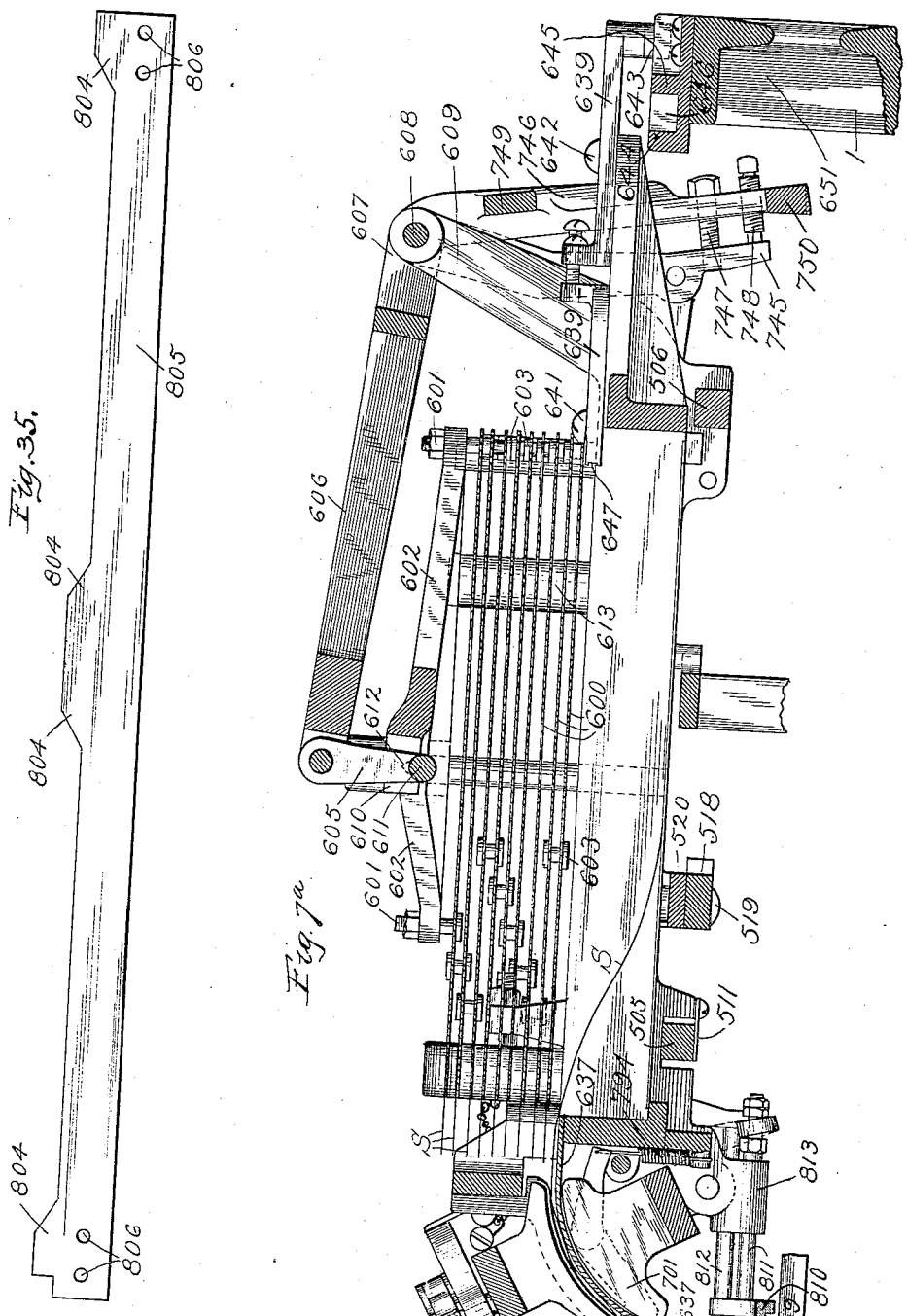

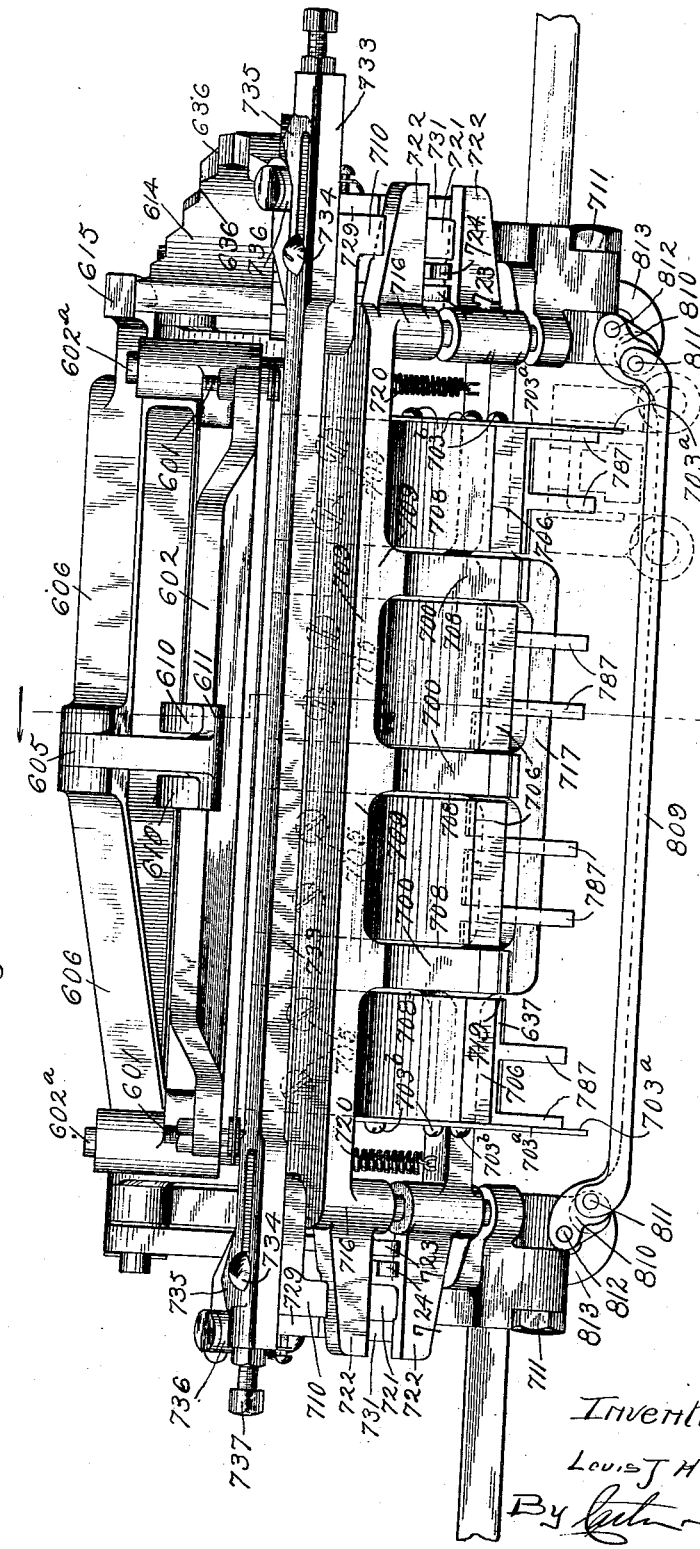

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 10.
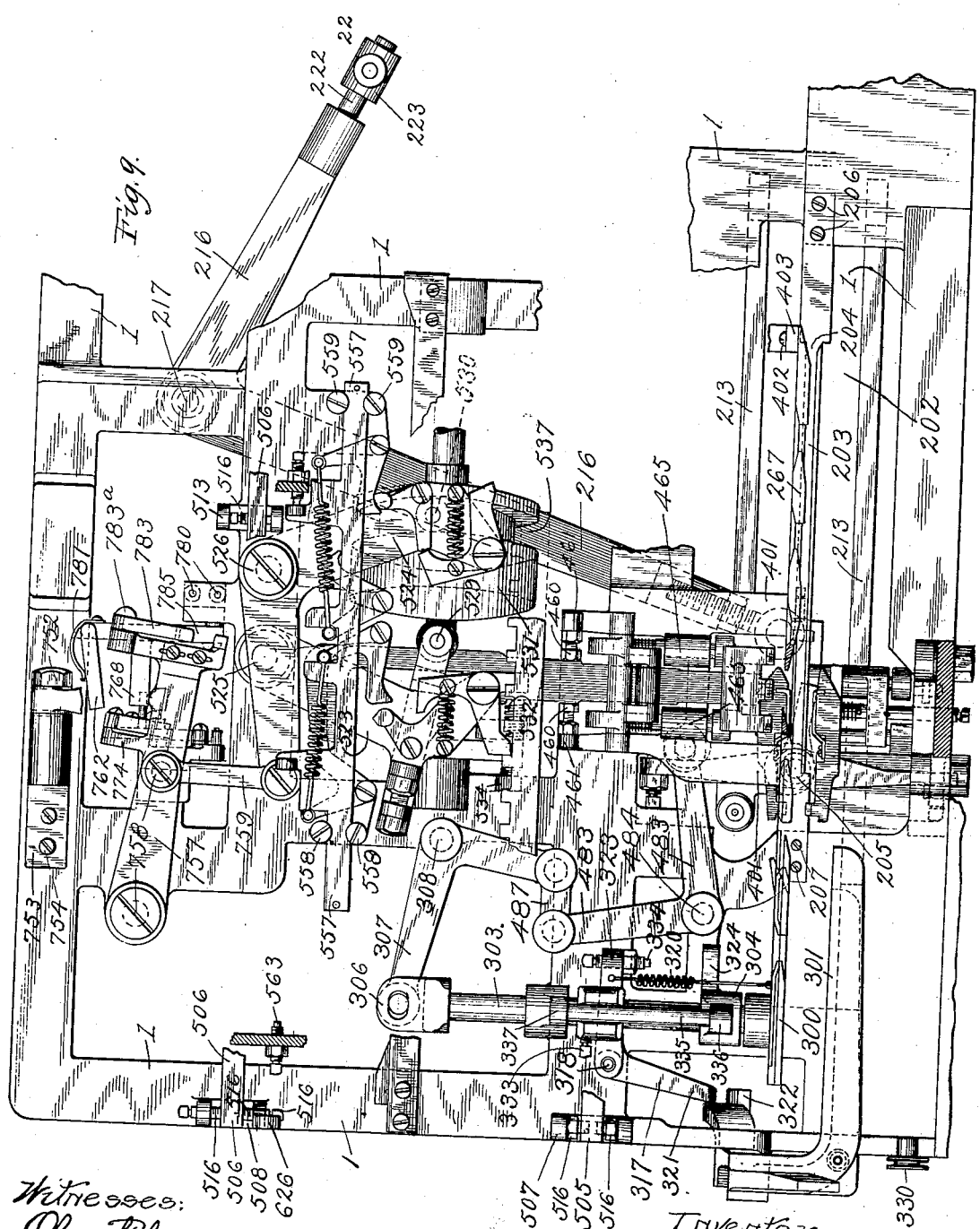

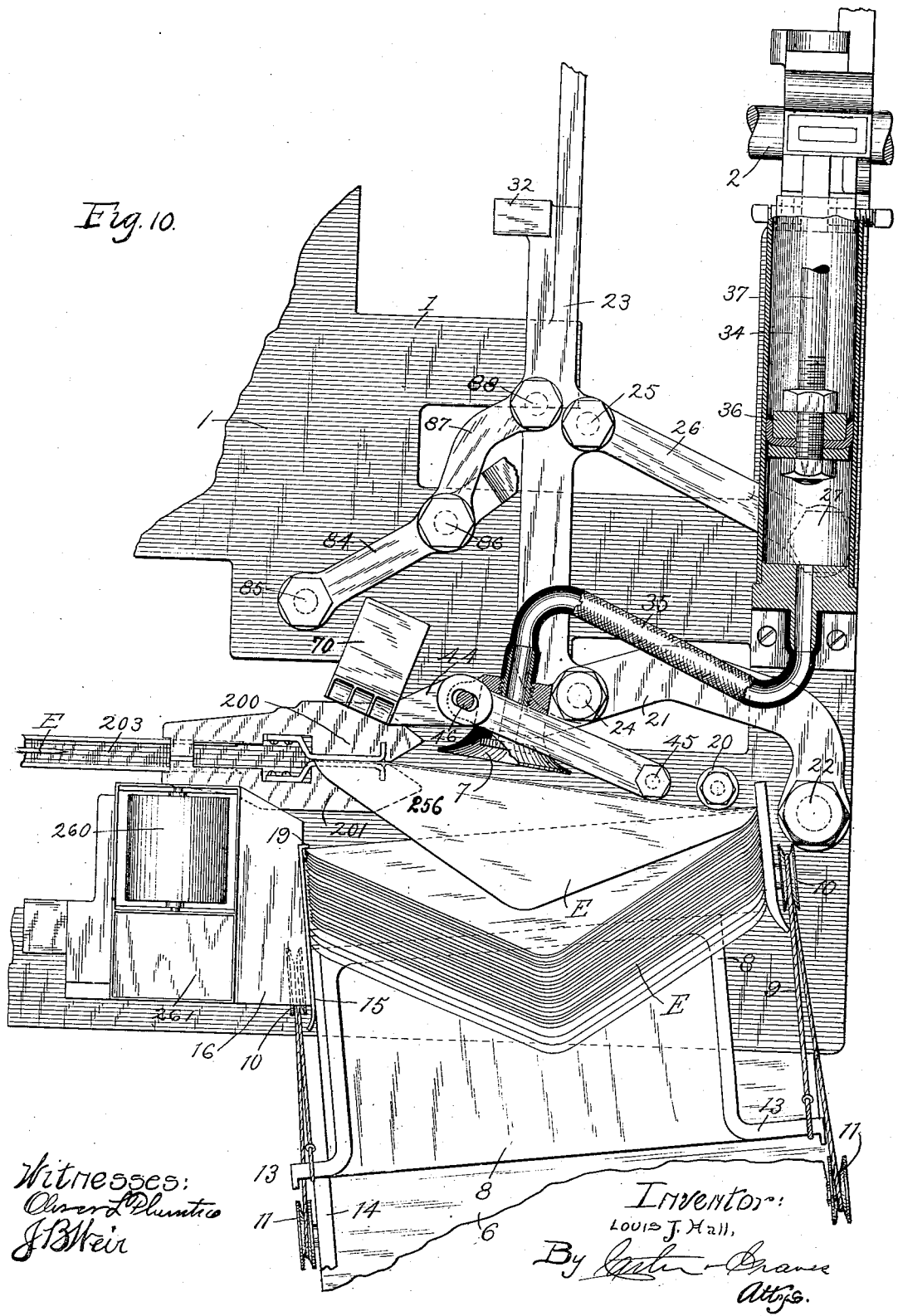

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 12.
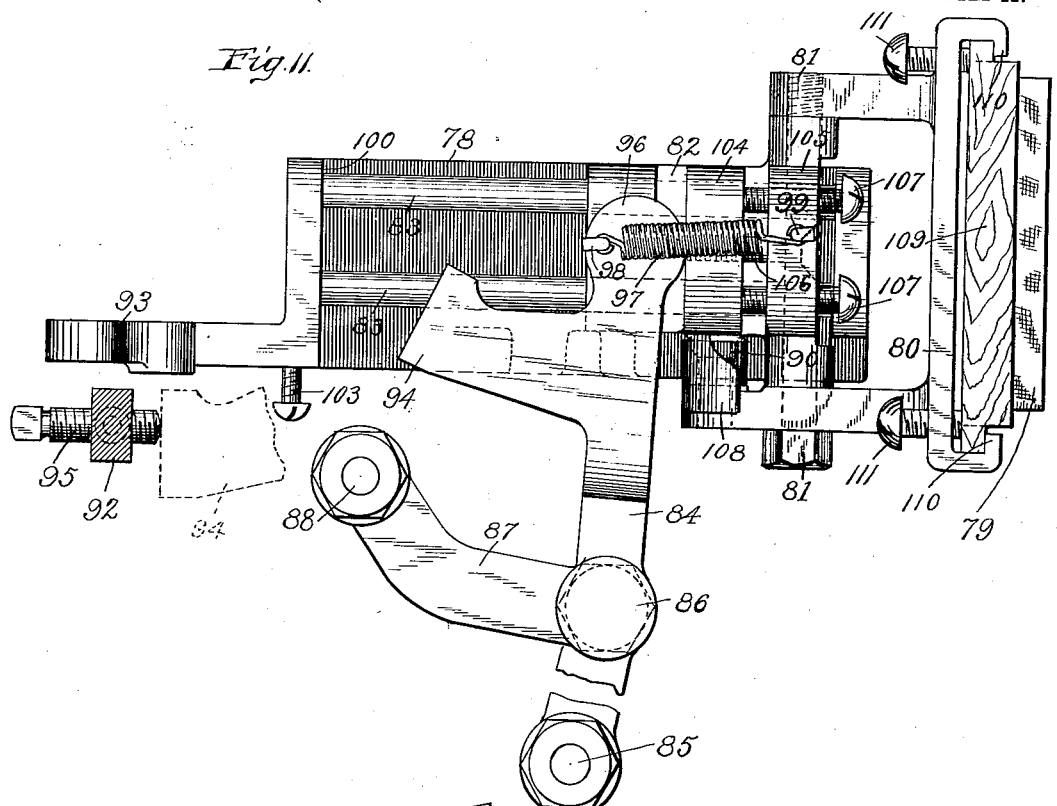
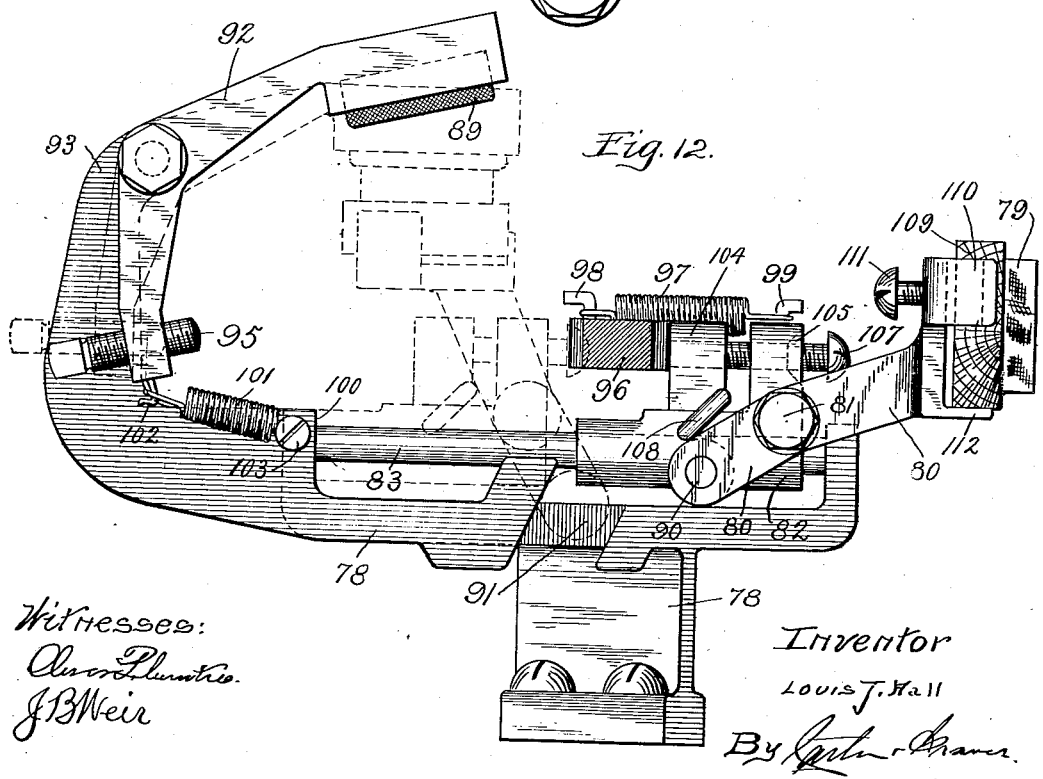
Witnesses:
Inventor
Louis J. Hall No. 870,359.  
PATENTED NOV. 5, 1907.  
L. J. HALL.  
MACHINE FOR STAMPING AND SEALING MAIL MATTER.  
APPLICATION FILED APR. 29, 1899. RENEWED JAN. 16, 1903.  
27 SHEETS—SHEET 13.
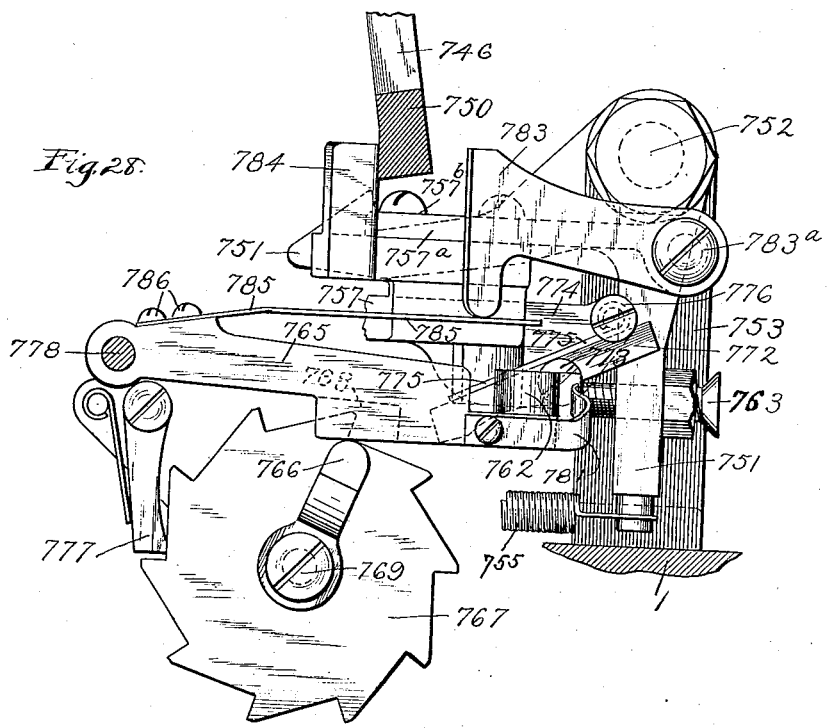
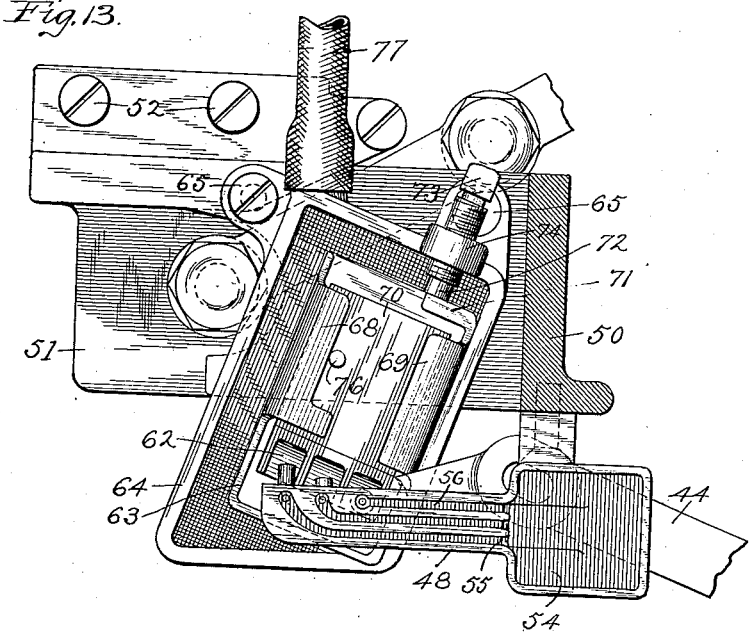
Witnesses:  
Inventor  
Louis J. Hall.

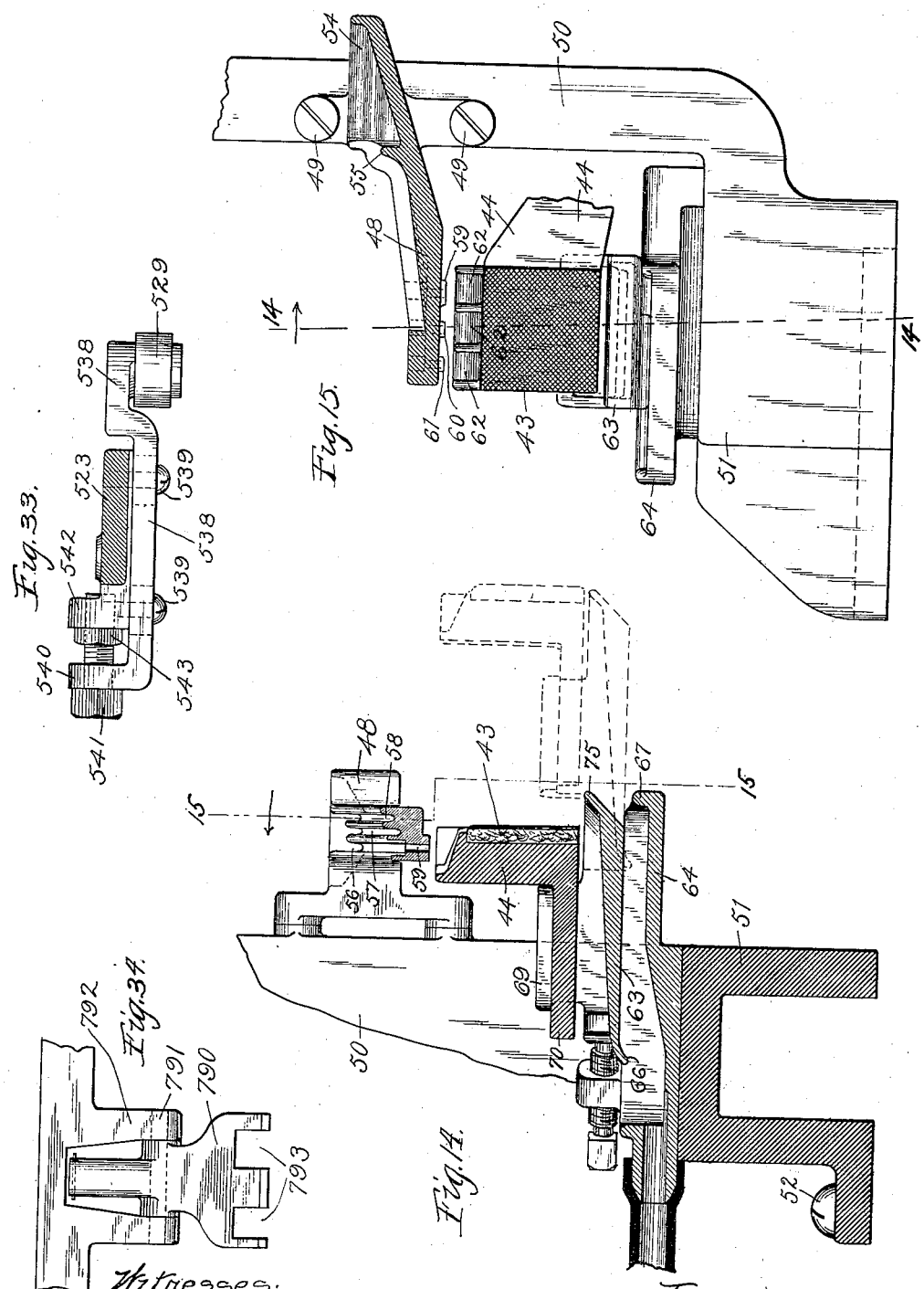

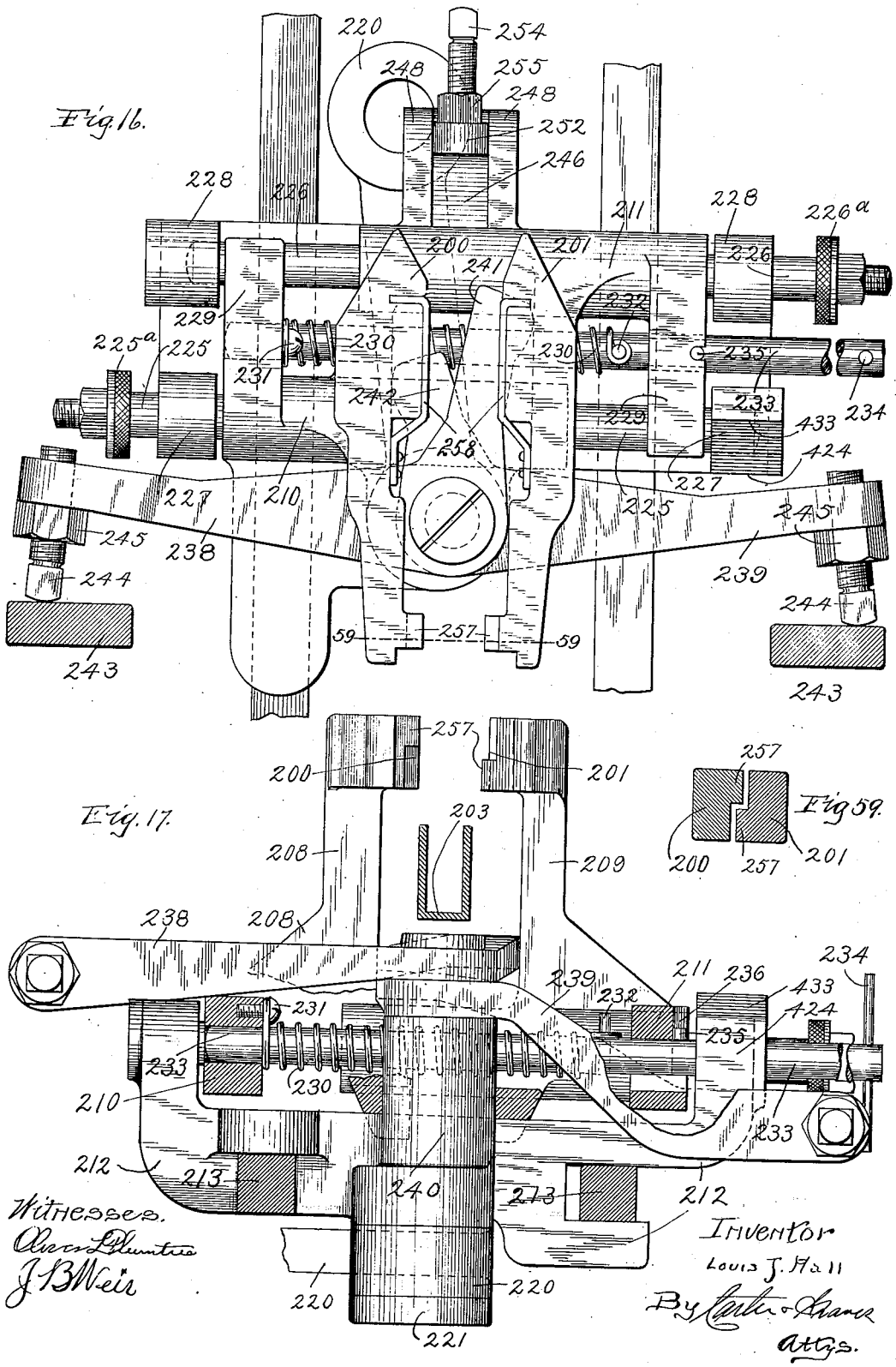

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 16.
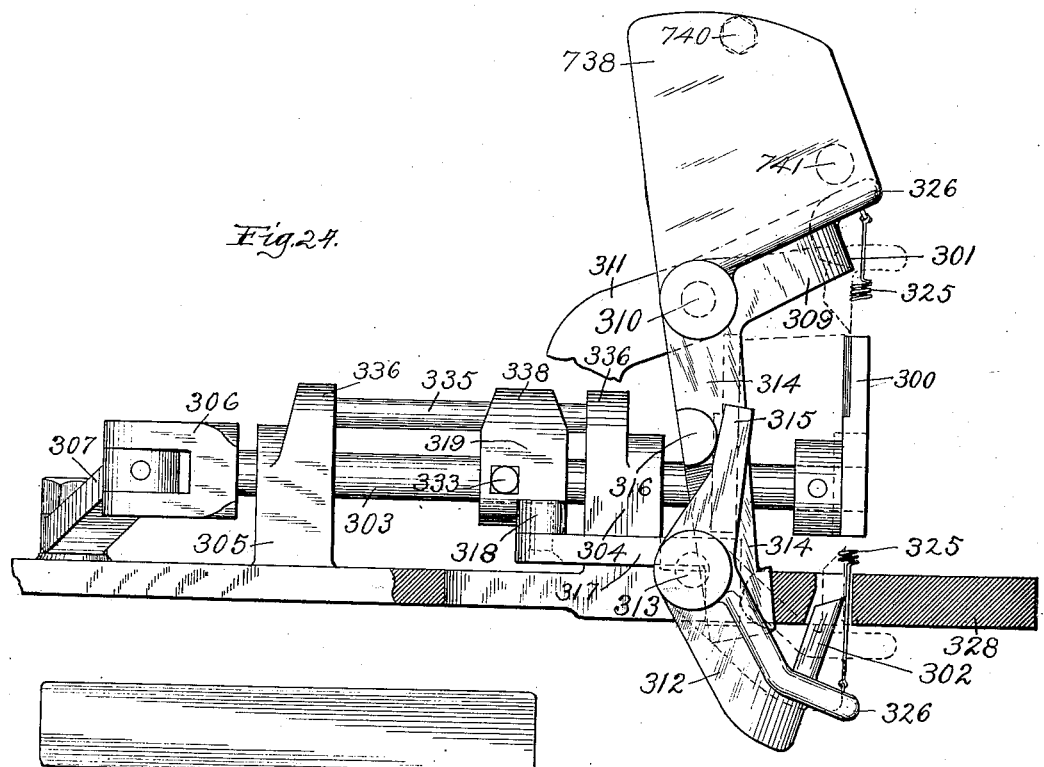
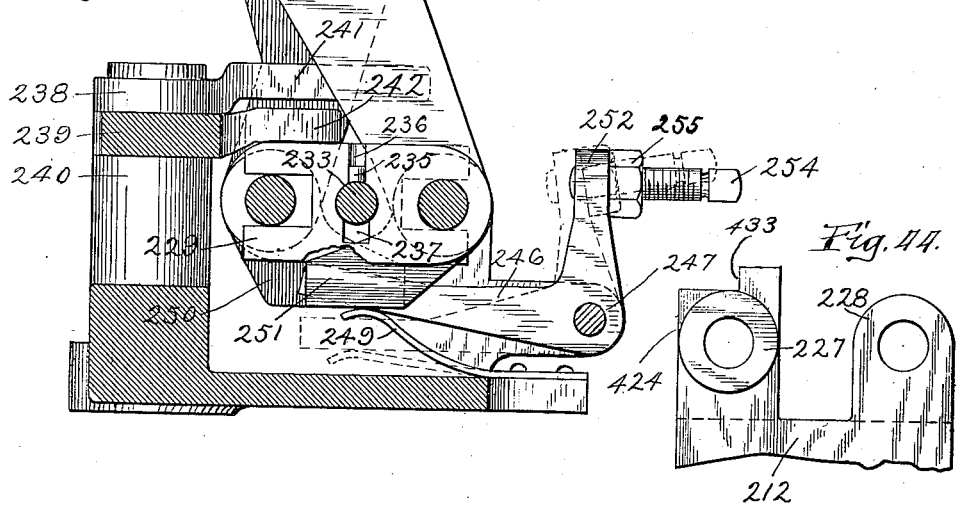
Witnesses:
Inventor
Louis J. Hall
By Carter & Graves
Atty's No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 17.
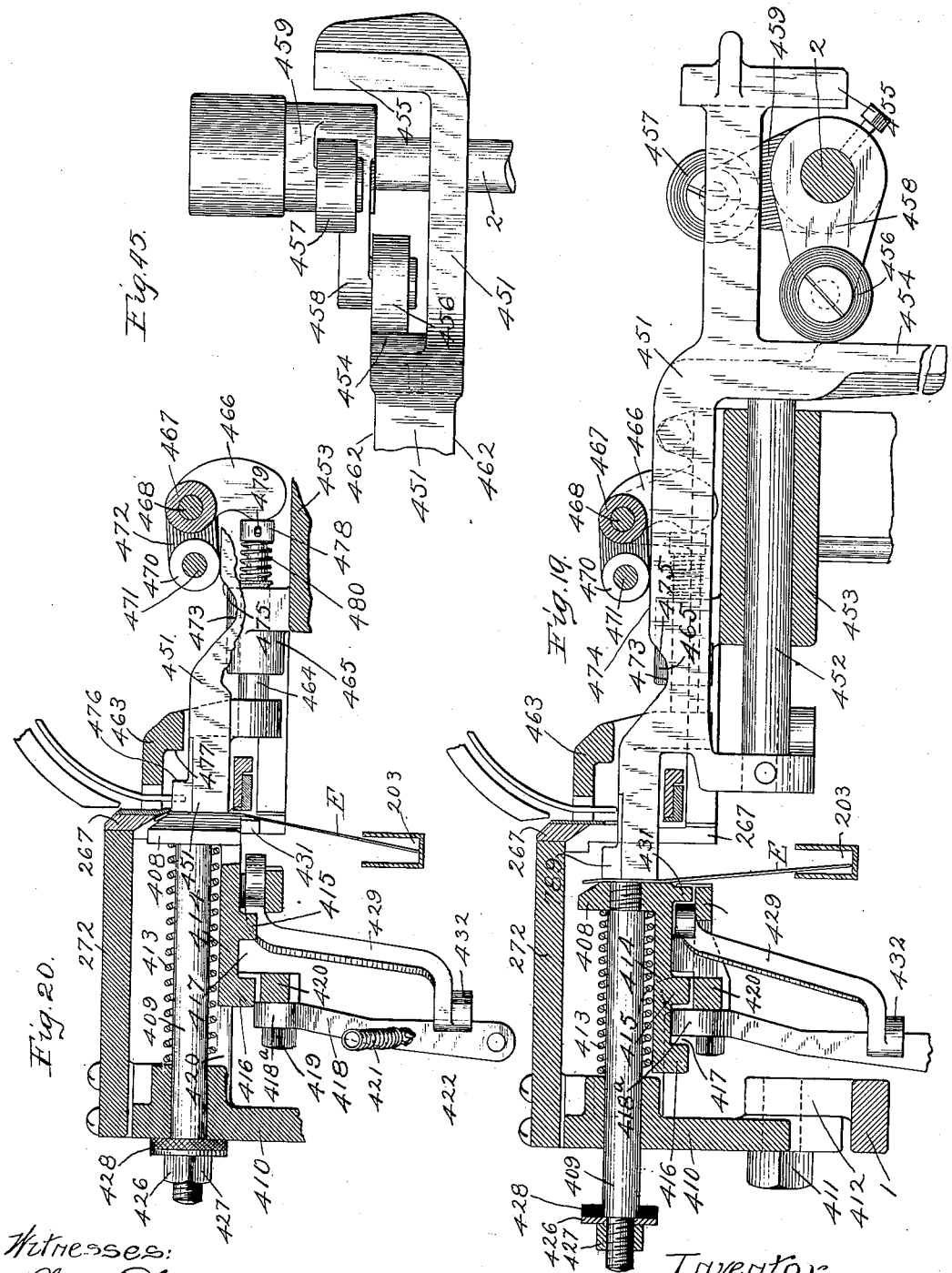
Witnesses:
Inventor
Louis J. Hall.
By Carter & Graves
Attys.

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 18.
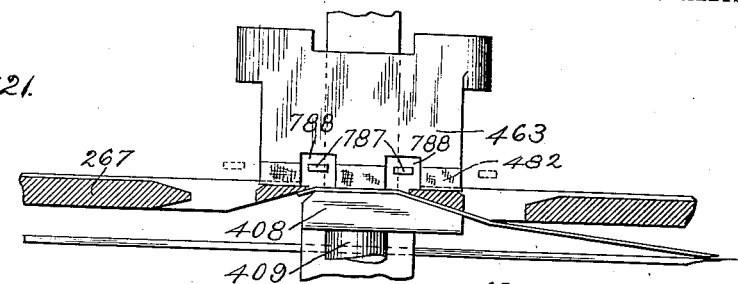
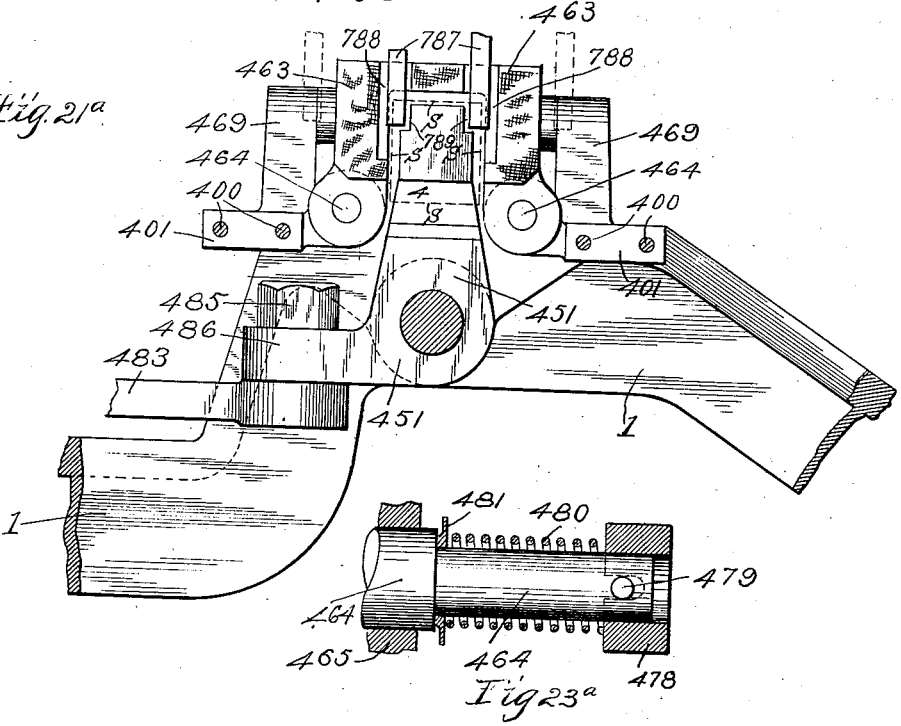
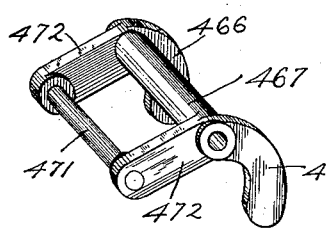
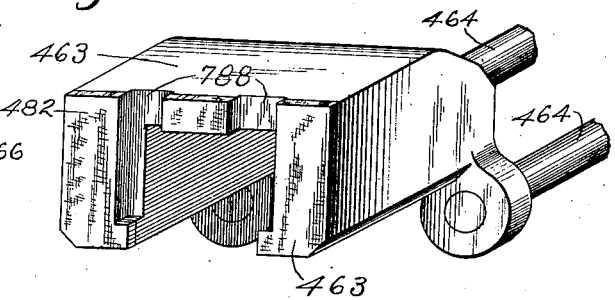

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 19.
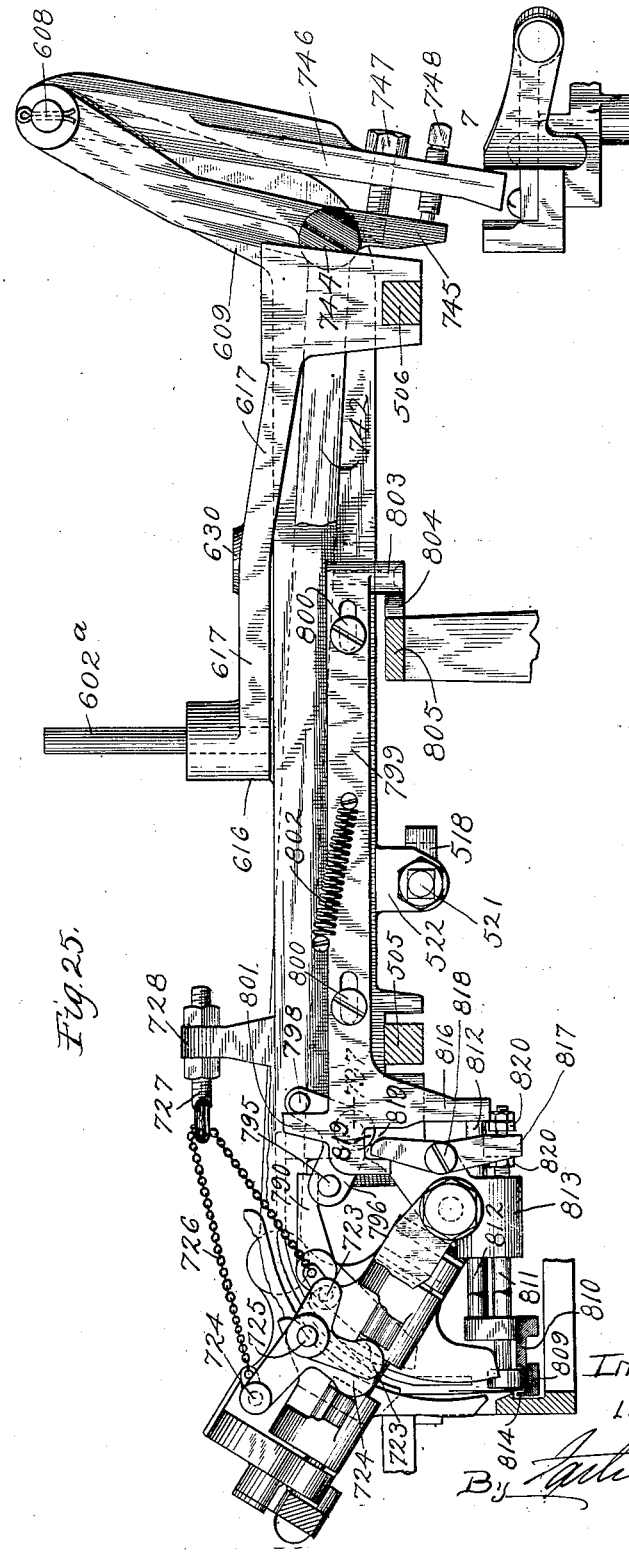

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.

27 SHEETS—SHEET 20.

Witnesses:

Inventor:
Louis J. Hall.

No. 870,359. PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 21.
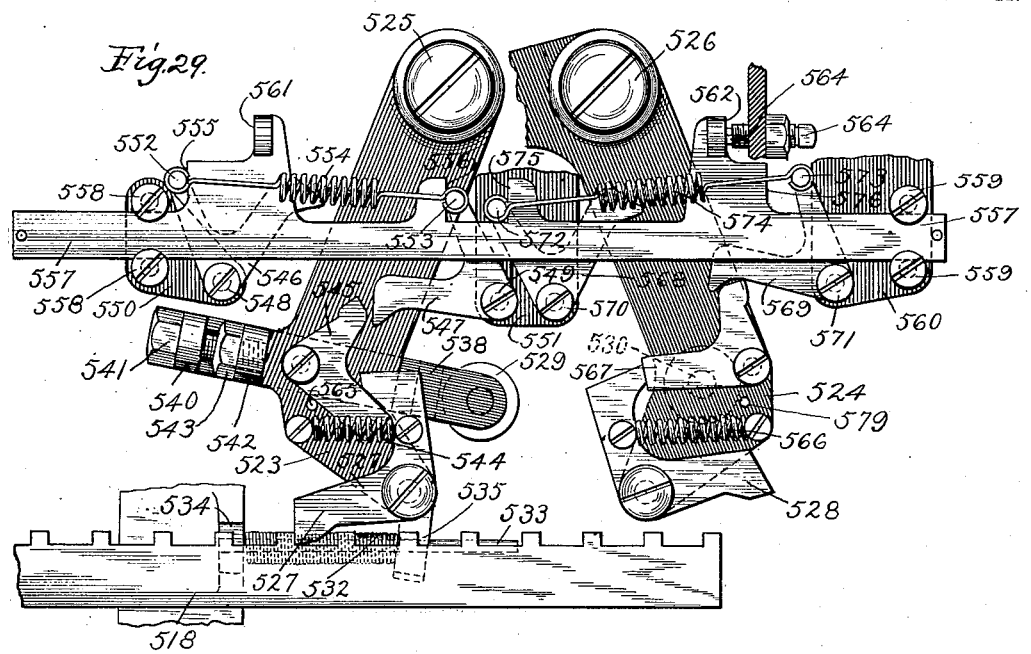
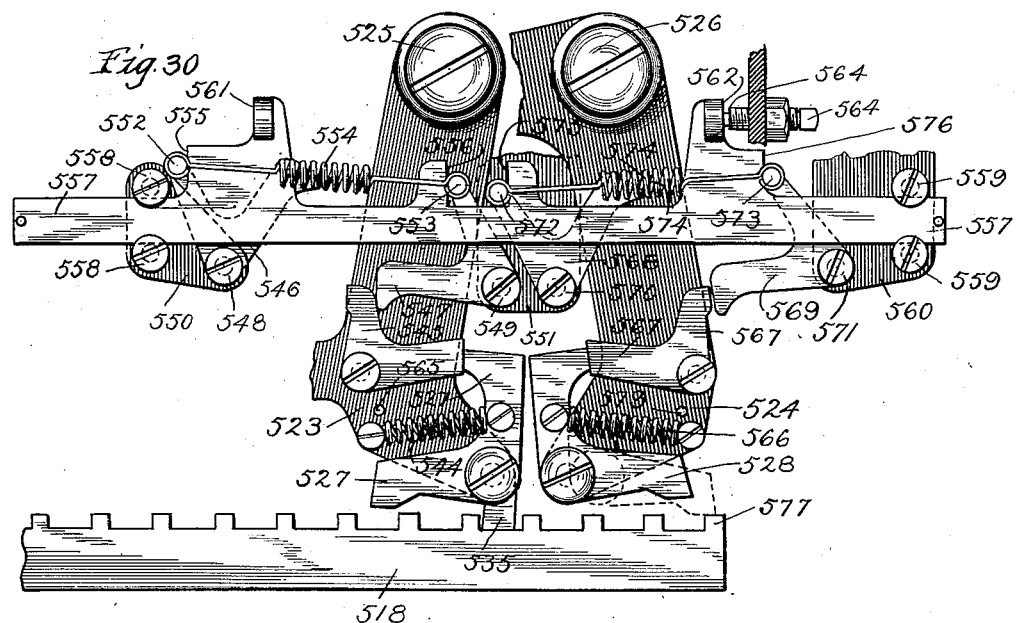
Witnesses:
Oliver L. Plumtree.
J. B. Weir
Inventor:
Louis J. Hall.
By Carter & Graves
Attys.

No. 870,359.  
L. J. HALL.  
PATENTED NOV. 5, 1907.
MACHINE FOR STAMPING AND SEALING MAIL MATTER.  
APPLICATION FILED APR. 29, 1899. RENEWED JAN. 16, 1903.
27 SHEETS—SHEET 22.
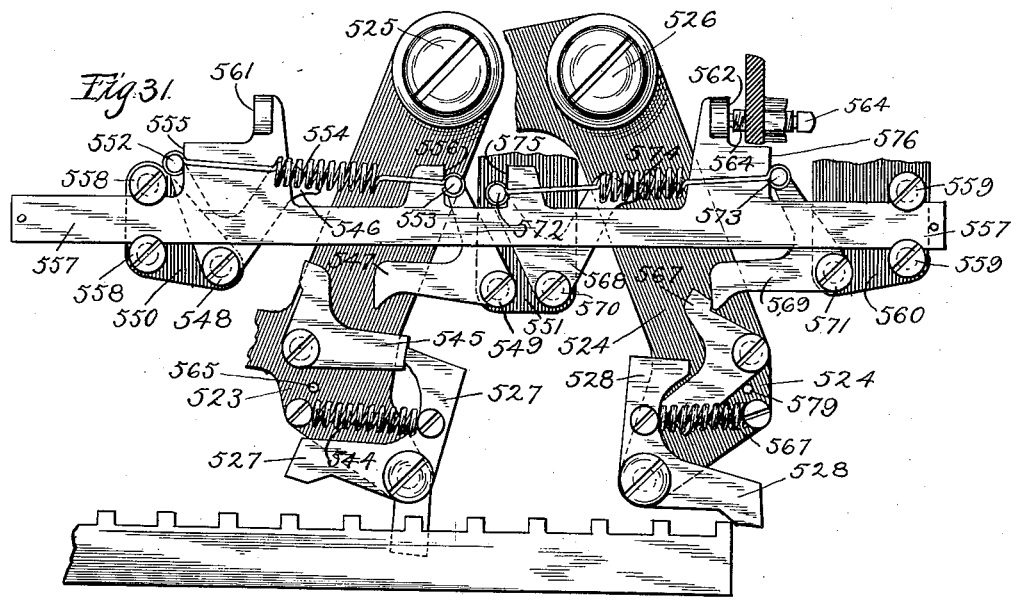
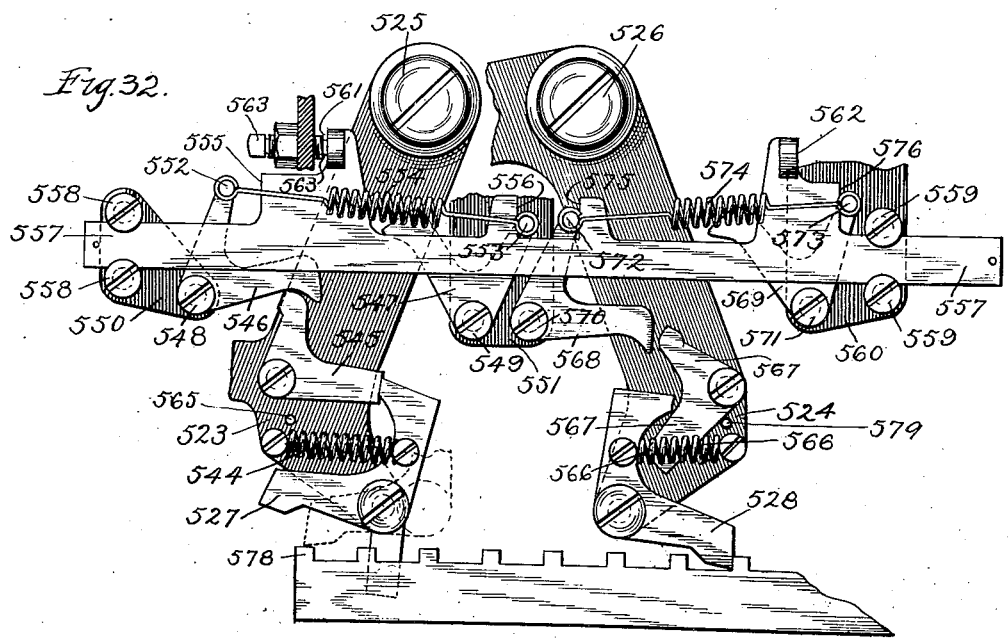
Witnesses:  
Inventor:  
Louis J. Hall.

No. 870,359.
PATENTED NOV. 5, 1907.
L. J. HALL.
MACHINE FOR STAMPING AND SEALING MAIL MATTER.
APPLICATION FILED APR. 29, 1899. RENEWED JAN. 16, 1903.
27 SHEETS—SHEET 23.
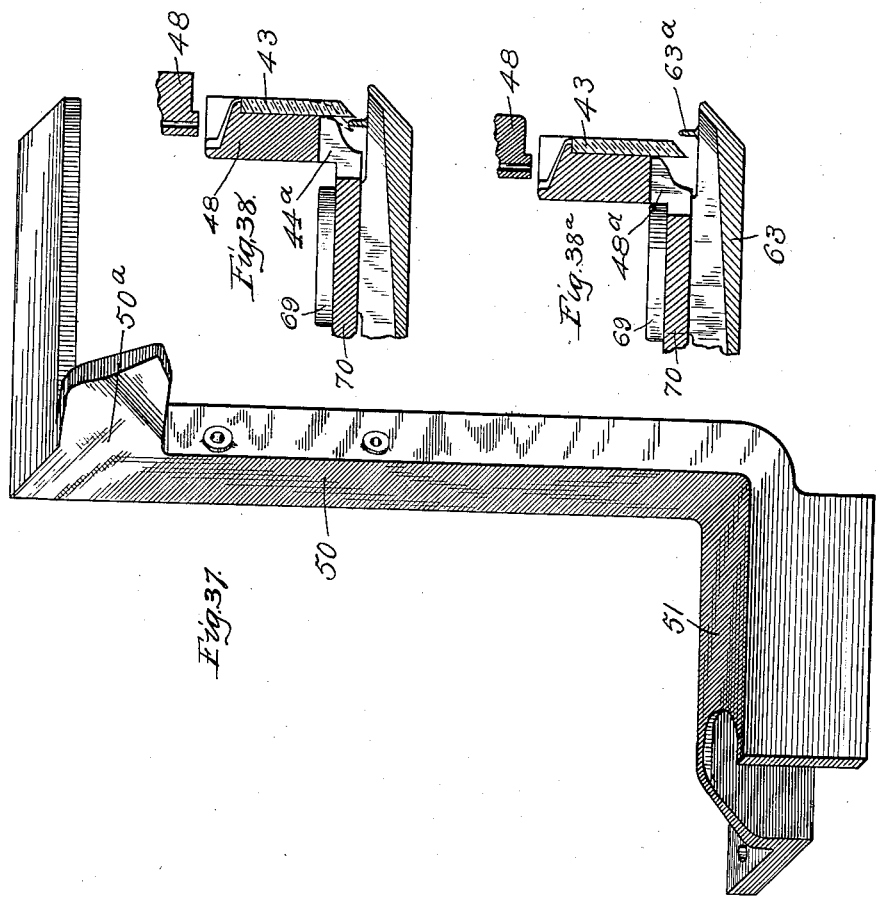
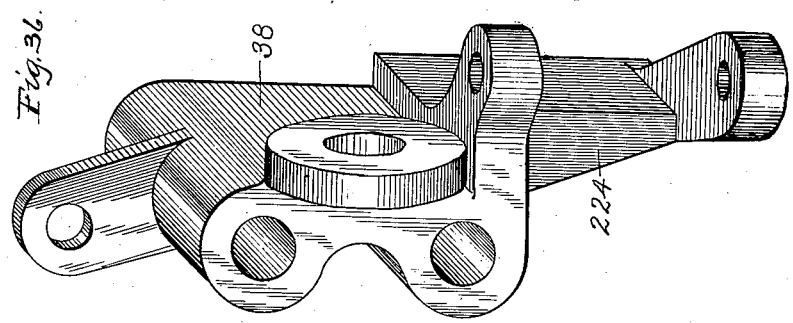
Witnesses:
Inventor
Louis J. Hall
By _____ Attys

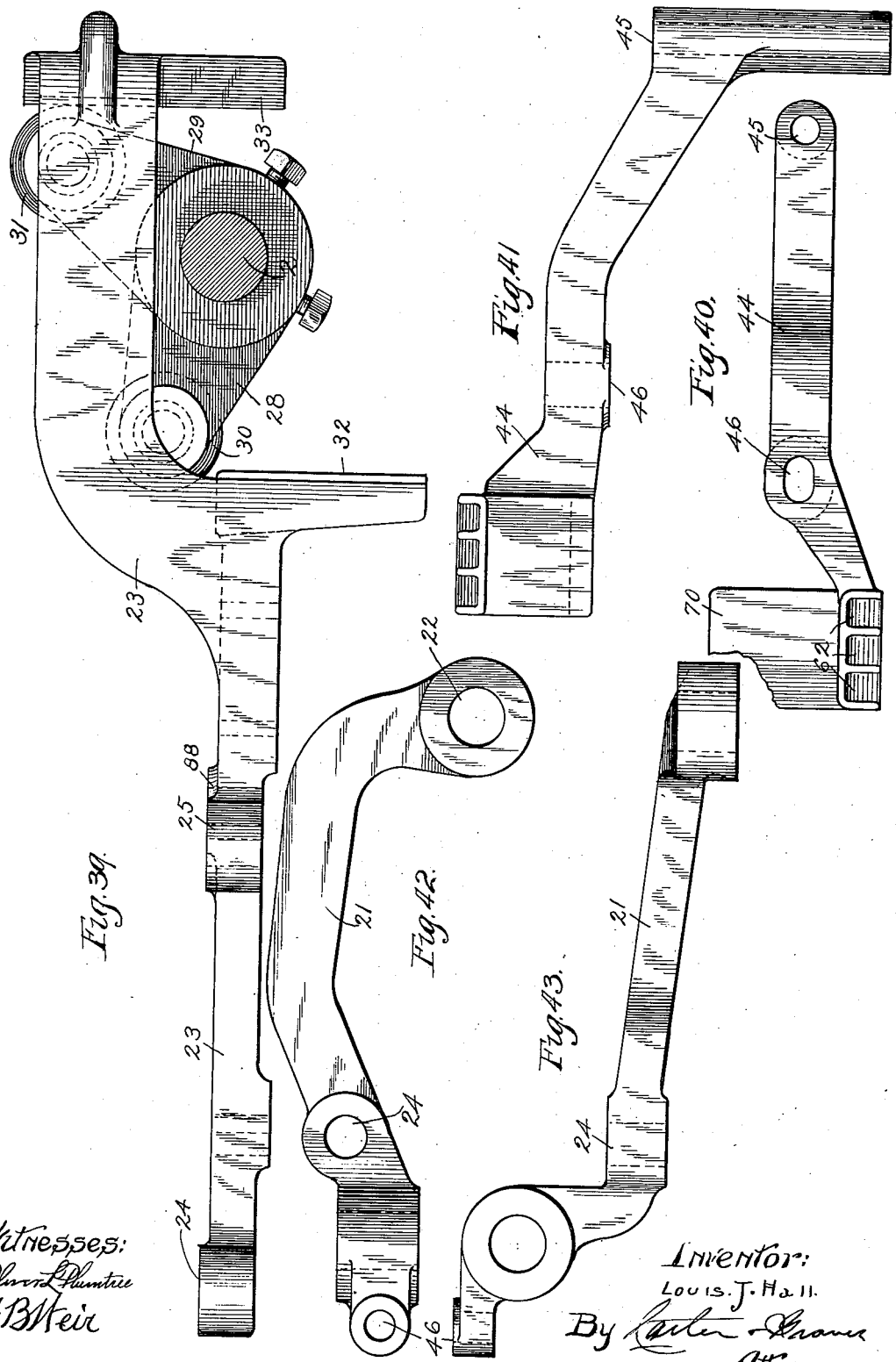

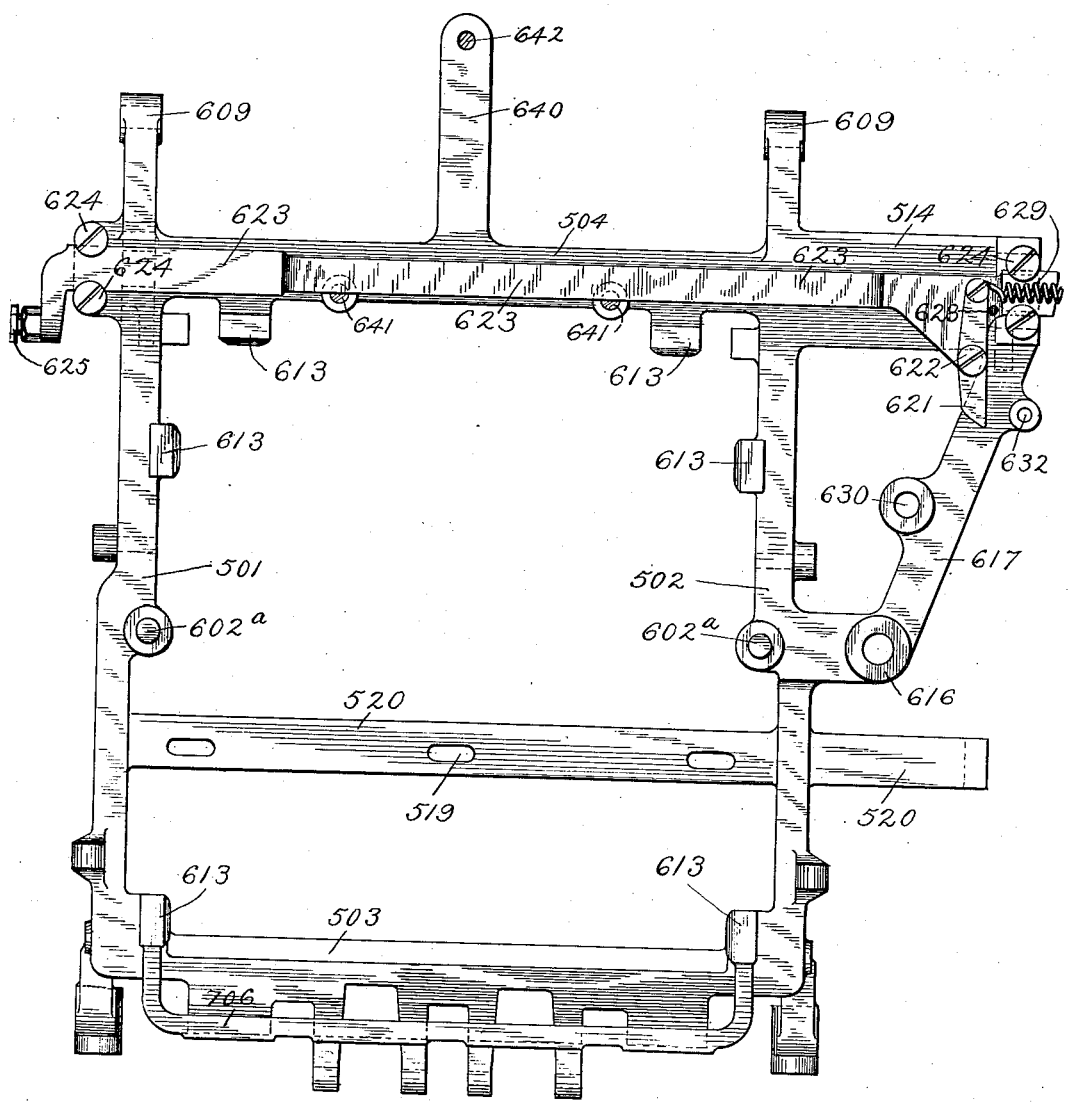

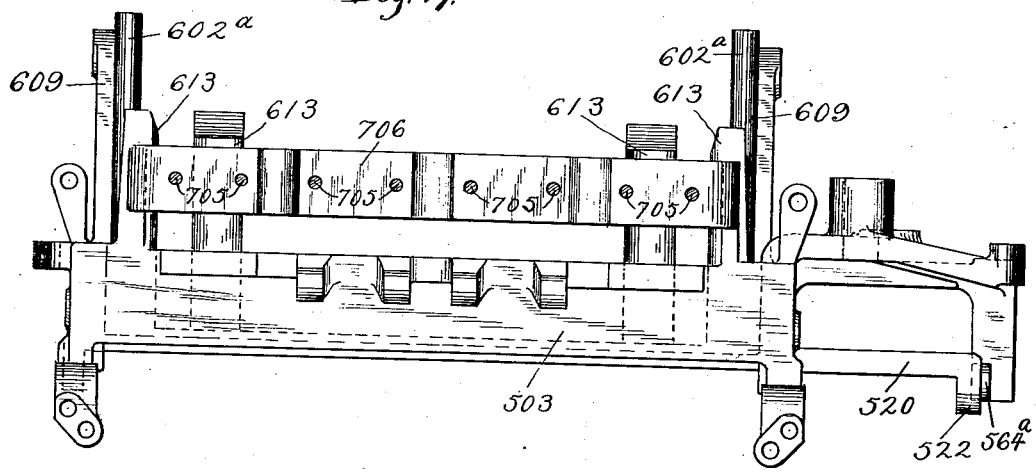
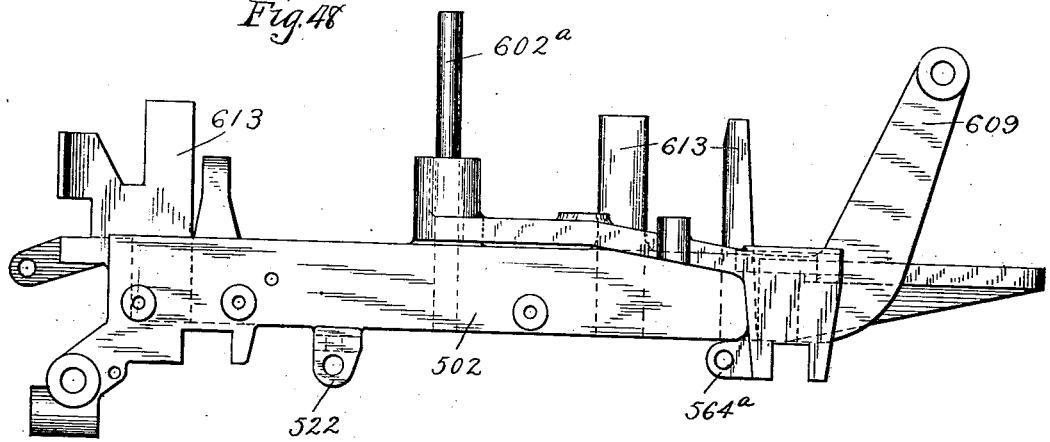

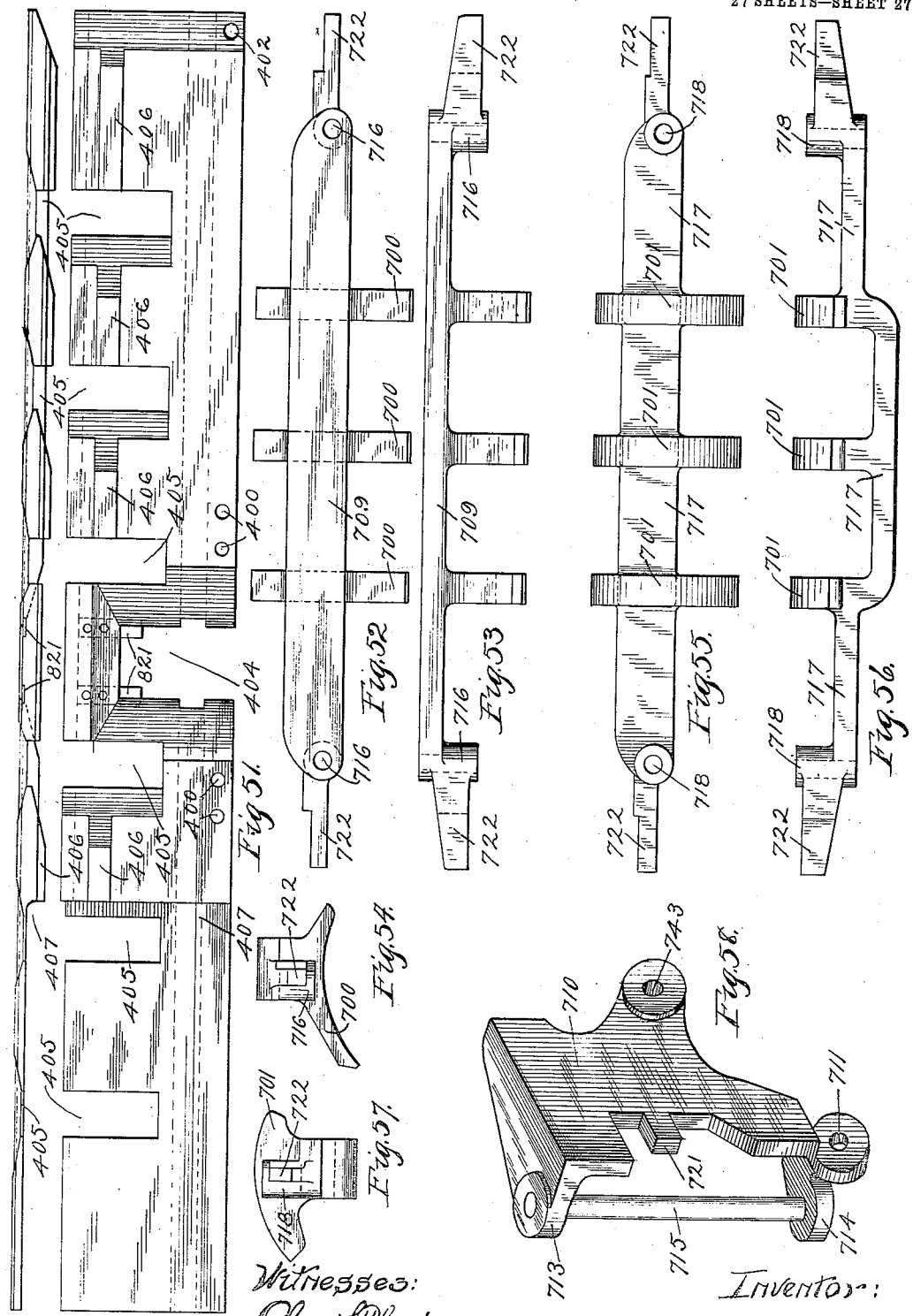

UNITED STATES PATENT OFFICE.

LOUIS J. HALL, OF CHICAGO, ILLINOIS, ASSIGNOR, BY MESNE ASSIGNMENTS, TO MORRIS-HALL MAIL CLOSER COMPANY, A CORPORATION OF DELAWARE.

MACHINE FOR STAMPING AND SEALING MAIL-MATTER.

No. 870,359.            Specification of Letters Patent.           Patented Nov. 5, 1907.

Application filed April 29, 1899. Serial No. 715,042. Renewed January 16, 1903. Serial No. 139,352.

*To all whom it may concern:*

Be it known that I, LOUIS J. HALL, a citizen of the United States, and a resident of Chicago, in the county of Cook and State of Illinois, have invented certain new and useful Improvements in Machines for Stamping and Sealing Mail-Matter, of which the following is a specification.

Figure 2:
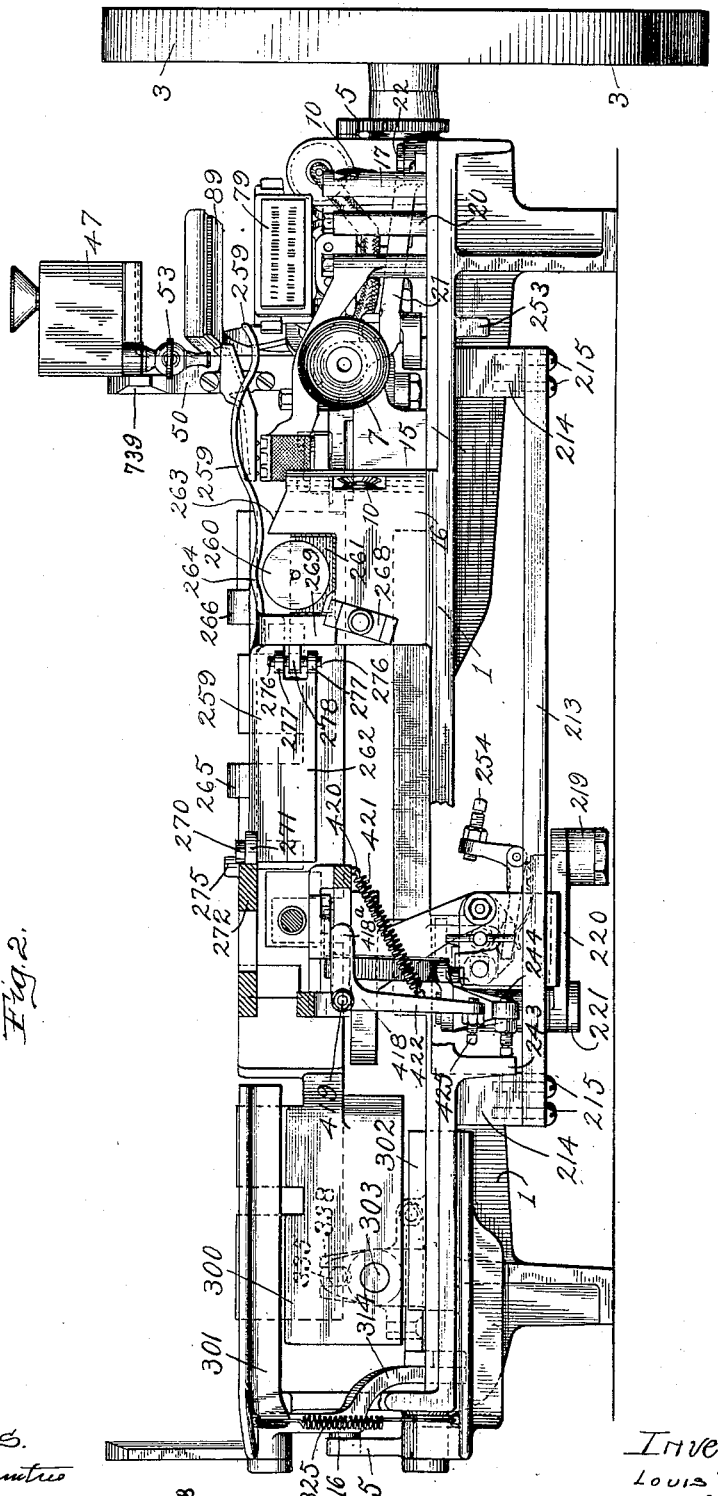
Figure 26:
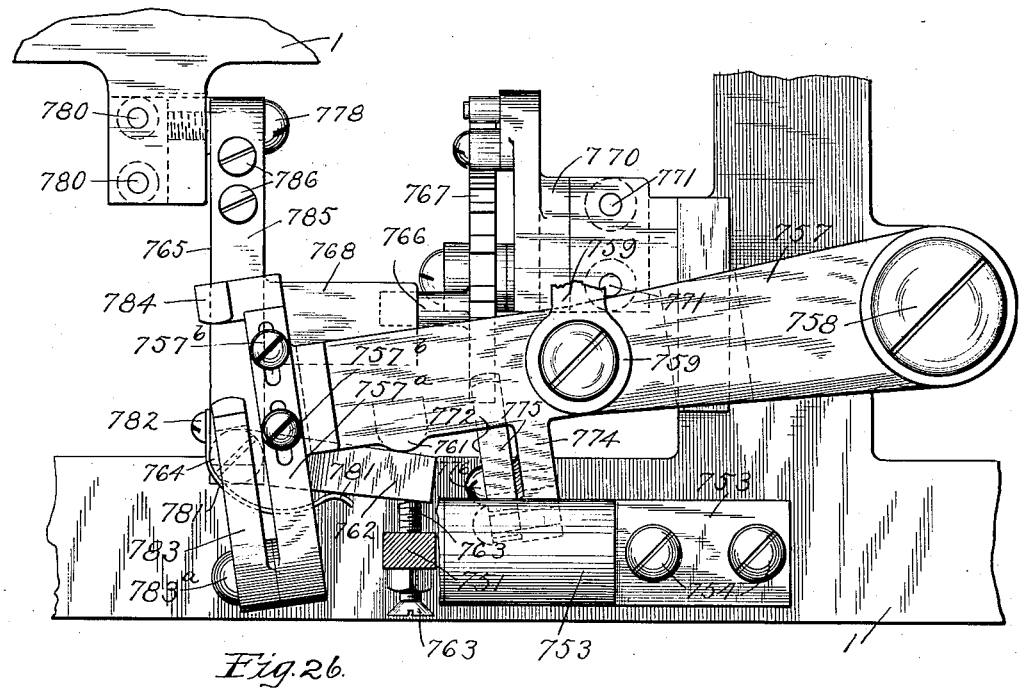
Figure 27:
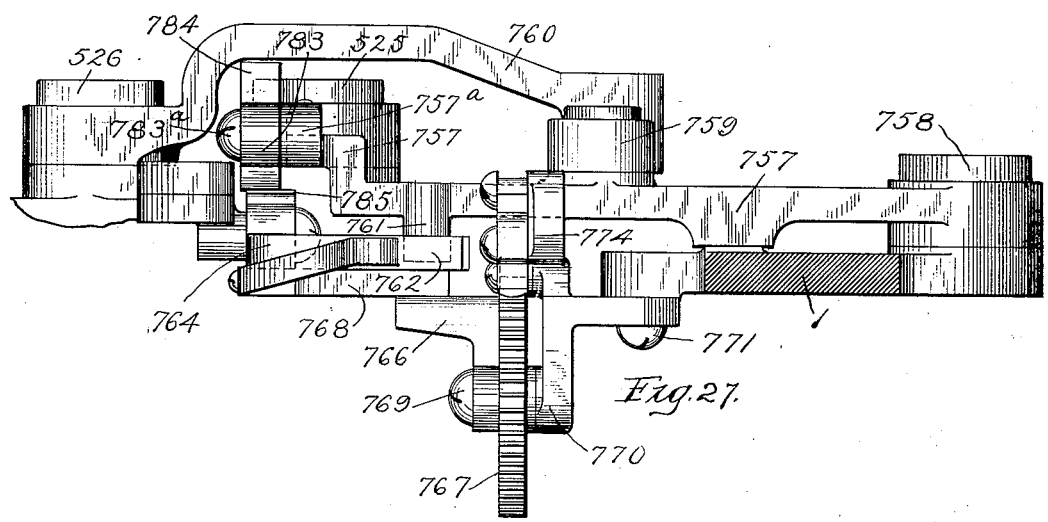

This invention relates to improvements in machines for stamping and sealing mail matter and for other similar purposes, and it consists in the parts, improvements, and combination hereinafter set forth and particularly pointed out in the appended claims, as will be fully understood from the following detailed description taken in connection with the accompanying drawings in which;

Figure 1 is a top plan view of a machine embodying the invention in one form. Fig. 2 is a front elevation of the machine with parts removed. Fig. 3 is a right end elevation of the machine. Fig. 4 is a left end elevation thereof. Fig. 5 is a rear elevation of the machine. Fig. 6 is a sectional elevation taken on line 6—6 of Fig. 1. Fig. 7 is a section elevation of the stamp carriage taken on line 7—7 of Fig. 1, the sheet trays being shown in their lowermost position. Fig. 7ª is a somewhat similar view showing the sheet trays as raised to their uppermost position. Fig. 8 is a front elevation of the stamp carriage removed. Fig. 9 is a partial top plan view showing more fully some of the operating mechanism. Fig. 10 is a partial top plan view, with parts in section, of the right hand front corner of the machine with the printing mechanism removed, and showing more particularly the manner in which the separation of the foremost envelop is accomplished. Fig. 11 is a top plan view of the printing mechanism removed. Fig. 12 is a left side elevation of the same. Fig. 13 is a top plan view of the moistener. Fig. 14 is a sectional elevation thereof taken on line 14—14 of Fig. 15. Fig. 15 is a sectional elevation thereof taken on line 15—15 of Fig. 14. Fig. 16 is a top plan detail of the carrier jaws. Fig. 17 is a left end elevation thereof. Fig. 18 is a front elevation thereof with parts in section. Fig. 19 is a sectional elevation of the stamp affixing mechanism showing the plunger as projected to its extreme forward position in the act of affixing a stamp to an envelop. Fig. 20 is a somewhat similar view showing a previous position of the parts as they stand at the moment the stamp is first pressed against the envelop but before it has been detached from the sheet. Fig. 20ª is a somewhat similar view showing the plunger and clamp withdrawn to their rearmost position. Fig. 21 is a plan detail, with parts in section showing the shape assumed by the envelop at the moment the stamp is first pressed against it. Fig. 21ª is a sectional detail taken on a plane just back of the die plate and looking from the front against the face of the clamp and plunger. Fig. 22 is a perspective detail of the clamp alone. Fig. 23 is a perspective detail of the double bell-crank for operating the clamp. Fig. 23ª is a sectional detail showing the manner in which the operation of this bell-crank on the clamp is cushioned. Fig. 24 is a left end elevation of the stacker showing the stacker jaws open and the push plate projected. Fig. 25 is a right side elevation of the carriage with parts removed. Fig. 26 is a top plan detail of the mechanism for moving the jaws to feed forward the sheet of stamps row by row. Fig. 27 is a rear elevation of the same. Fig. 28 is a right end elevation thereof. Fig. 29 is a top plan detail of the mechanism for accomplishing the step by step reciprocation of the carriage. Figs. 30, 31 and 32 are similar views showing successive positions of the parts. Fig. 33 is a sectional detail showing the manner of adjusting one of the levers of the foregoing mechanism, the section being taken on line 33—33 of Fig. 29. Fig. 34 is a top plan detail of one of the sheet clamps of the carriage. Fig. 35 is a top plan detail of the cam bar by which the row clamp of the carriage is operated. Fig. 36 is a perspective detail of the air pump cross-head. Fig. 37 is a perspective detail of the tank supporting bracket and standard. Figs. 38 and 38ª are details showing a somewhat modified and improved moistener pad and drip device. Fig. 39 is a detail side elevation of the separator operating bar. Fig. 40 is a top plan detail of the moistener arm. Fig. 41 is a front elevation thereof. Fig. 42 is a top plan detail of the separator arm. Fig. 43 is a front elevation thereof. Fig. 44 is a fragmentary detail in front elevation of the carrier plate. Fig. 45 is a top plan detail showing the plunger operating mechanism. Fig. 46 is a plan view of the carriage frame. Figs. 47 and 48 are respectively front and side elevations thereof. Fig. 49 is a top plan view of the die plate. Figs. 50 and 51 are respectively end and front elevations thereof. Fig. 52 is a top plan view of the upper jaw of the carriage. Figs. 53 and 54 are, respectively, front and end elevations thereof. Fig. 55 is a top plan view of the lower jaw of the carriage. Figs. 56 and 57 are, respectively, front and end elevations thereof. Fig. 58 is a perspective view of one of the jaw supporting frames. Fig. 59 is a sectional detail taken on the line 59—59 of Fig. 16 but assuming that the jaws are closed.

In the operation of the improved machine herein shown it is contemplated that envelops to be sealed and stamped will be supplied in quantities to a magazine from which they will be delivered one by one to a carrier that will transfer them in succession past suitable moistening, sealing and stamp affixing devices to a stacker from which they will finally be delivered in quantities, as supplied, but with their flaps securely sealed and with postage stamps properly affixed to their faces. As a further improvement also the invention contemplates, in its more complex embodiment, the printing of a return or address card, or the like, upon the envelop during its progress through the machine and without delaying or affecting the other operations. A machine provided with all of these improvements may accordingly be said to comprise generally, a receiving magazine provided with mechanism for separating each foremost envelop in turn from the pack and presenting it to the carrier, devices arranged in proper position along the path of movement of the envelops for moistening their faces preparatory to receiving the stamps, and for moistening and sealing the flaps to the bodies of the envelops, a carrier for removing the separated envelop from the magazine and transferring it past the stamp affixing devices to the stacker, a stamp affixing mechanism including means for feeding successive sheets of stamps to a plunger or equivalent device by which a stamp is detached and applied to each envelop in turn as it is presented by the carrier, a stacker for bunching the sealed and stamped envelops and for applying a final pressure by which the adhesion of the gummed parts is assured, and, in its fullest development, printing devices operatively arranged to impress an imprint upon the envelop at a convenient point in the travel of the latter. For the sake of clearness in the following detailed description these several mechanisms, with the exception of the moistening and printing mechanisms, which are more conveniently described in connection with the magazine separator and its connections, will be taken up and disposed of in the order above indicated as nearly as practicable.

In the drawings, 1 designates the base plate of the machine and 2 the main driving shaft which is journaled on the base plate to extend horizontally from right to left of the machine as shown. A rigidly attached fly wheel 3 having a crank handle 4 enables the shaft to be rotated in the proper direction to operate the machine, its reverse rotation being prevented by a ratchet device 5. Suitable connections for rotating the shaft from a motor or from any available source of power may also be conveniently provided but are not illustrated herein. The driving shaft 2 is operatively connected with the several mechanisms of the machine in the manner hereinafter fully described, and serves to actuate the same in proper relative order.

*Magazine and separator.*—The supply mechanism and attendant mechanism for separating and advancing the envelop is constructed as follows: 6 designates a receiving table that projects forwardly, and with a slight angle to the right, from the right hand front corner of the base plate 1, as shown in Figs. 1, 3 and 10; said table being made of sufficient size to support a large number of envelops E placed on edge with their flaps overlapping (Fig. 10).

The envelops are designed to be continually forced towards the separator 7, presently to be described, by any suitable presser 8, which in this instance consists of an angle plate that rests and slides on the table and is maintained under a constant tendency to move inward by cords 9 that are trained over pulleys 10 and 11 and carrying weights 12 on their depending ends, the other ends of said cords being made fast to laterally projecting brackets 13 on said angle plate. A guide wall 14 is provided on the inner or left hand side of the table 6, and is continued in effect on the main frame by a guide plate 15 that is herein shown as secured to the side of a block 16 on said main frame, said block serving also to support the flap moistener tank, as hereinafter set forth. A short guide plate 17 for the right end of the envelops as they approach the separator is also provided on the main frame near the right hand edge of the latter, and will be set at a distance from the guide plate 15 equal substantially to the length of the envelops to be handled. This distance may be varied as desired to accommodate different sizes of envelops by providing different sets of bolt holes (not herein illustrated) to receive the bolts 18 which secure the guide plate 17 to the base plate.

The forward movement of the pack of envelops in the magazine is checked at their inner or left hand end by a ledge 19 on the inner end of the guide plate 15, and at their outer or right hand ends by a stop 20 herein shown as made in the form of a vertical stud, better shown in Figs. 1, 2 and 10. This stud positively limits the forward movement of the envelops at this end, but the ledge 19 is only wide enough to normally resist the tendency of the pack to move forward under the action of the presser 8 while permitting the foremost envelop to be swung forward past the ledge and away from the rest of the pack by the separator 7, said foremost envelop in this movement being swung about the stop 20 as a pivot, as shown in Fig. 10. The position of this stud is made adjustable in the same manner as the position of the guide plate 17, by providing a number of bolt holes (not herein illustrated) in the base plate, in any one of which the stud may be screwed. As herein shown said separator 7 is a vacuum tip or sucker disk that is carried by the free end of a swinging arm 21 (Figs. 42 and 43) which is pivoted to the base plate near the right hand edge thereof at 22, in such position that the sucker is given a swinging movement coinciding substantially with the pivotal movement of the envelop about the stud 20. Oscillation of the separator arm 21 is effected, as herein shown, by an operating bar 23 (Fig. 39) which rests and slides on the base plate, being guided thereon by its pivotal connection at 24 with the separator arm and by a similar pivotal connection at 25 with a link 26 (Fig. 10) which is also pivoted to the base plate at 27, said link 26 being of the same effective radial length as the separator arm and being arranged in a parallel radial direction so that the two coöperate to form a parallel link motion by which the bar 23 is guided laterally in its reciprocation. Any suitable connection with the drive shaft 2 may be employed to effect such reciprocatory movement of the bar 23, said connection in this instance comprising a pair of crank arms 28 and 29 having roller covered wrist pins 30 and 31 which contact in alternation with opposing bearing surfaces 32 and 33 on the inner end of the bar 23 (Figs. 1 and 39). Said crank arms and their coöperating bearing surfaces are offset laterally with respect to each other so that each wrist pin can strike only the bearing surface with which it is intended to contact, and said bearing surfaces are furthermore offset vertically with relation to each other so that the contact of each wrist pin with its bearing surface cannot occur until the other wrist pin has passed out of contact with its bearing surface. The two crank arms 28 and 29 are rigidly secured to the drive shaft 2 by set screws or equivalent devices which conveniently permit of their adjustment angularly on the shaft and with reference to each other and to the bar 23, this adjustment permitting the movement of said bar and consequently of the separator to be timed and regulated as desired. The slight lateral movement of the bar 23 due to its connection with the separator arm 21 and link 26 is provided for at its engagement with the cranks 28 and 29 by making the bearing surfaces 32 and 33 wide enough so that they will offer prompt contact surfaces for the crank pins in any position of the bar.

To exhaust the air from the vacuum tip of the separator connections are provided with any suitable vacuum pump or chamber 34 (Figs. 1, 3 and 10). As herein shown this is arranged horizontally along the right hand edge of the base plate and is connected with the vacuum tip by a rubber or equivalent flexible tube 35. A piston 36 within the pump cylinder is connected by a piston rod 37 with a cross-head 38 (Fig. 36) which is mounted to slide on parallel guide rods 39, as better shown in Figs. 1, 3 and 5. The cross-head is reciprocated from the shaft 2 by a pitman 40 which connects it with a crank 41 of said shaft, so that the piston 36 is drawn out to create a suction through the separator disk during a portion of each revolution of the drive shaft. This suction begins just as the separator is thrown forward to engage the foremost envelop and continues until the separator has returned to its rearmost position with the envelop, the vacuum being broken in any suitable manner, as by the passage of the piston past a port opening 42 in the pump cylinder, at the right moment to release the envelop and permit it to be withdrawn by the carrier, as hereinafter more fully described

*Envelop moistener.*—The moistening of the face of each envelop preparatory to the application of the stamp, is herein shown as accomplished by a moistening pad 43 carried by the free end of a swinging arm 44 (Figs. 40 and 41), which is pivotally mounted on the base plate at a point 45 adjacent to the stop stud 20 (Fig. 10). The moistening pad is designed to be projected against the face of the foremost envelop before it is separated from the pack, and to this end the moistener arm 44 is herein shown as operatively connected by a bolt 46 with the separator arm 21 so that the moistener is thereby projected and withdrawn simultaneously with the similar movements of the separator. In order, however, to prevent any possibility of the moistener's interfering with the action of the separator it is desirable that the moistener should strike the envelop slightly in advance of the separator disk and be then immediately withdrawn at a higher velocity than the retractive movement of the separator. This is readily accomplished in the construction shown by arranging the connection 46 at the extreme end of the separator arm but back considerably from the pad on the moistener arm and by locating the pivot 45 of said moistener arm at a point well inside of the pivot 22 of the separator arm or within the sector of movement of the latter. This obviously results in imparting to the pad a greater velocity of movement than to the separator and gives the former an increased length of travel so that it is held back out of the way of the envelop as the latter is advanced to the carrier.

As herein shown water to moisten the pad 43 is supplied from the tank 47, or other suitable source, through a distributer block 48, the latter being secured by screws 49 to the upwardly projecting tank supporting standard 50 of a bracket 51 which is secured by screws 52 to the base plate, as better shown in Figs. 1, 13 and 14. That end of the distributer block which stands beneath the cock 53 of the supply tank is somewhat elevated and provided with a basin 54 in which the water collects until deep enough to flow over a ledge 55 into separate channels 56, 57 and 58 that lead downwardly to the other end of the block and into discharge nozzles 59, 60 and 61, respectively. These stand directly above the downwardly and forwardly sloping recesses 62 formed in the upper edge of the pad supporting end of the moistener arm 44, in the retracted position of the latter, and the water trickles down these recesses to the pad 43 which is secured in any suitable manner to the front of said arm beneath the recesses (Figs. 14 and 15). The construction thus described for distributing the water to the pad is particularly designed to keep the pad evenly moistened without oversaturating it. It is, however, found difficult in practice to have the pad sufficiently moistened without having more or less dripping from its lower edges. To catch this drip and the drip from the distributer block when the moistener is projected, a drip plate 63 is shown as mounted upon the moistener arm to move therewith and is arranged to discharge rearwardly into a drip basin 64 that is secured on the bracket 51 by screws 65 (Fig. 2), the drip plate being made of such length that its rear edge 66 is never carried beyond a front edge 67 of the drip basin even in the extreme forward projection of the moistener. As a further improvement also the drip plate 63 is mounted to slide on the moistener arm, being to this end provided with upwardly and inwardly projecting side flanges 68 and 69 which embrace a lug 70 that projects backward behind the pad from the lower edge of the moistener lever.

The drip plate is designed to normally occupy its extreme forward position on the moistener arm and to this end is provided at its rear edge with a lug 71 which comes in contact with a stop 72 on the drip basin when the moistener is retracted and causes the plate to slip forward on the lug 70 relatively to said moistener arm, said stop being herein shown as conveniently formed by the end of an adjustable screw 73 which is seated in a lug 74 in the rear edge of said basin. In this forward position of the drip plate its forward lip 75 extends well in front of the pad in position to surely catch the drip from the latter, and it continues to occupy this position as the moistener is projected until it comes in contact with the foremost envelop and slides back on the lug 70 relatively to the moistener so as not to interfere with the action of the latter upon the envelop. A pin 76 in the lug 70 serves to prevent the plate from being pushed back further than is necessary to permit the pad to strike the envelop, and the drip which collects in the basin 64 may be drained off to any suitable point of discharge through a flexible tube 77, or otherwise as desired.

A somewhat improved construction for insuring the removal of the excess moisture from the moistener pad, is shown in Figs. 38 and 38ª. In this construction the moistener arm 44 is cut away at 44ª behind the lower edge of the pad 43 so that said lower edge of the pad is unsupported at its back and is free to be deflected to a slight degree without interfering with the effective contact of the body of the pad with the envelop. A transverse bar 63ª is then provided on the drip pan 63 just back of the forward lip 75 of the latter in such position that it is carried back and forth beneath the pad in the sliding movement of the drip pan on the moistener arm, the lower edge of the pad being deflected each time to permit this movement. The water running down over the surface of the pad 43, which is desirably made of rubber but may be made of any suitable material, tends to collect in a drop along the lower margin of the pad and consequently the wiping of the bar 63ª past said lower margin as the drip pan slides back on the moistener arm just before the pad comes in contact with the envelop, serves to remove this drop and leaves the surface of the pad at its moment of contact with the envelop substantially free from any surplus moisture. With this construction therefore, it is not as necessary to closely regulate the amount of moisture supplied to the pad since no matter how fast the water flows from the distributer block it will almost instantly run down and collect on the lower margin of the pad as described so that when the drop is removed by contact with the bar 63ª, only a definite amount, depending upon the nature of the pad and the character of its surface, will remain on the pad to be applied to the envelop, it being remembered that the projection of the moistener toward the envelop carries it from beneath the distributer block so that the supply to the pad is temporarily cut off during its forward movement and until it is swung back beneath the distributer block again.

*Printing mechanism.*—The printing mechanism provided in this instance for printing a return card or the like upon the face of each envelop, is herein shown as mounted upon a bracket 78 which is bolted to the base plate just back of the separator arm (Fig. 1) and in such position as to place the imprint upon the upper left hand corner of the face of each envelop before the latter is separated from the pack. The printing form 79 is carried at the outer end of a swinging frame 80 (Figs. 11 and 12) which is pivoted at 81 to a reciprocating cross-head 82, this cross-head being mounted to slide on guide rods 83 of the bracket 78. Reciprocatory movement is transmitted to this cross-head by a lever 84 which is pivoted at 85 on the base plate and is connected at a point 86 between its ends with the separator operating bar 23 by a link 87 which pivotally engages said bar at 88. The reciprocatory movement of the cross head projects the form 79 against the envelop and retracts it therefrom, and also serves to impart a swinging movement to the frame 80 by which the form is carried upwardly and rearwardly into an inverted position beneath the inking pad 89, or equivalent device for supplying it to the form, as shown in dotted lines in Fig. 12. To this end the frame 80 is extended downwardly and rearwardly past the pivot 81 on one side, and provided with an inwardly projecting stud or roller 90 which, in the backward movement of the cross-head, enters a groove 91 in the edge of the bracket 78 and is held thereby so that the further backward movement of the cross-head swings the frame 80 upward, as above stated.

The inking pad 89 is carried at the forward end of the bell crank lever 92 which is pivoted to an upwardly projecting arm 93 of the bracket 78. To operate this lever and throw the inking pad down upon the printing form when the latter reaches its inverted position beneath the pad, the lever 84 is provided with a rearwardly projecting lug or arm 94 which, as said lever approaches the rear end of its movement, strikes the lower end of the bell crank 92, or an adjusting screw 95 in the lower end of said bell crank, and forces the inking pad down upon the form. This movement of the inking pad is designed to occur after the printing form has come to rest and to this end the end 96 of the lever 84 which bears against the cross-head is connected with the latter yieldingly by a spring 97, said spring being secured at its ends to pins 98 and 99 on said lever end and cross-head, respectively. With this construction the lever 84 can continue to move rearwardly against the bell crank 92 after the rearward movement of the cross-head and printing form has been checked by the contact of the former with the rear end 100 of the bracket, the spring 97 simply yielding to permit this additional movement of the lever. The return or lifting movement of the pad is accomplished as the lever 84 swings forward again, by a spring 101 the ends of which are secured to hook 102 and screw 103 on the bell crank and bracket, respectively. To enable the throw of the printing form to be adjusted, the cross-head is provided with a movable lug 104 against which the end 96 of the lever 84 bears to throw the printing form forward. This lug is adjustably secured to a fixed lug 105 on the cross-head by a screw 106 which passes centrally and loosely through the fixed lug and is threaded into the movable lug. Two other screws 107 are placed one on each side of the screw 106 and threaded through the fixed lug to bear at their ends against the movable lug. The center screw 106 thus obviously serves to clamp the lug 104 to the cross-head while the screws 107 keep it rigidly separated from the fixed lug 105 by any desired distance, and by adjusting the three screws the lug 104 can obviously be locked in any desired position on the cross-head. Any suitable stop 108 on the side of the cross-head may be provided to properly limit the swinging movement of the frame 80 in both directions, and bring the printing form to rest in its proper projected or retracted position. Said printing form is herein shown as desirably made removable from the frame 80 and to this end comprises a type facing of rubber or other suitable type forming material secured to a backing 109 of wood or the like, said backing being provided with projecting ends adapted to enter behind inwardly projecting ledges 110 of the frame and be locked there by screws 111, a ledge 112 being provided at the lower edge of the frame for the form to rest upon.

The operation of the mechanisms thus far described will be easily understood. The pack of envelops is forced forward by the presser so that the front envelop of the pack is always maintained against the stop ledge 19 and stud 20. With each revolution of the drive shaft, however, the separator swings forward, seizes the foremost envelop by suction and then returns to its retracted position bringing the envelop with it. In this movement the envelop pivots at its outer end about the stop stud 20 at which point it still remains in contact with the pack, its left hand end being, however, forcibly withdrawn past the stop ledge 19 and carried forward until the body of the envelop stands at an angle with the rest of the pack, as better shown in Fig. 10. The said ledge 19 is thus not wide enough to interfere with the separate advancement of the foremost envelop in this manner but is wide enough to prevent the next envelop, which rests immediately against it, from being carried forward with said foremost envelop. Simultaneously with the projection of the separator against the pack the moistener is projected against the upper right hand corner of the foremost envelop and the printing form is at the same time projected against its upper left hand corner. This contact of the moistener and printing form with the envelop occurs before it is separated from the rest of the pack so that the pressure of the succeeding envelops upon it affords a sufficient resistance to insure proper contact. The swinging back of the separator is accompanied by the more rapid withdrawal of the moistener and printing form and the latter consequently do not interfere with the carrying forward of the envelop by the separator or tend to strip it from the vacuum tip. This bringing forward of the foremost envelop separates its left hand end from the rest of the pack sufficiently to permit it to be readily seized between the jaws of the carrier mechanism which are projected to grasp it just as the vacuum is broken to release the grip of the separator upon the envelop. By the succeeding retractive movement of the jaws the envelop is then completely withdrawn lengthwise leaving the succeeding foremost envelop of the pack free to be acted on by the separator, moistener and printing form in the next revolution of the drive shaft. The only resistance to this withdrawal of the separated envelop by the carrier jaws occurs at the stop stud 20 between which and the rest of the pack the envelop is compressed by the action of the presser, and to reduce this friction as much as possible said stud is desirably covered by an anti-friction roller which is free to revolve as the envelop is drawn past it.

*Carrier mechanism.*—The jaws 200—201 of the carrier mechanism are shown as projecting upwardly through an opening 202 in the base plate around and above a groove or channel 203 which spans said opening and forms a path of movement in which the lower edge of the envelop slides as it is drawn forward by the carrier (Figs. 6 and 17). The channel 203 extends from a point 204 just at the left of the magazine to a point 205 at the right of the stacker (Fig. 9), but for convenience in construction the ends of the channel bar are herein shown as flattened and carried over upon the base plate and are secured to the latter by screws 206 and 207. The jaws 200 and 201 are carried at the upper end of brackets 208 and 209 that project upwardly from base lugs 210 and 211, respectively. These are mounted to slide transversely of the carrier movement in a carrier plate 212 which in turn is mounted to reciprocate upon guide bars 213 that are arranged parallel to the channel 203 and are herein shown as secured to depending lugs 214 of the base plate by screws 215 (Fig. 2). This reciprocation of the carrier plate is accomplished from the vacuum pump cross-head 38 through the medium of the bell crank lever 216, which is pivoted beneath the base plate at 217, as better shown in Figs. 1 and 9. The forward end 218 of this lever is provided with an adjustable eye bolt 219 from which a pivotal link 220 leads to a stud 221 on the under side of the carrier plate (Figs. 2, 6 and 17). The other end of the bell crank lever 216 is reduced at 222 to slide freely through a swivel collar 223 which is pivotally mounted in a depending bracket 224 of said pump cross-head 38, so that as the latter is reciprocated by its connection with the crank 41 said bell crank lever 216 will be oscillated and the carrier mechanism reciprocated once in each revolution of said drive shaft.

The sliding mounting of the base lugs 210 and 211 of the carrier jaws is in this instance accomplished by forming said lugs with reduced rod like ends 225 and 226 which are mounted to slide through apertures in upwardly projecting lugs 227 and 228 of the carrier plate. The base of each jaw is also provided with a laterally projecting lug 229 that is forked to embrace the reduced end of the base lug, (Figs. 16 and 18) so that the jaws are thereby held against any movement relatively to the carrier plate except an opening and closing movement at right angles to the direction of travel of the carrier. A spring 230 is applied to normally hold the jaws yieldingly closed, and in this instance so applied that its tension can be readily relaxed to permit the jaws to be readily opened by hand. To this end one end of the spring is shown as secured by a screw 231 to the lug 229 of the base of one jaw while the other end of the spring is secured by a pin 232 to a sliding rod 233 having a handle 234 by which it can be conveniently either rotated or moved longitudinally. This rod is mounted to slide loosely through apertures in the lugs 229 of the jaw bases and is provided at a point adjacent to the pin 232 with another projecting lug or pin 235 which is normally designed to be seated in a recess 236 in the face of the adjacent jaw base lug 229. A slot or groove 237 large enough to permit the passage through it of said pin 235 is cut through the lug at one side of the bore therein through which the rod 233 passes and by withdrawing the pin 235 from the recess 236 and turning the rod to bring said pin in register with the key way 237, said pin may be passed through said key way to the inner side of the lug. In this position it will be obvious that the spring is practically disconnected from one of the jaws and consequently ceases to press them towards each other, but when the rod 233 is pulled out to carry the pin 235 through the key way 237 and then rotated to seat said pin in its recess 236 again the spring is in effect attached to both jaws and exerts its pressure to maintain the same closed. The object of this construction is to enable the jaws to be readily opened to release the envelop should the same become jammed or in case the operation of the machine should be otherwise interrupted so as to render it desirable to clear the jaws.

The carrier jaws are designed to be opened at the left end of the carrier movement to release the envelop which has just been withdrawn from the magazine and to place them in position to embrace the end of the next succeeding envelop in the return movement of the carrier. The devices provided in this instance to accomplish the opening of the jaws comprise two bell crank levers 238 and 239 which are pivoted to a lug 240 that projects upwardly from the carrier plate beneath and back of the jaws. The front ends 241 and 242 of said bell cranks extend forwardly between the jaw brackets 208 and 209, while their other ends project laterally with reference to the carrier movement until their extremities stand in line with depending lugs 243 on the base plate which lugs are so located that the bell cranks are shifted by contact with them just before the carrier plate reaches the extreme left end of its movement, this oscillation of the bell-cranks being of the character to spread their forwardly projecting ends 241 and 242 and consequently to open the jaws. Suitable adjusting screws 244 are provided at the points of contact between the bell cranks and stop lugs to enable the opening movement of the jaws to be adjusted as desired, said screws being herein shown as tapped through the outer ends of the bell cranks and as locked in place therein by check nuts 245, and as herein shown the inside or rear jaw 201 is arranged to have a less movement than the outer jaw 200, the difference of movement being secured by making the forwardly projecting ends of the bell cranks of different radial lengths, (Fig. 16). As soon as the jaws are thus opened apart by the bell cranks they are locked in their open position by a bell crank 246 which is pivoted at 247 between lugs 248 on the lower right hand side of the carrier plate (Figs. 16 and 18). A spring 249 is applied to this bell crank to normally throw its rear end upwardly between downwardly projecting lugs 250 and 251 on the base lug of the jaws while its upper end 252 is arranged for contact with a tripping lug 253 which depends beneath the base plate at a point beneath the magazine and near the extreme right hand end of the carrier movement. This locking bell-crank thus springs between the jaws to hold them apart as soon as they are sufficiently open by contact of the bell-cranks 238 and 239 with the lugs 243 at the left end of the carrier movement, and will thereafter remain in its locking position and maintain the jaws apart until withdrawn from between the jaw lugs 250 and 251 by its contact with the tripping lug 253 at the right hand end of the carrier movement whereupon the jaws will spring together again. The jaws thus advance in their open position until they embrace the left hand end of the envelop which has just been brought forward by the separator, and close upon it just before the carrier plate begins its return movement so that the envelop is withdrawn from the magazine in said movement and carried along the channel 203 toward the stamping mechanism and stacker. The exact movement of closing of the jaws is made adjustable by an adjustable contact between the locking lever 246 and the tripping lug 253 consisting, in this instance, of a set screw 254 tapped through the upper end of the lever and locked in place therein by a check nut 255.

The carrier is designed to complete the transfer of each envelop from the magazine to the stacker in two movements, the first of which carries the envelop from the magazine to a point about midway of the length of the machine and leaves it at rest with the upper right hand corner of its face in front of the stamp affixing mechanism, while the second movement carries the stamped envelop from this mid position into the stacker. The first movement involves the pulling forward of the envelop by the jaws after they have closed upon its advanced end while the second involves the pushing forward of the envelop simply by the contact of the closed jaws with the rear end of the envelop, the position of the rear edge of the envelop in mid-position being shown in Fig. 10 at 256, this being the point also at which the left hand end of the jaws will come in contact with the advanced envelop to carry it forward from its mid-position to the stacker. To guard against the envelop's being caught in the crevice between the jaws in this movement the left ends of the latter are herein shown as provided with inwardly projecting lugs 257 which overlap each other when the jaws are closed (Fig. 59). It is not intended that the surfaces of the jaws should come in contact at this point, the contact between them being invariably confined to their right hand ends of the jaws by which the envelop is grasped, and which are herein shown as provided with a rubber or other suitable facing 258. The right ends of the jaws are furthermore shown as pointed to facilitate their properly closing and grasping the end of the envelop, such shaping tending to prevent the envelop from being crumpled and mutilated if by accident it is not carried by the separator into exactly a mid-position between the jaws. Rubber faced washers 225ª and 226ª provided on their reduced ends 225ª and 226ª of the base lugs of the jaws serve to cushion the contact on the latter in closing.

*Flap moistener and sealer.*—The moistening and turning down of the flap of each envelop is accomplished in this construction during the movement of the envelop from the magazine to the stacker which latter then applies the final pressure which completes the sealing operation. To this end the envelops are originally arranged in the magazine with their flaps lying substantially horizontal and overlapping, as shown in Fig. 10, and as the envelop is withdrawn from the magazine by the carrier the flap passes beneath an overlying plate 259 which extends from a point above the magazine to a point adjacent to the stamp affixing mechanism. At its right hand end this plate is merely a narrow tongue which prevents the flap from flying up as the envelop is drawn forward by the separator and seized between the jaws, but about midway of its length the plate widens to the full width of the flap, and then narrows down to its left hand end where it comes substantially to a point directly above the envelop passage. The moistening device, consisting in this instance of a roller 260 journaled in a tank 261, is shown as placed beneath the plate at its widest or middle portion and as the envelops are carried forward their flaps are drawn through between the plate and moistener and are thereby wetted so that they will adhere to the body of the envelop when turned down and pressed against the latter. Such turning down of the moistened flap is then accomplished in the ensuing movement of the envelop by a downwardly projecting flange 262 which depends from the front edge of the plate. The tank 261 is herein shown as seated in a recess in the upper portion of the block 16, heretofore referred to, and the right hand upper surface 263 of said block is made to slope upwardly to the left toward the plate 259 to act as a guide for directing the flap properly between the plate and moistener. Said plate is furthermore somewhat arched above the moistener roller, as shown at 264 (Fig. 2), to better press the flap down upon the roller without undue friction. The downward slope of this arched portion of the plate just at the left of the roller also serves to start the turning down of the flap which is then principally accomplished and completed by the depending flange 262.

The flap deflecting plate as a whole is removably secured in position by lugs 265 and 266 on its rear edge which hook over the upper edge of the dieplate 267 hereinafter described, and by a turn button 268 on the block 16 which can be rotated in front of a forwardly and downwardly projecting lip 269 of the plate 259, and which also serves to hold the tank 261 in place. The inner end of the plate is also provided with a lug 270 that is adapted to rest on a laterally projecting lug 271 of the top plate 272 of the spring platen housing hereinafter described. A pin 273 on the lug 270 projects downwardly to loosely engage a slot 274 in the supporting lug 271, and an upper lug 275 on said plate 272 projects slightly over the lug 270 when the flap deflecting plate is in position and helps to lock it in place, the slot 274 in the lug 271 being long enough to permit the pin to be moved endwise within it by an endwise movement of the deflecting plate until the lug 270 is carried from beneath the lug 275 when the deflecting plate can be removed. Vertical adjustment of said deflecting plate is accomplished by set screws 276 tapped through lugs 277 which project laterally from the front of the depending flange 262 of said deflecting plate, said set screws impinging from the top and bottom of a lug 278 which projects laterally from the block 16, as better shown in Fig. 2. The extreme inner end of the deflecting flange 262 stands parallel with the die plate 267 and very close to the latter so that the drawing of the envelop through the narrow passage thus provided closes the flap down into its sealed position against the back of the envelop ready for the final sealing pressure which is applied in the stacker, as hereinafter described.

*Stacker mechanism.*—The stacker mechanism to which the envelop is finally delivered by the carrier after the stamp has been applied thereto by the stamp affixing mechanism hereinafter described, comprises principally a push plate 300 and two movable stop plates 301 and 302 which open apart to enable the push plate to move the envelop bodily forward between them and then close in behind the envelop to prevent its return when the pusher is withdrawn. Said pusher 300 is herein shown as rigidly mounted on the inner end of a sliding bar 303 that is movably supported in upwardly projecting lugs 304 and 305 of the base plate. The rear end 306 of said bar is pivotally connected to one end of the bell crank lever 307 which in turn is pivoted to the base plate at 308 and is caused to oscillate back and forth in each revolution of the drive shaft by connections with the plunger mechanism, as hereinafter described.

The upper stop plate 301 is herein shown as carried at the outer end of a bell crank lever 309 which is desirably and in this instance cast integral with said stop plate (Figs. 4, 9 and 24). This bell crank is pivoted at 310 to the outer face of a lug 311 which projects upwardly and forwardly from the base plate at the left hand edge of the latter. The lower stop plate 302 is similarly carried at the outer end of a bell-crank lever 312 which is pivoted to the outer face of the base plate at the left end thereof at a point 313 located directly below the pivot 310 of the upper bell-crank. The inner ends 214 and 215 of the bell cranks 309 and 312 project respectively downwardly and upwardly past each other and the former is herein shown as provided with a lug 316 which projects laterally and which consequently serves to oscillate the lower bell crank to lower the stop plate 302 whenever the upper bell crank is oscillated to raise the upper stop plate 301. This oscillatory movement is effected, as herein shown, by a bell crank or trigger 317 which is pivoted at 318 to a collar 319 that is rigidly secured to the pusher plate supporting bar 303.

The trigger 317 is normally held by a spring 320, applied between the inner end of said trigger and the pusher plate (Fig. 9), in such position that when the bar 303 moves forward to advance the pusher plate the forward end 321 of the trigger strikes against a lug 322 at the lower extremity 314 of the upper bell-crank 309 and swings it forward thus lifting the upper stop plate and dropping the lower one. This enables the pusher plate to carry the envelop forward between said stop plates and to a position in front of the latter. Just before the pusher plate reaches its extreme projection, however, and after the envelop is fairly in front of the stop plates the inner end 323 of the bell-crank trigger 317 strikes a fixed stop 324, which is herein shown as provided in the form of a lateral projection on the lug 304, before referred to, and oscillates said trigger to release the lug 322 whereupon the stop plates are instantly returned to their closed position behind the envelop by a spring 325, said spring being in this instance applied between the strengthening flanges 326 of the stop plates as shown in Figs. 2, 4 and 24. This leaves the pusher plate (which is made of less width vertically than the distance between the stop plate when closed) free to return to its retracted position ready to have the next succeeding envelop pushed in front of it by the carrier which envelop will then in turn be carried forward in front of the stop plates in the next advance movement of the pusher. To maintain the envelops in a compact bunch or pack as they are thus moved forward by the pusher plate a presser 327 is mounted to slide on the stacker table 328 which projects forward from the left hand front corner of the machine, said presser 327 being herein shown as substantially similar to the magazine presser 8 and as held against the envelops in the same manner by the tension of cords 329 which are trained over pulleys 330 and 331 and have weights 332 on their depending ends. These weights are made heavy enough to exert a pressure on the pack of envelops in the stacker sufficient to insure the sealing of the flaps to the backs of the envelopes and the adhesion of the stamps applied by the stamp affixing mechanism. The stacker table is made long enough to accommodate a large number of envelops which thus do not need to be removed until the capacity of the table is exhausted. When this occurs the accumulated envelops will be lifted from the table and the presser allowed to move back against the stop plates ready to act on the next batch by which it will be forced out as before.

To enable the tripping point of the stop plates of the stacker to be accurately adjusted as desired the collar 319 to which the trigger 317 is pivoted, is adjustably secured on the bar 303 by a set screw 333 (Figs. 9 and 24,) and a further adjustment is provided by an adjustable contact between the inner end of said trigger and the stop lug 324, consisting, as herein shown, of a set screw 334 tapped through the end of said trigger and locked in adjusted position by a check nut. The bar 303 which supports the pusher plate and the trigger carrying lug is herein shown as a round or cylindric bar, and to hold the parts against rotation a fixed guide bar 335 is mounted in the upwardly projecting ends 336 and 337 of the base plate lugs 304 and 305 in which said bar 303 is mounted, the collar 319 being grooved or slotted in its upper part 338 to embrace said guide bar, as shown in dotted lines in Fig. 2.

*Stamp affixing mechanism.*—The mechanism shown in this instance for detaching stamps in turn from the sheets in which they are supplied comprises clamping devices that tear the stamp from the sheet along the lines, of its perforation. The sheets of stamps are fed in behind a die plate 267 (Figs. 19, 20 and 21) which extend longitudinally above the rear edge of the channel 203 and may be said to form the back of the envelop passage (Fig. 6). This plate is shown as secured in its lower middle portion by screws 400 to the front ends of a pair of brackets 401 that project forwardly from the adjacent inner section of the base plate at a high enough level to clear the subjacent carrier jaw 200 (Figs. 6 and 9). At its lower right hand end the plate is further shown as secured by a screw 402 to a bracket 403 which projects upwardly and forwardly from the base plate (Figs. 1 and 9). Along the middle of its upper edge the die plate rests against the front end of the roof plate 272, of the spring-platen housing, but as herein shown no mechanical connection is provided at this point. The die plate itself is a long thin bar (Figs. 49, 50 and 51), preferably made of brass or similar material not subject to rust, and cut away in its lower middle portion at 404 to provide a stamp opening at a point opposite the position occupied by the upper right hand corner of the face of each envelop when the latter comes to rest at the end of its first transfer movement by the carrier. The die plate is made thick enough to afford ample strength but adjacent to said stamp opening is beveled from its front side back to a thin edge above and on both sides of said opening so that the stamp receiving surface of the envelops can be bent forward to receive the stamp until substantially in line with the back face of the plate. (Fig. 20). The die plate is furthermore provided at intervals throughout its length with slots or openings 405 extending downwardly from its upper edge to clear the jaws of the stamp carriage when they are in their downward position, as hereinafter described, and is also provided along its front face and just above the upper edge of the stamp opening 404, with a series of bosses 406 which constitute in effect a continuous rib that serves to keep the moistened face of the envelop away from the plate until it reaches the stamp opening, and similarly serves to keep the return cards or other matter freshly printed by the printing mechanism from becoming blotted or smeared by rubbing against said plate. To prevent their catching and resisting the movement of the envelop the right hand end of these several bosses are beveled back toward the edges of the adjacent jaw receiving openings 405, and the entire left hand edge of these openings are beveled in the same manner to the same end. The bosses 406 terminate toward the left end of the plate at a point just to the left of the middle of the plate by reason of the latter being cut away at 407 on its front side to make room for the retracted position of the push plate 300 of the stacker which has been heretofore described.

In accordance with the present design the corner of the envelop which is to receive the stamp and which has been moistened for the purpose is pressed forward into the beveled stamp opening 404 just as the envelop is released by the carrier jaws, by a spring pressed platen 408. This is herein shown as carried on the rear end of a sliding bar 409 which is mounted to reciprocate in a housing 410 that is secured by bolts 411 to upwardly projecting brackets 412 of the base plate, a spring 413 being placed around the bar 409 between the platen and housing to normally throw the platen forward against the envelop and bend the latter back into the stamp opening (Figs. 20—23). To normally hold the platen retracted so as to not interfere with the passage of the envelop a locking mechanism is provided. To this end the base 414 of the platen is extended rearwardly and provided with two downwardly projecting lugs 415 and 416 having a notch or recess 417 between them. A bell-crank lever 418 is pivoted at 419 to a rearwardly projecting bracket 420 of the housing 410, and the upper end 418ᵃ of this bell crank projects laterally between said lugs and into said notch or recess, the bell crank being normally held in its locked position by a spring 421 which extends between the lower end 422 of the bell crank and the lateral bracket 420 at a point 423 on the right hand side of said housing. Said lower end of the bell crank projects downwardly into position for contact with a surface 424 of the carrier plate (Figs. 16 and 44), and this contact is designed to occur just at the end of the advance movement of the carrier and almost simultaneously with the releasing of the advanced envelop by the carrier jaws, and will obviously serve to release the spring platen at this moment and bend the wetted corner of the envelop forward to receive the stamp and into the stamp opening, as before described. To enable the exact moment of the release of the platen to be regulated with great nicety the contact between the lower end of the bell crank and the carrier plate is made adjustable, in this instance by means of a set screw 425 which is tapped through the lower end of the lever and locked in adjusted position by a check nut (Fig. 2).

The movement of the platen toward the die plate is limited by a collar 426 on the outer end of the bar 409, said collar being clamped by a nut 427 against the shoulder on the bar and being faced with rubber or the like, as at 428, to cushion the shock caused by its coming in contact with the outer surface of the housing as the platen reaches the limit of its projection under the pressure of the spring 413. To further cushion this movement and obviate all jar which might ordinarily be caused thereby a second bell crank 429 is pivoted at 430 to the housing bracket 420 with its upper end projecting laterally forward and to the right to a point between the lug 415 and the depending lug 431 just beneath the platen. The lower end of this lever 429 is bent downward and forward and provided with a terminal boss 432 which is adapted for contact with an upwardly projecting boss or lug 433 on the carrier plate just above the contact surface 424, heretofore described. Then as the carrier reaches the inner end of its advance movement and trips the platen by its contact with the lever 418, it also strikes the lever 429 and, by throwing the upper end of the same forward against the lug 415, prevents the platen from being suddenly shot forward by its spring. The almost instant withdrawal of the carrier plate, however, as the carrier commences its return stroke permits the lever 429 to be forced back and the platen to be projected by the spring with sufficient force and quickness for the purpose intended yet without serious jar or noise.

A plunger head 450 acts from the rear upon the face of the stamp in opposition to the platen 408 and is carried on the front of a plunger frame 451 having a guide bar 452 which is mounted to reciprocate back and forth in a bracket 453 of the base of the machine. Behind this bracket said plunger frame is provided with two downwardly projecting lugs 454 and 455 the inner or proximate faces of which afford bearing surfaces for the roller covered wrist pins 456 and 457 of a pair of crank arms 458 and 459 that are secured on the main drive shaft 2. Said crank arms and their coöperative bearing surfaces are offset laterally with respect to each other so that each wrist pin can strike only the particular bearing surface with which it is intended to contact, and said bearing surfaces are furthermore offset vertically with relation to each other so that the contact of each wrist pin with its bearing surface can not occur until the other wrist pin has passed out of contact with the other bearing surface. The two crank arms may be adjustably secured to the shaft by set screws or the like (not herein illustrated) which conveniently permit of their angular adjustment, and may be either separate or cast integral with each other, as found desirable. The effect of this construction will be to project and retract the plunger head through the stamp, opening in the die plate and against the spring pressed platen once in each revolution of the drive shaft, and it will be noted that the connection is substantially like that heretofore described for reciprocating the separator operating bar 23. Any other suitable connection for reciprocating either device at the proper intervals may, however, be employed.

As herein shown the guide bar 452 is a round bar and the plunger frame is held against rotation thereon by a pair of set screws 460 which project inwardly towards each other from upwardly projecting lugs 461 of the base bracket 453, the heads of said set screws bearing against the opposite parallel side faces 462 of the plunger frame as the latter reciprocates between them so that by adjusting these set screws the plunger head can be adjusted laterally within the stamp opening.

The projection of the plunger through the opening in the die plate and against the platen serves to tightly clamp the stamp last fed in front of said opening against the moistened face of the envelop and clamps both stamp and envelop so firmly between the plunger head and platen that the stamp is readily torn from the sheet as the plunger continues to be projected against the tension of the platen spring, (Fig. 19). And this notwithstanding the fact that the head of the plunger is herein shown as considerably smaller than the area of the stamp which is itself smaller than the opening in the die plate. This tearing of the stamps loose from the sheet instead of cutting them has the advantage of dispensing with the close fitting of the plunger and die and obviates the difficulty caused by the dulling of these parts. It also necessitates, however, that the rest of the sheet of stamps should be clamped and held tightly while the stamp in front of the plunger is being torn loose. This clamping of the sheet is accomplished by a sheet clamp 463 made in the form of a hood or casing which loosely surrounds and partly incloses the plunger head and is arranged to be projected against the die plate with the sheet of stamps intervening just as the plunger starts forward (Figs. 19 and 20). As herein shown said clamp is rigidly mounted on the forward end of a pair of guide rods 464 which are mounted to reciprocate within parallel ears 465 of the machine base. The rear ends of these rods impinge on the lower ends of the two depending arms 466 of a double bell crank 467 that is mounted on a pin 468 extending between upwardly projecting base lugs 469, the pivotal body or barrel of the bell crank being just high enough above the subjacent plunger frame 451 to clear it, and the arms 466 of the bell-crank depending to engage the rods 464 on each side of said frame.

A bearing roller 470 is mounted on a pin 471 extending between forwardly projecting arms 472 of said bell crank and rests upon the top of the plunger frame. Said top of the frame is made with a lower surface or depression 473, that is occupied by the roller 470 when the plunger is in its retracted position (Fig. 20ᵃ), and with a higher surface 474 back of the surface 473, the two levels being connected by an incline 475 up which the roller rides to reach said higher surface when the plunger is projected. The lifting of the roller incident to its moving up this incline oscillates the bell-crank 467 to throw its depending arms 466 against the ends of the rods 464 and project the clamp forward against the die plate, the length of the incline being just sufficient to bring the clamp closely in contact with the die plate and the upper surface 474 of the plunger frame back of the incline 475 being of even level so that the clamp is held stationary against the die plate during the continued projection of the plunger and its subsequent retraction to the point at which the roller begins to descend the incline again. This latter movement releases the pressure of the double bell crank on the rods 464 and leaves the clamp free to move back, the return movement of the clamp being accomplished by the contact of a shoulder 476 on the back of the plunger head with the inner face 477 of the back wall of the clamp (Fig. 20ᵃ).

To cushion the impact of the bell crank arms 466 on the rods 464 and consequently of the clamp against the die plate, collars 478 are provided on the ends of said rods (Fig. 23ᵃ) and are permitted to have a limited sliding movement thereon by pin and slot fastening 479. These collars are long enough to inclose and project beyond the extremities of the rods and are constantly pressed in the direction of the ends of the rods by springs 480 which are inserted on the reduced ends of the rods between said collars and washers 481 that bear against the shoulders formed by reducing the ends of the rods.

With this construction the arms 466 of the bell crank do not act directly against the ends of the rods 464 but against the collars 478 from which their pressure is transmitted to the clamp through the springs 480 which consequently cushion the action. In the drawing the retracted position of the plunger head and clamp is shown in detail in Fig. 20ª. In Fig. 20 the plunger head is shown as advanced to the back of the die plate at which point it comes in contact with the stamp and, practically, with the face of the envelop which will have been bent into the stamp opening in the die plate after the manner shown in said Figs. 20 and 21.

Just as or before the plunger head strikes the stamp the clamp will have been forced against the sheet of stamps around the plunger, and in the further projection of the plunger the stamp will be torn from the sheet along the lines of perforation. The machine herein illustrated is designed with particular reference to the ordinary postage stamp the size of which is indicated by dotted lines $s$ in Fig. 21ª. The relative sizes and shapes of the plunger head 450 and the face of the clamp 463 is also shown in this view, and it will be noted that the plunger head is somewhat smaller than the stamp, while the interior opening of the clamp, which is made identical in shape with the upper portion of the stamp opening in the die plate, is wider and higher than the stamp, and the clamp is entirely cut away below said opening. This allows for a considerable variation in the position of the stamps as they are fed before the plunger without materially interfering with their successful detachment and application. The size of the plunger head is, however, sufficient to cause the stamp to adhere throughout the greater portion of its area and sufficiently for all practical purposes while the edges of the stamps are later sealed down and the adhesion of the stamp as a whole is completed and insured by the pressure to which the envelops are later subjected in the stacker. The face 482 of the clamp is desirably covered with rubber, or the like, to insure its holding the sheet firmly when the stamp is detached.

The operating connection, hereinbefore referred to, between the plunger mechanism and the stacker actuating bell crank 308, comprises an intermediate bell crank 483 which is pivoted to the base plate at 484 and connected at one end by a bolt 485 to a lug 486 that projects laterally from the front portion of the plunger frame 451 (Fig. 21ª), the other end of the bell crank 483 being pivotally connected by a link 487 with the adjacent end of the bell crank 308 (Fig. 9).

*Stamp carriage.*—The sheets of stamps to be fed before the plunger are placed in this machine upon a reciprocatory carriage 500 which is given a step by step movement across the machine back of the die plate and above the plunger first in one direction and then in the other, a new row of stamps being fed down at each end of the carriage movement and a new stamp being presented to the action of the plunger at each reciprocation of the latter whatever may be the position of the carriage or the direction in which it is traveling. The carriage herein shown comprises a base frame consisting of side bars 501 and 502, a front connecting bar 503, and a rear connecting bar 504 (Fig. 46). This frame rests and slides upon parallel guide rods 505 and 506 which extend nearly the full length of the machine parallel with the main drive shaft 2 but at a considerable elevation above the latter. Said guide rods are shown as supported at their left hand ends by brackets 507 and 508 which rise from the left edge of the base plate, and at their right hand ends by brackets 509 and 510 which rise from inner portions of the base plate near the right hand end of the machine. Clips 511 and 512 (Figs. 6 and 7ª) hold the carriage frame down upon the guide rods but may be readily removed to enable the carriage to be lifted off. The carriage fits closely, however, only about the rear guide bar 506 which alone is depended on to maintain the exact alinement of the carriage, and to stiffen this rear bar for this work of alinement an extra supporting bracket 513 is provided for it on the base plate about midway between its end supporting brackets 507 and 510. An arm 514 of the carriage frame extends laterally over this bracket when the carriage is at the left end of its movement and depends to the guide bar to provide the bearing of the carriage on the guide bar at this corner at a point always to the right of said supporting bracket so that the presence of the bracket does not interfere with the travel of the carriage, and said bar is lengthened at its right hand end (Fig. 1) to allow for the travel of this extended bearing. As herein shown both guide bars are adjustably mounted in their supporting brackets between set screws 516 and 517 which enable the bars to be raised or lowered and moved laterally at will and to be clamped firmly in any desired adjustment (Figs. 3, 4, 5 and 9).

About midway of the length of the carriage from front to rear is a rack 518 arranged parallel to the guide bars 505 and 506 and adapted to be engaged by the mechanism hereinafter described to produce a step by step reciprocation of the carriage. Said rack is herein shown as adjustably mounted on the carriage frame by bolt and slot connections 519 which secure it to a transverse frame bar 520 (Figs. 7 and 46). Exact adjustment of the rack is then secured by set screws 521 which are tapped through depending lugs 522 on the ends of said frame member, the latter being herein shown as extended at its right hand end beyond the necessary length of the rack bar in this direction.

*Carriage actuating mechanism.*—The step by step reciprocation of the carriage is herein shown as accomplished by two levers 523, 524 which are pivoted to the base plate at points 525 and 526, respectively, located at the rear of the drive shaft, and which are provided at their forward or free ends with driving pawls 527 and 528 that are arranged for operative engagement with the rack 518 of the carriage. These levers 523 and 524 are given a continuous oscillatory movement towards and from each other by suitable connections with the drive shaft 2, comprising in this instance roller covered wrist pins 529 and 530 (Fig. 29) which project downwardly from the lever into contact with a double cam 531 that is rigidly secured on said drive shaft to rotate therewith. As herein shown the wrist pin 529 bears only against the left hand end of the cam and the lever 523 is consequently positively moved thereby only during its oscillatory movement toward the left, its return movement to the right being accomplished by a compression spring 532 mounted on a rod 533 between a lug 534 of the base plate and a projecting ear 535 of the end of said lever, said rod 533 being herein shown as fastened in the lug 534 at one end and as projecting freely through an opening 536 in the ear 535 at its other end. (Figs. 4, 6, 9 and 29). The lever 524, on the other hand, is positively driven by the cam in both directions of oscillation, its stud 530 projecting to this end into a cam groove 537 of said cam, and it will be understood that, if preferred, the lever 523 may be positively driven in both directions in this manner also.

As a means of enabling the two levers 523 and 524 to be adjusted relatively to each other the wrist pin 529 of the lever 523 is herein shown (Figs. 29 and 33) as adjustably secured on said lever by means of a bracket 538, that is fastened transversely beneath said lever by screw and slot connections 539 and is provided at its end opposite the wrist pin with an upturned lug 540 through which an adjusting bolt 541 is passed into a tapped lug 542 of the lever, a check nut 543 serving to lock said bolt in any adjusted position desired.

The pawls 527 and 528 of the levers 523 and 524 are arranged to be swung out into operative contact with the rack bar or to be withdrawn or withheld therefrom in alternation to accomplish the intermittent movement of the carriage back and forth throughout the length of its travel. In the position of the parts shown in the general views of the drawings and in Fig. 29, the pawl 527 is projected but is just on the eve of being withdrawn, the carriage having just completed its movement to the left. Said pawl is normally held yieldingly in such projected position by a spring 544 applied between the pawl and its supporting lever 523, but may be oscillated out of operative relation to the rack bar by a locking pawl 545 which is pivoted on the lever and made in the shape of a bell crank with one of its ends overlapping the rear end or tail of the pawl 527. This locking pawl is in turn arranged to be oscillated by two dogs 546 and 547 which are also made in the shape of bell cranks and are pivoted at 548 and 549 to upwardly projecting brackets 550 and 551 of the base plate. Studs 552 and 553 on the tail ends of these dogs are shown as yieldingly connected by a spring 554 which holds them firmly against oppositely facing shoulders 555 and 556 of a reversing bar 557. The latter is mounted to slide longitudinally of the carriage movement between guide screws 558 and 559 upon the top of the bracket 550 at one end and another base bracket 560 at its other end, opposite contact faces 561 and 562 being provided on the bar in position to be struck by contact points 563 and 564 on the carriage frame as the latter approaches the limit of its movement in either direction (Figs. 29 and 32). These contact points and surfaces are desirably made relatively adjustable, the contacts 563 and 564 on the carriage frame taking the form, as herein shown, of set screws which are threaded through lugs 564ᵃ on the frame and are provided with check nuts by which they may be locked in any adjustment (Figs. 5, 47 and 48). Fig. 29 shows this reversing bar as having just been shifted to the left by the carriage contact 564 as the carriage completed its movement in this direction. This shifting of the bar has forced its shoulder 555 against the end stud 552 of the dog 546 and swung the nose of said dog back out of the path of movement of the rear end of the locking pawl 545. At the same time the tension of the spring 554 has maintained the end stud 553 of the dog 547 in contact with the shoulder 556 of the bar and swung the nose of said dog forward into proximity to the rear end of said locking pawl, so that in the next movement of the lever to the right said locking pawl will be oscillated to swing the pawl 527 back out of engagement with the rack bar. Said pawls are then maintained in this new position by so shaping their contacting end surfaces that they cannot become disengaged without first causing a slight elongation of the spring 544, the tension of which thus resists such return movement. A pin or stop 565 prevents the locking pawl from swinging around so far that its rear end will clear the nose of the dog 547 instead of being oscillated thereby. The other lever 524 is provided in the same manner as the arm 523 with a spring 566 applied between the arm and its pawl 528 and tending to hold the latter normally projected, and is also provided with a locking pawl 567 for holding the pawl 528 retracted at times in opposition to said spring. Two dogs 568 and 569, similar to the dogs 546 and 547, are similarly pivoted at 570 and 571, respectively, the former to the upwardly projecting bracket 551 to which the dog 547 is pivoted, and the latter to the upwardly projecting bracket 560 that carries the screws 559 between which the reversing bar 557 is mounted to slide at its right hand end. Said dogs 568 and 569 are also provided with tail studs 572 and 573 that are yieldingly connected in the same manner as the tail studs of the dogs 546 and 547, by a spring 574 which tends to hold them in contact with two other oppositely facing shoulders 575 and 576 provided on the reversing bar like the shoulders 555 and 556 which engage the tail studs of said dogs 546 and 547.

Throughout the travel of the carriage to the left prior to the shifting of the reversing bar to the left as the carriage approaches the extremity of its movement in this direction, as hereinbefore described, the dogs 568 and 569 will occupy the position shown in Fig. 32, and the first succeeding oscillation of the lever after the dogs have assumed this position will have brought the tail of the locking pawl 567 into contact with the nose of the dog 568 and swung said locking pawl around to withdraw the driving pawl 528 from the rack bar 518, as shown in Fig. 29. This condition will then have continued until by the shifting of the reversing bar to the left, as stated, the dog 568 will have been swung back by the contact of the shoulder 575 of the reversing bar with its tail stud 572, and the dog 569 swung forward by the tension of the spring 574 on its tail stud 573. This movement of the dogs will occur during the swinging part of the levers 523 and 524 by which the last impulse towards the left is given to the carriage by the driving pawl 527, so that the locking pawl 567 will be directly in front of the dog 569 when the latter swings forward and said dog will at first simply strike against and be temporarily checked by the tail of said locking pawl, as shown in Fig. 29. But as said levers swing in again the locking pawl is carried laterally from in front of the dog which then instantly swings in behind the tail of the pawl, as shown in Fig. 30, so that in the next outward movement of the levers said locking pawl will be oscillated by contact with said dog and will release the driving pawl 528 which will thereupon swing forward against the rack bar under the tension of the spring 566. As indicated in dotted lines in said Fig. 30, however, the contact of the driving pawl 528 with the rack occurs after the arm has started to the right so far that the end of the pawl strikes upon the top of the last tooth 577 of the rack bar and instead of actuating the latter simply slides forward over said tooth, as shown in Fig. 31, and it is not until the next succeeding oscillation of the arm that the pawl drops in between the teeth of the rack and begins the intermittent movement of the carriage to the right. The operation thus involves one lost movement of the arms 523 and 524 between the last impulse toward the left given to the carriage by the driving pawl 527 and the first impulse toward the right given to the carriage by the driving pawl 528, this lost movement coinciding with one revolution of the drive shaft and resulting in a dwell of one interval occurring at the reversing point of the carriage movement. This dwell allows for the feeding forward of a succeeding row of stamps, by mechanism of the carriage hereinafter to be described, after the detachment of the last stamp of the preceding row by the affixing mechanism, and time for detachment of the first stamp of this succeeding row in the next stroke of the affixing mechanism before the carriage starts back to bring the succeeding stamps of this row into line with said affixing mechanism. The same operation and resulting dwell will also occur at the right hand end of the carriage movement after it has completed its travel in this direction. The rack bar 557 at this time will be shifted by the contact of the screw 563 on the carriage with the shoulder 561 on the bar, and will simultaneously swing back the dogs 547 and 569 and, through the action of the springs 554 and 574, swing forward the dogs 546 and 568 (Fig. 32). In the next inward movement of the levers 523 and 524 the locking pawl 567 will then come in contact with the dog 568 and be swung back to withdraw the driving pawl 528 from its operative engagement with the rack bar (Fig. 29). In the meantime the dog 546 will have been checked in its forward movement by striking the tail of the locking pawl 545 (Fig. 32), but as said pawl is carried in by said inward movement of the levers said dog will swing forward behind said locking pawl and in the succeeding outward movement of the arms will strike said locking pawl and release the driving pawl 527 and permit the latter to be thrown out by its spring 544 into contact with the rack bar again (Fig. 29). This contact of this driving pawl with the rack bar will, however, occur so late in the outward movement of the levers that the pawl will strike the top of the last tooth 578 at the left end of the rack bar (as shown in dotted lines in Fig. 32) instead of entering behind the latter and during the remainder of this stroke said pawl will simply slide forward over the top of the tooth, in the same manner as heretofore described in connection with the operation of the other driving pawl 528, so that it will not be until the succeeding outward movement of the arms that it will operatively engage the rack to start the carriage to the left once more. The dwell of one interval will thus occur at this end also of the carriage movement and with the same effect in permitting the feeding forward of another row of stamps. A pin 579 in the arm 524 located similarly to the pin 565 in the arm 523 serves as a stop to limit the outward movement of the locking pawl 567 of the arm.

To enable the movement of the carriage to be stopped at any time without stopping the rest of the machine, a clutch 580 controlled by a hand lever 581 that is pivoted to the base plate at 582 is provided between the driving cam 531 and the drive shaft 2, with a removable pin 583 in the rear end of the hand lever being adapted to engage either of two holes 584 in the base plate to lock the clutch out or in as desired.

*Sheet supply.*—Among the most important features of the present invention are those means by which stamps can be supplied to the carriage in a plurality of sheets which are automatically fed forward in the operation of the machine to supply stamps to the affixing mechanism in uniform succession and without any interruption or break in the operations from the time the first stamp of the first sheet is affixed to the first envelop, to the time when the last stamp of the last sheet is exhausted. Postage stamps are usually supplied by the U. S. Government in sheets of one hundred stamps each and the machine herein shown is arranged to receive ten such sheets so that its capacity will be the stamping of one thousand envelops without stopping to reload the carriage with stamps. It will be obvious, however, from the description hereinafter given, that the same principles of construction might obtain in a machine designed to receive either a greater or less number of sheets of stamps, or sheets of stamps containing less or more than one hundred stamps, and it will also be understood that the machine may be loaded with stamps to as much less than its full capacity as may prove convenient and will still operate with perfect continuity to the extent of the stamps provided.

As herein shown the several sheets of stamps are placed in a magazine consisting of a series of trays 600 that are arranged one above the other within the middle of the carriage frame work. The uppermost plate is suspended by bolts 601 from a three armed yoke 602 which is mounted to be movable vertically upon guide rods 602ª that project upwardly from the side bars 501 and 502 of the carriage frame work, and the succeeding lower trays are carried by rivets or double headed bolts 603 which suspend each tray in turn from the tray above it (Figs. 1, 4 and 7.) The shanks of these rivets extend loosely through the trays so that the latter are free to move vertically on the rivets to the extent of the distance between the heads of the latter, and the rest of the trays are cut away, as at 604, (Fig. 1) at points in line with the rivets which connect any two trays so that said rivets can telescope through the other trays and permit the magazine to fold together when the yoke 602 is lowered while holding the trays suspended at uniform distances apart when said yoke is raised. To avoid interference with the sheets of stamps said rivets are shown as arranged in three clusters or banks (Fig. 1), one on each side of the trays beneath the front ends of the yoke 602 and one at the rear of the trays about midway of their width and beneath the extremity of the rear arm of said yoke, the plates being extended at these points beyond the area required for the sheets of stamps to provide for the insertion of the rivets.

The yoke 602 is herein shown as suspended by a pivotal link 605 Fig. 7 from the front end of a frame 606 that is pivoted at its rear edge 607 upon a transverse rod 608, Fig. 1 said rod being mounted in the upper ends of upwardly projecting brackets 609 which form the rear extremities of the side bars 501 of the carriage frame Figs. 7 and 48. To provide a removable connection between the yoke 602 and its supporting frame 607, the link 605 is shown as entering an open recess between lugs 610 of said yoke and as terminating in a cross bar 611 which enters a notch 612 in the under side of said lugs Fig. 7ᵃ, so that by lifting the yoke slightly the link may be swung out of said recess and the frame 607 swung back to permit the yoke and trays to be lifted clear of the carriage. The lifting out of the plates in this manner by the yoke 602 will cause them to drop apart to the extent permitted by their connecting rivets 603, and the sheet of stamps are then introduced between them, one sheet upon each plate, from their front ends at which they are opened to receive said sheets. The plates are then set back in the carriage, the frame 607 dropped down, and the link 605 swung into the recess between the lugs 610 of the yoke to suspend the latter, vertical guide bars 613 being provided on the side and rear bars of the carriage frame (Figs. 1, 7 and 46) to insure the exact location of the sheets of stamps within the carriage when their supporting plates are thus placed in position.

The height at which the yoke and plates are suspended is governed by a stepped crown cam 614 which is located on the right hand side of the carriage, and upon which a projecting bracket or arm 615 of the frame 606 rests to support the front end of the latter (Figs. 1 & 6). Said cam is revolubly mounted upon a bracket 616 which projects upwardly just at the right of the right side frame bar 502, and from the base of which a brace 617 leads rearwardly and outwardly to the end of the arm 514 of the carriage (Fig. 46). A toothed segment 618 is rigidly secured to the lower end of the cam to rotate therewith, and the teeth of this segment are engaged in succession by a pawl 619 that is mounted upon a ratchet wheel 620 to rotate therewith, (Fig. 1) the segment and consequently the cam being advanced one tooth by the action of said pawl in each revolution of said ratchet wheel. The latter is actuated by a pawl 621 which is pivotally secured at 622 upon a sliding bar 623 that is mounted between guide screws 624 on the carriage frame at the rear of the stamp supporting trays (Fig. 46). The extremities of this bar are provided with contact points, herein shown as formed by adjustable set screws 625, that are arranged to strike stationary stop lugs 626 and 627 and so shift the bar at each end of the carriage movement, said stop lugs being herein shown as projecting upward from the brackets 508 and 510 that support the ends of the rear track bar 506 upon which the carriage slides (Figs. 1, 3 & 4). A pin 628 limits the movement of the pawl 621 in one direction while a spring 629 permits it to yield in the opposite direction but normally returns it against said pin, and the arrangement of the parts and direction of the teeth of the ratchet wheel 620 is such that the latter is rotated one tooth by the pawl when the bar is shifted at the left hand end of the carriage movement, the pawl snapping back past the ratchet wheel without affecting the latter when the bar is shifted in the other direction at the right hand end of the carriage movement. The ratchet wheel 620 is revolubly mounted at 630 upon the frame brace 617 and is prevented from backward rotation by a stop pawl 631 which is pivoted at 632 to said brace and is maintained yieldingly in contact with the ratchet by spring 633.

An adjustment of the ratchet wheel pawl 619 is also shown as conveniently provided for by mounting the pawl 619 to rotate upon the axis of the ratchet wheel and varying its angular adjustment thereon by a set screw 634 which is tapped through a lug 635 on said wheel in position to engage the pawl.

In the present machine, which is designed to receive ten sheets of stamps, the trays 600 are nine in number and the same number of steps 636 are provided on the cam 613. This cam is so adjusted that at the beginning of the operations the arm 615 of the frame 606 rests upon the top step or end of the cam and hold said frame at such an elevation as to suspend the lowermost tray one step above the level of a guide plate 637 at the front of the carriage over which the sheets are fed to the affixing mechanism, as hereinafter described. Then in the subsequent operation of the machine the ratchet wheel 620 will be rotated one tooth for each double reciprocation of the carriage and once in each revolution of said ratchet wheel its pawl 619 will engage the segment 618 and rotate the latter by one tooth, and as the number of teeth in this segment correspond exactly with the steps of the cam 613, the latter will also be rotated one step at each revolution of the ratchet wheel. This permits the frame 606 to drop down step by step and will first lower the lowermost tray 600 to the level of the guide plate 637, and then in succession lower each of the other trays to this level until finally the ninth and last tray occupies the level of said guide plate when the frame bar or arm 616 rests upon the lowest step of the cam. As the trays are thus lowered they will occupy the central space in the lower part of carriage frame and pile up upon the bottom plate 638 thereof, their connecting rivets telescoping through the trays, as hereinbefore described, to permit the trays to be thus closed together (Fig. 7). The object of thus supporting the trays so that the lowermost plate occupies a position one step above the guide plate 637 at the beginning of operations, is to leave room beneath said lowermost plate for the previous introduction by hand of a first sheet of stamps, making ten sheets in all, this first sheet being fed forward over the guide plate 637 until its first row of stamps is in line with the affixing mechanism and in position to permit the detachment of the first stamp in the first revolution of the drive shaft. This in practice, with the parts proportioned as herein shown, calls for the projection of about four rows of stamps in front of the front frame bar 503 of the carriage frame, leaving the rear portion of the sheet, to the extent of about six rows of stamps, depending into the central space of the carriage beneath the suspended trays 600 and resting at its rear edge upon the bottom plate 638 of the carriage (Fig. 7ᵃ). As soon as this first sheet is fed forward these last six rows, the suspended trays are lowered to supply the next succeeding sheet of stamps immediately in continuation of the first sheet. To this end the ratchet wheel 620 is turned to such a position at the commencement of operations that its pawl 619 will strike the toothed segment 618 and give the cam a rotary movement to lower the trays by one step at the end of the third complete double reciprocation of the carriage after starting. This brings said lowermost tray into operative position after only six rows of the first sheet of stamps have been exhausted and the sheet fed forward to that extent, but in the succeeding operation of the machine the lowering of the successive trays 600 will occur in each case only after a complete revolution of the ratchet wheel or five complete double reciprocations of the carriage, said ratchet wheel being provided as shown, with five teeth so that it revolves once for every one hundred strokes of the affixing mechanism by which the ordinary sheet of one hundred stamps will have been exhausted.

The feeding forward of the sheets of stamps row by row is accomplished by a pair of jaws 700 and 701 located at the front of the carriage and arranged to swing back and forth with each reciprocation of the carriage as hereinafter more fully described. Additional devices are, however, herein shown as provided for moving each sheet after the first sheet forward on its supporting tray far enough to bring its front edge into position to be seized by said jaws when its tray is lowered to the level of the guide plate 637. To this end a pusher frame 639 is mounted to slide upon the rear frame bar 504 and upon a bracket 640 which projects rearwardly from the middle of said frame bar, screws 641 and 642 being passed through slots into said frame bar and bracket to secure the pusher frame movably thereon. (Figs. 1 & 7). At its rear end this pusher frame is provided with a roller covered pin 643 which projects downwardly behind a stationary cam bar 644 at the rear of the machine frame. This bar inclines forward towards its right hand end and behind this right hand portion another cam bar 645 is arranged in substantially parallel relation so as to form a cam groove 646 between the bars. In the movement of the carriage to the right the pin 643 is carried into this groove and forced forward so as to advance the pusher frame, while in the return movement of the carriage to the left the pin is drawn back and the pusher frame thereby retracted. The front end of the pusher frame is shown as bifurcated to avoid interference with the rear cluster of the plate connecting rivets 603, and said trays are shown as cut away at 645$^a$ in front of the bifurcated ends of the pusher to permit the reciprocation of the latter. The pusher is arranged substantially on a level with the back of the guide plate 637 to which level the trays 600 are lowered in turn, and as the pusher is projected in the first right hand movement of the carriage subsequent to the lowering of the plate it will engage the rear edge of the sheet of stamps lying upon that tray which occupies for the time being the level of said guide plate 637, and slide said sheet forward to the extent of the forward inclination of the groove 646 or sufficiently to advance the front edge of the sheet between the jaws 700 and 701 in exact succession or edge to edge with the rear end of the preceding sheet which has already passed fully between the jaws. The front end 647 of the pusher may be desirably notched, as shown in Fig. 7, to more certainly engage the sheet of stamps and is made just thick enough to engage the one sheet without disturbing the sheet on the tray above.

To provide for adjustment the pusher frame is herein shown as made in two sections which are clamped together by means of screws 648 and held apart by screws 649 so that by adjusting said screws the sections may be locked in any desired relation and the distance between the front end of the pusher and its wrist pin 643 varied accordingly.

The cam bars 644 and 645 are herein shown as cast integral with a common base plate 650 which is secured to an upwardly projecting bracket 651 of the machine frame by screws 652, the bar 644 being extended considerably to the left of said base plate and of the bar 645 (Figs. 1 and 5).

*Row feeding mechanism.* The sheet of stamps is directed between the jaws 700 and 701 by and between the lower guide plate 637, heretofore referred to, and an upper guide plate 702 arranged parallel with and in close proximity to the lower guide plate (Fig. 7) but with a space 703 between them wide enough for the stamps to pass readily through it; the ends of this space being closed by curved strips 703$^a$ (Figs. 6 & 8) which are secured to the lateral ends of the guide plate 702 by screws 703$^b$ and which serves as guides for the lateral edges of the sheets of stamps.

The lower guide plate is shown as formed of sheet metal, and as secured by screws 704 (Fig. 1) to the top edge of the front bar 503 of the carriage frame from which it curves downwardly and forwardly behind the die plate 267. The upper guide plate is shown as made in four sections which are secured by screws 705 to an upper front bar 706 of the carriage, and which also curve downwardly and forwardly, like the guide plate 637, to a point just behind and above the upper edge of said die plate, the sections of the upper guide plate being spaced far enough apart to allow the upper jaws 700 to project down between them as shown at 708 in Fig. 8. Said upper jaws are rigid with a connecting jaw bar 709 (Figs. 52, 53 & 54) which extends across the front of the carriage and is mounted at its ends in swinging frames 710. (Fig. 58.) These frames are pivoted at 711 to downwardly and forwardly projecting lugs 712 of the carriage frame and are each provided with upper and lower inwardly projecting lugs 713 and 714 between which a radially extending guide rod 715 is rigidly secured, and the jaw bar 709 is mounted in the frames by being apertured at its ends 716 to slide upon these guide rods. In the same manner the lower jaws 701 are mounted rigidly upon a lower jaw bar 717 (Figs. 55, 56 & 57) that is apertured at its ends 718 to fit and slide upon said guide rod, the lower guide plate 637 being slotted at 719 to permit the lower jaws to project up through the guide plate into contact with the upper jaws 700.

The engaging or operative surfaces of the jaws are curved concentrically to the pivot points 711 of the supporting frame and to correspond with the curves of the guide plates 637 and 702 which are also curved concentrically to the frame pivots so that the jaws may close upon and hold the sheets of stamps while passing through between said guide plates.

The jaws are normally drawn together to grasp the sheet by springs 720 applied between the jaw bars near their ends, (Fig. 8), and when thus drawn together are located in mid-position on the guide rods 715 by lugs 721 of the supporting side frames which project between rigid fingers 722 that extend out from the ends of the jaw bars beyond the guide rod.

The separation of the jaws to release the sheets is accomplished by two sets of bell crank levers 723 and 724, which are pivoted at 725 to the inner faces of the swinging frames 710, and the forward ends of which extend between the fingers 722 of the adjacent ends of the jaw bars (Fig. 25). The rear ends of both sets of these bell cranks diverge, and are connected by links or chains 726, to stationary stops or bolts 727 that are herein shown as adjustably mounted in upwardly projecting brackets 728 of the side bars of the carriage. These chains are of such length that as the jaws are swung forward the chains become taut at or about the limit of such forward movement and thereby oscillate the bell cranks to force their forward ends apart between the jaw fingers 622 and thus separate the jaws. This forward movement of the jaws during which they are closed upon the intervening sheet of stamps is designed to feed the sheet forward to the extent of one row of stamps and is arranged to take place as the carriage reaches the end of its movement in either direction after the last stamp of the foremost row has been detached by the affixing mechanism. The jaws being thus opened to release the sheet after it has thus been fed forward, are immediately swung back in their open position and remain apart until the carriage reaches approximately the next limit of its movement or travel in the other direction, when they are allowed to close again and are again swung down to feed forward still another row of stamps.

The mechanism shown for holding the jaws apart comprises a pair of locking plates 729 which are secured by screw and slot connections 730 to the outer faces of the swinging frames 710, and the lower ends 731 of which project forward and are also adapted to enter between the jaw bar fingers 722. Springs 732 are applied between said frames and plates to normally move the latter forward and when the jaws are forced apart by the bell cranks 723 and 724, as hereinbefore described, these springs project said ends 731 of the locking plates between the jaw bar fingers to hold the jaws apart. Having thus entered between the fingers, the locking plates will remain in this position and continue to hold the jaws separated until the carriage reaches the limit of its travel again when they will be retracted to permit the springs 720 to close the jaws again. This retraction of the locking plates is herein shown as accomplished by a releasing bar 733 (Fig. 8) which is mounted to slide longitudinally upon the upper ends of the swinging frames 710 by screw and slot connections 734 and which is provided on its rear side with cam lugs 735 that are adapted to engage roller covered studs 736 which project upwardly from the locking plates. The ends of the releasing bar, which are herein shown as provided with adjustable contact screws 737, are adapted to strike relatively stationary stop surfaces 738 and 739 and thus shift the bar as the carriage approaches the limit of its movement in either direction, such shifting of the bar causing the cam lugs 735 to force back the studs 736 and thus retract the locking plate from between the jaw fingers. The contact surface 738 upon the end of the carriage movement to the left is herein shown as formed by an upwardly projecting flange of the upper stop plate 301 of the stacker (Figs. 1, 2 and 4). This flange or plate is made of considerable area to allow for the separate oscillatory movements of the jaws or stacker blade, the point of contact with the rod being liable to be either near the top of the flange, as shown in dotted lines at 740, or near the bottom of the flange, as shown in dotted lines at 741 (Fig. 24). The contact surface 739 at the other end of the carriage movement is herein shown as formed by an arm of the upwardly projecting tank supporting standard 50 of the bracket 51 hereinbefore described (Figs. 3 and 37).

The frames 709 are herein shown as oscillated to swing the jaws back and forth by connecting rods or links 742 (Figs. 1, 4 and 6) the front ends of which are pivotally connected at 743 to said frames while their rear ends are pivotally connected at 744 to the adjustable side arms 745 of a swinging frame 746 that is mounted on the transverse bearing rod 608 at the back of the carriage, the adjustment between said arms and frame being herein shown as accomplished by clamping screws 747 and spacing screws 748 by means of which the arms may be locked in any desired relation to said frame. An upper cross bar 749 (Fig. 5) gives strength and rigidity to the frame 746, and a lower cross bar 750 serves the same purpose and also serves to engage the devices by which the frame is oscillated to accomplish the movement of the jaws, and by which it is normally held retracted to maintain the jaws in their upper or rearmost position. The latter devices are constructed as follows: The frame 746 is normally held retracted by a locking bell crank 751 (Fig. 28) which is pivoted at 752 to an upwardly projecting bracket 753 that is secured by screws 754 to the base of the machine at the rear edge thereof (Figs. 5 & 6), a spring 755 being applied to normally maintain the lip 756 of this bell crank up in front of the lower cross bar 750 of said frame. At each end of the carriage movement, however, said locking bell crank is oscillated to release the bar and frame by a continuously vibrating lever 757 (Figs. 26 and 27) which is pivoted to the machine base at 758 and is actuated by a link 759 which connects the lever with a laterally projecting arm 760 of the right hand lever 524 of the carriage actuating mechanism (Fig. 9). The lever 757 does not come directly into contact with the locking bell crank but is provided with a depending lug 761 that is adapted to strike a pawl 762 and force the latter against an adjustable contact screw 763 in the lower end of said bell crank, said pawl being pivotally mounted at 764 on a lever 765 and being raised high enough to be struck by the lug 761 only when the lever 765 is swung up to its highest position. This lifting of the lever 765 is accomplished once in every ten revolutions of the drive shaft by a lug 766, which is secured to the face of a ten toothed ratchet wheel 767 (Fig. 6) to rotate therewith, and which extends beneath the end of a laterally projecting finger 768 of the lever 765. (Figs. 26, 27 and 28). This ratchet wheel is revolubly mounted at 769 on a bracket 770 that is secured to the underside of the machine base by screws 771, and is actuated by a pawl 772, which is pivoted at 773 to a depending transverse flange 774 of the lever 757, and is yieldingly directed toward the ratchet wheel by a spring 775 that normally holds the rear end of the pawl up against the screw 776 to which the spring is secured, reverse rotation of the ratchet being prevented by a spring pressed pawl 777 on the face of said ratchet wheel supporting bracket 770. The said arm or lever 765 is pivoted at 778 to a depending bracket 779 that is secured beneath the machine base by screws 780. At its rear or free end it is shown as cut down to receive the pawl 762 and is provided with a spring 781 that is secured to the lever by a screw 782 and is bent around the end of the lever to engage the back of the pawl and normally hold the latter pressed forward away from the locking bell crank.

Oscillation of the frame 746 to actuate the jaws of the stamp carriage is accomplished when the locking bell crank is withdrawn from the frame bar 750, by a dog 783 which is pivotally mounted at 783ᵃ on the end of the lever 757, and adapted to strike the back of the bar 750 to force the frame forward, and by a lug 784 which projects upwardly from the end of the lever 757 in front of the bar 750 and is adapted to swing the frame back. The free forward end of the pivoted dog 783 rests upon a spring 785 which is attached by screws 786 to the top of the lever arm 765, and in the normal lowered position of the latter this spring is so low down that the upper end of the pawl vibrates back and forth upon it beneath the frame bar 750 without coming in contact with the latter, the lug 784 vibrating freely back and forth in the meantime in front of the frame bar 750 as the latter is held back in its rearmost position by the locking bell crank 751. The lifting of the arm 765 by which the pawl 762 is raised between the lug 761 and the locking lever so that the latter is immediately thereafter oscillated by the lever 757 to release the frame bar 750, also lifts the dog 783 into position to strike said frame bar and swing the frame 746 forward in the next succeeding forward movement of said lever 757. This lifting of the dog 783 occurs in practice when the lever 757 is swung forward and the spring 785 is provided to permit the dog to be drawn back beneath the frame bar and then force it up behind the bar ready to engage the latter in said succeeding forward movement of said lever. Being fixed on the lever 757 the lug 784 of course moves forward with the lever and the dog 783 without interfering with the forward swinging of the frame, but immediately engages the frame bar 750 to swing the frame back again in the return movement of the lever. In the meantime the bracket or finger 766 will have been carried from beneath the lug 768 of the arm 765, thereby lowering the pawl 762 from its position of engagement with the lug 761, and permitting the spring 755 to return the locking lever to its operative position so that as the frame is thus returned said locking lever will snap up in front of the bar 750 and hold the frame retracted again. As herein shown the dog 783 is not pivoted directly to the lever 757 but to a clip 757ᵃ which is adjustably secured to said lever by screw and slot connections 757ᵇ, this arrangement permitting the dog to be adjusted to strike the frame 746 sooner or later as desired. Said rame is thus given one complete oscillation forward and back every tenth revolution of the drive shaft and this oscillation is timed to occur just after the detachment of the last stamp of the row at the limits of the carriage movement in each direction, and the accompanying movement of the jaws 700 and 701 caused by such oscillation of the frame 746 serves then to feed forward a succeeding row of stamps in time for the detachment of the first stamp by the affixing mechanism during the interval of dwell in the carriage movement heretofore described. In this operation the jaws close upon the sheet just previous to swinging forward, by reason of the retraction of the locking frames 729 by the shifting of the bar 733, as before described, but are opened again to release the sheet as they approach the limit of their forward swing by the pull of the chains 726 on the bell crank 723 and 724, and then swing back immediately while still open and consequently do not affect the position of the sheet during such backward movement. They then remain stationary in their upper position during the succeeding travel of the carriage until the latter is reversed again.

In order that the stamps may be directed to the affixing mechanism as accurately and as certainly as is possible, the lower edge of the lower guide plate 637 is extended downwardly back of the die plate to a point below the upper part of the clamp 463 of the affixing mechanism, and even below the upper portion of the plunger head 450. This is rendered possible by cutting away said lower edge of the plate so to merely leave downwardly projecting fingers 787, and by cutting away the face of said clamp 463 at 788 and the upper corners of the plunger at 789 to avoid said fingers, the latter being so spaced that they will all register with said cut away portions of the clamp and plunger when brought into proximity therewith in the course of the carriage movement.

To hold the sheet stationary within the carriage when not engaged by the jaws, a pair of sheet holders 790 (Figs. 7 and 34) are pivoted at 791 between bracket lugs 792 which project forwardly from the front bar 503 of the carriage frame. These holders are located between the lower jaws beneath the lower guide plate and are cut away at their lower front ends 793 so that they project through between the fingers 787 of the lower edge of said guide plate and are adapted for contact with the upper guide plate 702. Springs 794 (Fig. 7) are applied to the rear end of these sheet holders to normally hold their front ends thus in contact with the upper guide plate and to consequently bind the intervening sheet of stamps securely against said guide plate. The sheet holders are, however, withdrawn momentarily at each end of the carriage movement just previous to the downward movement of the jaws, and then allowed to close upon the sheet after the jaws open at the close of their downward movement. To accomplish this a rod 795 (Figs. 7 and 25) is extended transversely across the carriage beneath the rear ends of the holders between the front ends of the bell crank levers 796 which are pivoted to the opposite sides of the carriage frame at 797, the upper rear ends of the bell cranks being provided with laterally projecting studs or pins 798. Sliding frames 799 are then secured to the sides of the carriage by screw and slot connections 800, and are provided with lugs 801 which project upwardly in front of the bell crank studs 798. These frames are normally held in their forward position by springs 802 but are drawn back at each end of the carriage movement by the contact of roller covered studs 803 which depend from their rear ends with cam lugs 804 on a stationary bar 805 (Figs. 9 and 38). The latter extends longitudinally beneath the carriage and is secured by screws 806 to brackets 807 and 808 (Figs. 3 and 4) which rise from the machine base, and its cam lugs 804 are provided in pairs so spaced that they act simultaneously upon the frame studs 803 to reciprocate the frames 799. The forcing back of the frames in this manner moves their lugs 801 back against the studs 798 and oscillates the bell crank 796, thereby raising the rod 795 and lifting the rear ends of the sheet holders so as to depress their front ends and release the sheet, this position of the parts continuing until the carriage starts on its return movement and carries the studs 803 clear of the cam lugs 804 again. In addition to these sheet holders a row clamp is herein shown as provided to hold the lowermost edge of the sheet after it is fed down in front of the plunger and particularly to hold the last row of stamps on each sheet, the sheet holder before described being too high up to engage this final row when thus fed down. This clamp is shown in this instance as formed by two clamp bars 809 and 810 (Figs. 7 and 8) which extend transversely of the carriage and are supported at their ends by pairs of guide bars 811 and 812, these guide bars being mounted to slide through lugs 813 that depend from the front of the carriage frame just below the lugs 712 to which the jaw supporting frames are pivoted. The front clamp bar 809 is provided at the front edge with a flange 814 which projects upwardly in front of the stamps between them and the die plate 267, the latter being shown as recessed at 815 to make room for this clamp bar. The rear clamp bar 810 rests upon the body of the clamp bar 809 and its front edge is arranged to contact with the rear face of the flange 814 to clamp the lower edges of the stamps between them.

The rear ends of the guide rods 812 of the rear clamp bar are shown as secured to depending brackets 816 of the side frames 799 which actuate the sheet holder so that said rear clamp bar is moved back and forth with said frame (Fig. 25). The supporting guide rods 811 of the front clamp bar, on the other hand, engage the lower ends of short levers 817 which are pivoted at 818 to the sides of the carriage and the upper ends of which project into notches 819 of said frame 799, the connection between the guide rods 811 and the levers 817 being made adjustable by reason of nuts 820 on said rods between which the end of the lever operates. With this construction the jaws are normally held closed by springs 802 of the frames 799, the forward movement of the latter due to these springs acting directly to move the rear clamp bar forward, and acting to move the front clamp bar backward against the rear clamp bar through the engagement of the levers 817 with the notches 819 of said frames. In the operation of the machine the row clamp thus described will close upon the row of stamps very shortly after the carriage starts on its return movement in either direction and will remain closed until the carriage reaches the end of its movement in that direction. During the short interval at the beginning of the movement before the clamp closes, the row will be pushed along toward the affixing mechanism by the contact of its ends with the guide strip 703' at that end of the jaws opposite to the direction in which the carriage is moving but the closing of the clamp almost immediately after the start will subsequently hold the row firmly in place in the carriage to be fed forward therewith. At the same time the grip of the clamp on the lower edge of each stamp will not be tight enough to interfere with the separation of the stamp by the forward movement of the plunger and spring platen, the greater area of contact of the latter and their more secure hold upon the stamp serving to draw its lower edge from between the jaws of the row clamp. The opening of the row clamp at the end of the carriage movement will entirely release the last stamp of the row for an instant just preceding the projection of the plunger against it but during this instant it will be held from falling backward by the adjacent downwardly projecting fingers 787 of the lower guide plate 637 of the carriage, and from falling forward by two small downwardly projecting springs 821 which are secured to the back of the die plate at the upper corner of its stamp opening in position to engage the upper corners of the stamp (Fig. 51), the cut away corners 789 of the plunger enabling the latter to be projected through the die plate without striking these springs, and the corners of the stamp being simply turned backward slightly by the springs as the stamp is carried through said opening between the plunger and platen. The resilience of these springs enables them to be bent forward slightly at their lower ends when said spring platen is projected (Fig. 20) to carry the corner of the envelop through the opening in the die plate in position to receive the stamp.

The operation of the machine as a whole will be easily understood from the description thus given of the operation of its several component mechanisms, and need not, therefore, be again rehearsed. It may be used without change to both stamp and seal envelops, as described, or to stamp envelops or cards without sealing, or to seal envelops without stamping them. The same or substantially similar features of construction may also be employed in whole or in part in machines for affixing labels other than stamps, or in machines for affixing stamps or labels to articles or matter other than envelops or cards, and in case it is so desired the moistening devices may be supplied with mucilage instead of water and operated as gumming devices, or may be altered or replaced by more suitable devices for this purposes. The various mechanisms and features of improvement may also be found useful either separately or combined, in whole or in part, in stamp canceling machines or in other machines or connections different from those herein mentioned. While, therefore, for the sake of definiteness, the language of the appended claims is couched in view of the design to provide primarily a machine for stamping and sealing envelops and the like, it will be understood that the terms used are intended to equally include the application of the mechanisms and features of improvement to the affixing of labels generally to all classes of articles to the handling of which they may be adapted, as well as their application in any other connection in which they may be found useful. It will also be understood that in each feature and mechanism a wide variety of changes and modifications may be made without departing from the spirit of the invention set forth.

I claim as my invention:—

1. The combination with a stamp affixing mechanism, of a stamp carriage, means for moving said carriage past the affixing mechanism, means for supporting separate sheets of stamps on the carriage, means for feeding a sheet of stamps forward row by row to the affixing mechanism, and means for feeding the succeeding sheets forward, each in continuation of the preceding sheet.

2. The combination with a stamp affixing mechanism, of a stamp carriage, means for moving the carriage past the affixing mechanism, means for supporting separate sheets of stamps on the carriage, movable jaws on the carriage for advancing a sheet of stamps row by row to the affixing mechanism, and means for advancing the succeeding sheets of stamps between said jaws each in continuation of the preceding sheet.

3. The combination with a stamp affixing mechanism, of a stamp carriage, means for moving the carriage past the affixing mechanism, a magazine on the carriage supporting sheets of stamps in separate parallel relation, movable jaws on the carriage for advancing a sheet of stamps row by row to the affixing mechanism, means for moving the magazine to bring the sheets of stamps in succession opposite said jaws, and means for moving each sheet of stamps edgewise between the jaws when brought opposite the latter.

4. The combination with a stamp affixing mechanism, of a stamp carriage, means for moving the carriage past the affixing mechanism, a magazine on the carriage supporting separate sheets of stamps at different levels, movable jaws on the carriage for advancing a sheet of stamps row by row to the affixing mechanism, means for moving the magazine vertically in the carriage to bring the sheets of stamps in succession opposite said jaws, and means for advancing each sheet of stamps edgewise between the jaws when brought opposite the latter.

5. The combination with a stamp affixing mechanism, of a stamp carriage, means for moving the carriage step by step past the affixing mechanism, means for supporting separate sheets of stamps in the carriage comprising a magazine provided with a plurality of separate sheet carrying trays, movable jaws on the carriage for advancing a sheet of stamps row by row to the affixing mechanism, means for moving the magazine to bring the trays in succession opposite said jaws, and means for pushing each sheet of stamps between the jaws when its supporting tray is moved opposite the latter.

6. The combination with means for holding an envelop, of a moistening device, comprising an upright moistening surface, means for projecting said surface against the envelop, means for supplying an excess of moisture at the upper portion of said surface, and means for removing the surplus moisture from the lower portion of said surface before it strikes the envelop.

7. The combination with means for holding an envelop, of a moistening device, comprising an upright moistening surface, means for supplying an excess of moisture at the upper portion of said surface, a wiper arranged to contact with the lower portion of said surface to remove the excess of moisture therefrom and means for projecting the moistening surface past the wiper and against the envelop.

8. The combination with means for holding an envelop, of a moistening device comprising a moistening pad having a flexible edge depending below the moistening surface of the pad, means for supplying moisture to said pad, a wiper arranged to contact with said depending edge to remove the excess of moisture from the pad, and means for projecting the pad past the wiper and against the envelop.

9. The combination with means for holding an envelop, of a moistening surface provided on a movable support, means for moving said support to project the moistening surface against the envelop, means for supplying moisture to said surface, a drip pan movably mounted on said support with its front end normally projecting in front of the moistening surface but adapted to move back on the support as the moistening surface comes in contact with the envelop, and means for moving the drip pan forward on the support when the latter is retracted.

10. The combination with means for supporting an envelop, of a moistening surface provided on a movable support, means for moving said support to project the moistening surface against the envelop, means for supplying moisture to said surface, a drip pan movably mounted on said support with its front end normally projecting in front of the moistening surface but adapted to be forced back on the support as the moistening surface comes in contact with the envelop, a wiper on said drip pan arranged to contact with said moistening surface and remove the excess of moisture therefrom when the drip pan is thus moved back, and means for moving the drip pan forward on the support when the latter is retracted.

11. The combination with means for supporting an envelop, of a moistening surface provided on a movable support and having a depending flexible edge, means for moving said support to project the moistening surface against the envelop, means for supplying moisture to said surface, a drip pan movably mounted on said support with its front end normally projecting in front of the moistening surface but adapted to be forced back on said support as the moistening surface comes in contact with the envelop, a wiper in the drip pan arranged to deflect said depending edge to remove the excess moisture from the moistening surface before the latter strikes the envelop, and means for moving the drip pan forward on the support, when the latter is retracted.

12. A stamp affixing mechanism comprising a clamp consisting of a yielding platen and a movable plunger, means for guiding an envelop and sheet of stamps between the platen and plunger, means for projecting the plunger to clamp a stamp against the envelop between the platen and plunger, and means for clamping the surrounding portions of the sheet of stamps stationary when the plunger is projected, whereby the movement of the plunger tears the engaged stamp from the sheet.

13. A stamp affixing mechanism, comprising a clamp consisting of a yielding platen and a plunger movable against said platen, means for guiding an envelop and sheet of stamps between the plunger and platen, including an apertured plate through which the plunger reciprocates and on opposite sides of which the envelops and stamps are inserted, a clamping head movably mounted about the plunger, means for projecting the plunger against the yielding platen, and means for projecting the clamping head to hold the surrounding portions of the sheet of stamps stationary while the affixed stamp is torn loose therefrom by the projection of the plunger.

14. A stamp affixing mechanism consisting of a yielding platen and movable plunger, means for guiding an envelop and sheet of stamps between the platen and plunger, means for projecting the plunger to clamp a stamp against the envelop between the platen and plunger, means for clamping the surrounding portions of the sheet of stamps stationary when the plunger is projected, a latch for holding the platen temporarily retracted after the affixing of the stamp, and a trip for releasing said latch when the succeeding envelop is fed between the plunger and platen.

15. The combination with an affixing mechanism comprising a plunger and spring pressed platen, of a carrier for delivering an envelop between the plunger and platen, means for feeding stamps between the plunger and platen, means for projecting the plunger to clamp a stamp against the envelop, a latch for holding the platen retracted after the stamp is affixed and means connected with the carrier for tripping said latch when the carrier is advanced to supply the succeeding envelop.

16. A stamp affixing mechanism consisting of a plunger and spring pressed platen, means for guiding an envelop and sheet of stamps between the plunger and platen, means for projecting the plunger against the platen to affix a stamp to the envelop, a latch for holding the platen temporarily retracted after the affixing of the stamp, a trip for releasing the latch after the succeeding envelop is fed between the plunger and platen, and means for governing the projection of the platen when the latch is released.

17. The combination with an affixing mechanism comprising a plunger and spring pressed platen, of a reciprocating carrier for delivering envelops between the plunger and platen, means for feeding stamps between the plunger and platen, means for projecting the plunger to affix a stamp to an envelop, a latch for holding the platen temporarily retracted after the affixing of the stamp, means for tripping said latch when the carrier is advanced to supply the succeeding envelop, and means temporarily connecting the platen and carrier for retarding the former when released.

18. The combination with an affixing mechanism comprising a plunger and spring pressed platen, of a reciprocating carrier for delivering envelops between the plunger and platen, means for feeding stamps between the plunger and platen, means for projecting the plunger to affix a stamp to an envelop, a latch for holding the platen temporarily retracted after the affixing of the stamp, means for tripping said latch when the carrier is advanced to supply the succeeding envelop, and a pivoted lever engaging the platen at one end and loosely contacting with the carrier at its other end, whereby the platen when released can only be projected as the carrier is withdrawn.

19. The combination with an affixing mechanism comprising a plunger and spring pressed platen, of a reciprocating carrier for delivering envelops between the plunger and platen, means for feeding stamps between the plunger and platen, means for projecting the plunger to affix a stamp to an envelop, and a pivoted latch adapted to engage the platen at one end to hold it temporarily retracted after the affixing of the stamp and with its opposite end depending into the path of the carrier to be tripped thereby when the carrier is advanced to supply the succeeding envelop.

20. The combination with an affixing mechanism comprising a plunger and spring pressed platen, of a reciprocating carrier for delivering envelops between the plunger and platen, means for feeding stamps between the plunger and platen, means for projecting the plunger to affix a stamp to an envelop, a pivoted latch adapted to engage the platen at one end to hold it temporarily retracted after the affixing of the stamp, and with its opposite end depending into the path of the carrier to be tripped thereby when the carrier has advanced to supply the succeeding envelop, and means for temporarily connecting the platen and carrier to retard the projecting of the former when released.

21. The combination with an affixing mechanism comprising a plunger and spring pressed platen, of a reciprocating carrier for delivering envelops between the plunger and platen, means for feeding stamps between the plunger and platen, means for projecting the plunger to affix a stamp to an envelop, a pivoted latch adapted to engage the platen at one end to hold it temporarily retracted after the affixing of the stamp and with its opposite end depending into the path of the carrier to be tripped thereby when the carrier is advanced to supply the succeeding envelop, and a pivoted lever engaging the platen at one end and loosely contacting with the carrier at its other end whereby the platen when released can only be projected as the carrier is withdrawn.

22. The combination with a plunger and yielding platen, of a carrier for delivering envelops between the plunger and platen, a die plate provided with an aperture through which the plunger loosely reciprocates, mechanism for delivering a sheet of stamps between the plunger and platen on the opposite side of the die plate from the envelop, means for projecting the plunger through the die plate aperture to tear off and affix the intervening stamp to the envelop, a clamping head adapted to engage the die plate about the platen to hold the surrounding stamps stationary, and connections between said plunger and head for projecting the latter when the former is projected.

23. The combination with a plunger and yielding platen, of a carrier for delivering envelops between the plunger and platen, a die plate provided with an aperture through which the plunger loosely reciprocates, mechanism for delivering a sheet of stamps between the plunger and platen on the opposite side of the die plate from the envelops, means for projecting the plunger through the die plate aperture to tear off and affix the intervening stamp to the envelop, a clamping head adapted to engage the die plate about the platen to hold the stamps stationary, and yielding connection between said plunger and head for simultaneously projecting the latter when the former is projected.

24. The combination with a die plate provided with an aperture, of a plunger, means for projecting the plunger through the aperture, means for delivering a sheet of stamps between the plunger and die plate, a clamping head movably mounted to engage the die plate about the aperture, a cam surface on the plunger, and a bell crank lever engaging at one end with said cam surface and at its other end with parts connected with the clamping head to project the latter when the plunger is projected.

25. The combination with a die plate provided with an aperture, of a plunger, means for projecting the plunger through the aperture, means for delivering a sheet of stamps between the plunger and die plate, a clamping head movably mounted to engage the die plate about the aperture, spring pressed parts movably supported on the clamping head, and a lever engaging the plunger to be oscillated thereby and also engaging said spring pressed parts to yieldingly project the clamping head when the plunger is projected.

26. The combination with a die plate provided with an aperture, of a plunger, means for projecting the plunger through the aperture, means for delivering a sheet of stamps between the plunger and die plate, a clamping head movably mounted to engage the die plate about the aperture, guide rods secured to said clamping head to support the latter and mounted to slide longitudinally in a supporting bracket, spring pressed collars movably mounted on the ends of said rods, a cam surface on the plunger, and a bell crank lever engaging at one end with said cam surface and at its other end with said collars to yieldingly project the clamping head when the plunger is projected.

27. The combination with an apertured plate, of a plunger arranged to reciprocate through the aperture in the plate, said plunger being provided with a rearwardly extending supporting bar off set from the plunger head and mounted to slide in a supporting bracket, and adjustable guide screws engaging lateral surfaces of the plunger, whereby the plunger head may be adjusted within the aperture.

28. A plunger reciprocating mechanism comprising parallel oppositely facing bearing surfaces provided on the plunger, crank arms mounted to rotate between said bearing surfaces and radiating from their rotary axis at different angles, and wrist pins projecting from said crank arms and each arranged for contact with one of said bearing surfaces, substantially as described.

29. A plunger reciprocating mechanism comprising parallel oppositely facing bearing surfaces provided on the plunger and off set laterally relatively to each other, crank arms mounted to rotate between said bearing surfaces, and radiating from their rotary axis at different angles, and wrist pins projecting from said crank arms and engaging the opposite bearing surfaces, substantially as described.

30. The combination with a stamp affixing mechanism, of a stamp carriage, means for moving said carriage past the affixing mechanism, a magazine on the carriage supporting sheets of stamps separated from each other, movable jaws on the carriage for advancing a sheet of stamps row by row to the affixing mechanism, means for moving the magazine to bring the sheet of stamps in succession opposite said jaws, and means for moving each sheet of stamps edgewise between the jaws when brought opposite the latter, comprising a push frame arranged to be projected into the magazine against the sheet of stamps, and a stationary cam part for projecting said push frame as the carriage is moved past the affixing mechanism.

31. The combination with a stamp affixing mechanism, of a stamp carriage, means for moving the carriage past the affixing mechanism, a magazine on the carriage supporting sheets of stamps separated from each other, movable jaws on the carriage for advancing a sheet of stamps row by row to the affixing mechanism, means for moving the magazine to bring the sheets of stamps in succession opposite said jaws, and means for moving each sheet of stamps edgewise between the jaws when brought opposite the latter, comprising a two part push frame arranged to be projected into the magazine against the sheet of stamps, adjustable connections between the two parts of the push frame, and a stationary cam part acting on the push frame to project the latter as the carriage is moved past the affixing mechanism.

32. The combination with a stamp affixing mechanism, of a stamp carriage, means for moving the carriage past the affixing mechanism, means for supporting separate sheets of stamps on the carriage, movable jaws on the carriage, means for maintaining said jaws normally open and retracted, means for advancing the jaws at each end of the carriage movement, means for closing said jaws before such advanced movement, means for opening the jaws after such advance movement, and means for retracting the open jaws again, and means for advancing the succeeding sheets of stamps between the jaws each in continuation of the preceding sheet.

33. The combination with a stamp affixing mechanism, of a stamp carriage, means for reciprocating said carriage step by step past the affixing mechanism, vibratory jaws on the carriage engaging the stamps intermittently to advance them row by row, and means operated by the carriage movements for actuating said jaws, substantially as described.

34. The combination with a stamp affixing mechanism, of a reciprocatory stamp carriage, means for reciprocating said carriage step by step past the affixing mechanism, movable jaws on the carriage, means for maintaining said jaws normally open and retracted, means for advancing the jaws at each end of the carriage movement, means for closing the jaws prior to their advancing movement, means for opening the jaws after their advancing movement, and means for retracting the open jaws again, substantially as described.

35. The combination with a stamp affixing mechanism, of a stamp carriage, means for moving the carriage step by step past the affixing mechanism, movable jaws on the carriage for advancing a sheet of stamps row by row to the affixing mechanism, and means for actuating said jaws at each end of the carriage movement, comprising an oscillating frame pivoted to the carriage and extending longitudinally thereof, a vibratory mechanism actuated at each step of the carriage movement, and means for operatively engaging said vibratory mechanism and frame to oscillate the latter at each end of the carriage movement, and connections between said frame and jaws.

36. The combination with a stamp affixing mechanism, of a stamp carriage, means for supporting separate sheets of stamps in the carriage comprising a plurality of sheet-carrying trays, telescopic or collapsible connections between said trays, movable jaws on the carriage for advancing a sheet of stamps row by row to the affixing mechanism, and means for lowering the trays to bring each sheet in succession opposite said jaws.

37. The combination with a stamp affixing mechanism, of a stamp carriage, means for supporting separate sheets of stamps in the carriage comprising a plurality of sheet-carrying trays, telescopic or collapsible connections between said trays, movable jaws on the carriage for advancing a sheet of stamps row by row to the affixing mechanism, means for lowering the trays to bring each sheet in succession opposite said jaws, and means for sliding each sheet of stamps between said jaws when lowered opposite the latter.

38. A sheet feed comprising a plurality of separate sheet carrying trays, telescopic or collapsible connections between said trays, an overhead support from which said trays are suspended, means for removing the sheets from the trays, and means for lowering said support to bring the trays in succession within range of said removing means.

39. The combination with a stamp affixing mechanism, of a stamp carriage, a stamp magazine in said carriage comprising a plurality of sheet supporting trays, a movable frame supporting the trays in the carriage, a stepped part upon which the frame rests, and means for moving said part to drop the frame step by step and lower the trays to deliver their stamps in succession.

40. The combination with a stamp affixing mechanism, of a stamp carriage, a stamp magazine in said carriage comprising a plurality of sheet supporting trays, a pivoted frame supporting the trays in the carriage, a stepped cam upon which the free end of the frame rests, and means for intermittently rotating said cam to let down the frame step by step and lower the trays to deliver their sheets in succession.

41. The combination with a stamp affixing mechanism, of a stamp carriage, a stamp magazine comprising a plurality of separate sheet carrying trays, a movable frame supporting the trays in the carriage detachable connections between said frame and trays whereby the magazine may be removed bodily from the carriage, and means for lowering said frame.

42. The combination with a stamp affixing mechanism, of a stamp carriage, a stamp magazine in said carriage comprising a plurality of sheet supporting trays, telescopic or collapsible connections between said trays, a pivoted frame on the carriage from which said trays are suspended, detachable connections between the free ends of said frame and the trays, and means for lowering said frame to drop the trays together in the base of the carriage to deliver their stamps in succession.

43. The combination with a stamp affixing mechanism, of a stamp carriage, means for moving the carriage step by step past the affixing mechanism, a sheet magazine in the carriage, means acting at each end of the carriage movement to feed a sheet of stamps row by row to the affixing mechanism from the magazine, and means acting occasionally at the end of the carriage movement to move the magazine and present a succeeding sheet to the feed mechanism.

44. The combination with a stamp affixing mechanism, of a stamp carriage, means for reciprocating the carriage step by step past the affixing mechanism, means for supporting separate sheets of stamps in the carriage comprising a magazine provided with a plurality of separate sheet carrying trays, movable jaws on the carriage for moving the stamps to the affixing mechanism, means for advancing said jaws one row at each end of the carriage movement, and means for moving the magazine occasionally at the end of the carriage movement to bring the trays in succession opposite said jaws.

45. The combination with a stamp affixing mechanism, of a stamp carriage, means for reciprocating said carriage past the affixing mechanism, means for feeding a sheet of stamps forward row by row to the affixing mechanism, a clamp for receiving and holding the advanced edge of the foremost row of stamps, and means for temporarily releasing said clamp at each end of the carriage movement.

46. The combination with a movably mounted carriage provided with a rack, of means for imparting to said carriage a reciprocating step by step movement comprising a pair of vibratory levers, driving pawls pivotally connected with said levers and means for moving said pawls alternately into engagement with the rack on the carriage, said moving means being arranged to permit one idle stroke of the levers between the alternate engagements of the pawls with the rack, whereby a dwell of one interval occurs at each end of the carriage movement.

47. The combination with the envelop magazine and stamp affixing mechanism, means for moistening the stamp receiving surface of each foremost envelop in the magazine, and means for removing the envelops in succession from the magazine, of a printing form, and means for projecting said form against the foremost envelop at each operation of the moistening device.

48. The combination with the envelop magazine, a moistener acting against the surface of each foremost envelop in the magazine and means for removing the envelops in succession from the magazine to a stamp affixing mechanism, a movable part supporting the moistener, and a reciprocating bar connected to said movable part to operate the moistener, of a printing form arranged to be projected against the foremost envelop in the magazine, and connections between said printing form and reciprocating bar for projecting said form when the moistener is rejected.

49. The combination with the magazine and stamp affixing mechanism, of a carrier mounted to reciprocate between them and means for actuating said carrier mechanism comprising a bell crank lever, a pivotal link connecting the carrier to one end of said lever, a reciprocating crosshead, a sliding swivel joint connecting the other end of the lever to the reciprocating cross head, and a pitman connecting said cross head with an actuating crank.

50. The combination with the magazine and stamp affixing mechanism, of a reciprocating carrier for transferring envelops between them, jaws movably mounted on said carrier, a spring applied to normally hold said jaws closed, means for opening said jaws at one end of the carrier movement, means for releasing said jaws to permit them to close at the opposite end of said movement, and means for releasing said spring at will.

51. As a means for imparting step by step movement to a reciprocatory carriage, two oscillatory parts, driving pawls on said parts alternately engaging a rack on the carriage, springs normally projecting said pawls, locking pawls engaging the driving pawls, and means operating at each end of the carriage movement to shift the locking pawls and alternate the direction of the driving pawls, substantially as described.

52. As a means for imparting step by step movement to a reciprocatory carriage, two oscillatory parts, driving pawls on said parts alternately engaging a rack on the carriage, springs and locking dogs on said parts to alternate the projection of the driving pawls, dogs mounted upon adjacent stationary parts and arranged to be moved into the path of the locking pawls to oscillate the latter, and means for moving said dogs at each end of the carriage movement, substantially as described.

53. As a means for imparting step by step movement to a reciprocatory carriage, two oscillatory parts, driving pawls on said parts alternately engaging a rack on the carriage, springs and locking pawls mounted on said parts and applied to said driving pawls, dogs mounted on relatively stationary parts and arranged to be projected into the path of movement of said locking pawls, and a reversing bar arranged for contact with the carriage at each end of its movement for oscillating said dogs to alternate the direction of the driving pawls, substantially as described.

54. The combination with a reciprocatory carriage, of two oscillatory parts, driving pawls on said parts, devices on said parts for alternating the projection of said pawls at each end of the carriage movement, dogs mounted upon relatively stationary parts and projecting into the path of the movement of said devices, and means for shifting said dogs at each end of the carriage movement, substantially as described.

55. The combination with a reciprocatory carriage, of two oscillatory parts, driving pawls on said parts alternately engaging a rack on the carriage, springs and locking dogs on said parts for alternating the projection of the driving pawls, dogs mounted upon relatively stationary parts and projecting into the path of the movement of said dogs at each end of the carriage movement, substantially as described.

56. The combination with a reciprocatory carriage, of two oscillatory parts, driving pawls on said parts alternately engaging a rack on the carriage, springs normally projecting said driving pawls, locking pawls for retracting and holding retracted driving pawls in opposition of said springs, dogs mounted on said relatively stationary parts in the path of the movement of said locking pawls and a reversing bar actuated by a contact with the carriage at each end of its path of movement, substantially as described.

57. The combination with a stamp affixing mechanism, of a stamp carriage, provided with sheet carrying trays, means for advancing the sheets of stamps row by row to the affixing mechanism, and means for moving the trays to bring each sheet in succession opposite said advancing means.

58. The combination with a stamp affixing mechanism, of a stamp carriage provided with sheet carrying trays, means for advancing the sheets of stamps row by row to the affixing mechanism, means for moving the trays to bring each sheet in succession opposite said advancing means, and means for sliding each sheet of stamps to said advancing means when moved opposite the latter.

59. The combination with a stamp affixing mechanism, of a stamp carriage provided with sheet carrying trays, an overhead support from which said trays are suspended, means for removing the sheets from the trays, and means for lowering said support to bring the trays in succession within the range of the said removing means.

60. The combination with a stamp carriage provided with sheet supporting trays, telescopic or collapsible connections between said trays, a movable frame on the carriage from which said trays are suspended, a step part upon which the frame rests, means for moving said part to drop the frames step by step and lower the trays into the base of the carriage to deliver their sheets in succession.

61. The combination with a stamp affixing mechanism, of a stamp carriage, means for reciprocating the carriage step by step past the affixing mechanism, a stamp magazine in said carriage comprising a plurality of sheet carrying trays, a pivoted frame supporting the trays in the carriage, a stepped cam upon which the free end of the frame rests, and means acting occasionally at the end of the carriage movement to let down the frame step by step and lower the trays to deliver their sheets in succession.

62. The combination with a stamp affixing mechanism, of a stamp carriage, means for reciprocating the carriage step by step past the affixing mechanism, a stamp magazine in said carriage comprising a plurality of sheet supporting trays, a pivoted frame supporting the trays in the carriage, a stepped cam upon which the free end of the frame rests, a toothed segment on said cam, a ratchet provided with a pawl engaging the ratchet wheel once in each revolution, and means operating at the end of the carriage movement for giving a rotary impulse to said ratchet wheel.

63. The combination with a stamp affixing mechanism, of a stamp carriage, means for reciprocating the carriage step by step past the affixing mechanism, a stamp magazine on said carriage comprising a plurality of sheet supporting trays, a pivoted frame supporting the trays in the carriage, a stepped cam, a toothed segment on said cam, a ratchet wheel provided with a pawl engaging the toothed segment once in each revolution, a sliding bar on the carriage, a pawl on said bar engaging the ratchet wheel, and contacts at each end of the carriage movement for shifting said bar to intermittingly rotate said ratchet wheel.

64. The combination with a stamp affixing mechanism, of a stamp carriage, a stamp magazine in said carriage comprising a plurality of sheet supporting trays, a yoke from which said trays are suspended, vertical guides in the carriage engaging the yoke, a movable frame in the carriage supporting said yoke, and means for lowering said frame.

65. The combination with a stamp affixing mechanism, of a stamp carriage, a stamp magazine on said carriage comprising a plurality of sheet carrying trays, the uppermost tray being movably suspended in the carriage and the lower trays being suspended by rivets from the trays above, the other trays being cut away in lines with the rivets of each two connected trays to permit said rivets to telescope through and the magazine to fold together when lowered in the carriage.

66. The combination with a stamp affixing mechanism, of means for advancing stamps thereto, row by row, comprising jaws embracing a plurality of rows, means for vibrating said jaws through the width of one row, and means for feeding succeeding sheets of stamps between said jaws.

67. The combination with a stamp affixing mechanism, of means for advancing stamps thereto, row by row, comprising a pair of jaws, a vibratory frame linked to said jaws, and means engaging and vibrating said frame occasionally as the advance row is exhausted.

68. The combination with a stamp affixing mechanism, of means for advancing stamps thereto row by row, comprising jaws embracing a plurality of rows, a vibratory frame linked to said jaws, and means engaging and vibrating said frame occasionally to move the jaws through the width of one row.

69. The combination with a stamp affixing mechanism, of a stamp carriage, means for reciprocating said carriage past the affixing mechanism, jaws on said carriage between which the stamps are passed, a vibratory frame linked to said jaws, and means for vibrating said frame to move the jaws at the limits of the carriage movement.

70. The combination with a stamp affixing mechanism, of a stamp carriage, means for reciprocating the carriage past the affixing mechanism, a pair of jaws on the carriage, a vibratory frame on the carriage linked to said jaws, a latch normally holding said frame from vibratory movement, means for releasing said latch at the limits of the carriage movement, and a vibratory part engaging and actuating said frame when released by the latch.

71. The combination with a stamp affixing mechanism, of a stamp carriage, means for reciprocating the said carriage past the affixing mechanism, jaws on said carriage, a vibratory frame on the carriage linked to said jaws, a latch in sliding contact with said frame and normally preventing it from vibrating, means for releasing said latch at the limits of the carriage movement, and a vibratory part engaging and actuating the frame when released by the latch.

72. The combination with a stamp affixing mechanism, of a stamp carriage, means for reciprocating the carriage, jaws on the carriage, a vibratory frame on the carriage linked to said jaws, a latch normally holding said frame, a ratchet wheel actuated at each step of the carriage movement, a pawl lifted in each revolution of the ratchet wheel, means for projecting the lifted pawl against the latch to release the frame, and means for vibrating the frame when released, substantially as described.

73. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a superjacent lever lifted in each revolution of the ratchet wheel, a pawl on said lever, a spring normally holding said pawl away from the latch, a vibrating member normally above the pawl but engaging and forcing the pawl against the latch to release the frame when the lever is lifted by the ratchet wheel, and means for vibrating the frame to actuate the jaws when the latch is released, substantially as described.

74. The combination with a stamp affixing mechanism, of a stamp carriage, means for reciprocating the carriage past the affixing mechanism, jaws on the carriage, a vibratory frame on the carriage linked to said jaws, a latch normally holding said frame, means for releasing said latch at the end of the carriage movement, a member vibrating across the frame but normally out of contact therewith, a movable dog on said member and means for lifting said dog to engage the frame when released by the latch, substantially as described.

75. The combination with a stamp affixing mechanism, of a stamp carriage, means for reciprocating the carriage past the affixing mechanism, jaws on the carriage, a vibratory frame on the carriage linked to said jaws, a latch normally holding said frame, means for releasing the latch at the end of the carriage movement, a member vibrating across the frame but normally out of contact therewith, a dog adjustably pivoted on said member, and means for lifting said dog to engage the frame when released by the latch, substantially as described.

76. The combination with a stamp affixing mechanism, of a stamp carriage, means for reciprocating the carriage past the affixing mechanism, jaws on the carriage, a vibratory frame on the carriage linked to said jaws, a latch normally holding said frame, means for releasing the latch at the end of the carriage movement, a member vibrating across the frame and normally out of contact therewith but provided with a part projecting in front of the frame, a movable dog on said member and means for projecting said dog back of the frame opposite said part when the frame is released by the latch, substantially as described.

77. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, means for releasing the latch at the end of the carriage movement, a member vibrating across the frame and provided with a part projecting in front of the frame, a movable dog on said member, and means for projecting said dog back of the frame when the latter is released by the latch, substantially as described.

78. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a pawl lifted in each revolution of the ratchet wheel, means for projecting the pawl against the latch to release the frame, a member vibrating across the frame but normally out of contact therewith, and means for engaging said vibrating member with the frame to actuate the latter when released by the latch, substantially as described.

79. The combination with a stamp affixing mechanism, of a stamp carriage, means for reciprocating the carriage step by step past the affixing mechanism, jaws on the carriage, a vibratory frame on the carriage linked to said frame, a ratchet wheel actuated at each step of the carriage movement, a pawl lifted in each revolution of the ratchet wheel, means for projecting the lifted pawl against the latch to release the frame, a member vibrating across the frame but normally out of contact therewith, a lug on said member normally above said pawl but contacting with it when lifted to project it against the latch, a movable dog on said member, means for lifting the dog to engage and project the frame when released, and means on said member for retracting the frame when projected.

80. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a superjacent lever lifted in each revolution of the ratchet wheel, a pawl on said lever, a spring normally holding said pawl away from the latch, a vibrating member normally above the pawl but engaging and forcing the pawl against the latch to release the frame when the lever is lifted by the ratchet wheel, a movable dog on said member, means for lifting the dog to engage and project the frame when released, and means for retracting said frame when projected, substantially as described.

81. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a superjacent lever lifted in each revolution of the ratchet wheel, a pawl on said lever, a spring normally holding said pawl away from the latch, a vibrating member normally above the pawl but engaging and forcing the pawl against the latch to release the frame when the lever is lifted by the ratchet wheel, a part on said member projecting in front of the frame, a movable dog on said member and means for projecting said dog back of the frame when the latter is released by the latch, substantially as described.

82. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a superjacent lever lifted in each revolution of the ratchet wheel, a pawl on said lever normally retracted from the latch, a vibrating member normally above the pawl but engaging and forcing the pawl against the latch to release the frame when the lever is lifted by the ratchet wheel, a dog pivoted to said member and resting yieldingly upon said lever, said dog being raised to project back of the frame by the lifting of the lever, and a part on said member engaging the front of the frame, substantially as described.

83. The combination with a stamp affixing mechanism, of a stamp carriage, means for reciprocating the carriage step by step past the affixing mechanism, jaws on the carriage, a vibratory frame on the carriage linked to said jaws, a latch normally holding said frame, a ratchet wheel actuated at each step of the carriage movement, a superjacent lever lifted in each revolution of the ratchet wheel, a pawl on said lever, a spring normally holding said pawl away from the latch, a vibrating member normally above the pawl but engaging and forcing the pawl against the latch to release the frame when the lever is lifted by the ratchet wheel, a spring secured to said lever, a dog pivoted to said member and resting upon said spring, said dog being raised to project back of the frame by the lifting of the lever, and a part on said member engaging the front of the frame, substantially as described.

84. The combination with a stamp affixing mechanism, of means for advancing the stamps row by row thereto, comprising a pair of jaws, a vibratory frame consisting of two adjustably connected sections, connections between one section of the frame and the jaws, and means for engaging the other section to vibrate the frame occasionally, substantially as described.

85. The combination with a stamp affixing mechanism, of means for advancing the stamps thereto row by row, comprising a pair of jaws, means for closing and advancing the jaws and for opening and retracting them, a clamp engaging and holding the stamps when released by the jaws, and means for releasing said clamp when the jaws are closed and projected, substantially as described.

86. The combination with a stamp affixing mechanism, of means for advancing the stamps thereto row by row, comprising jaws embracing a plurality of rows, means for opening and closing the jaws, means for vibrating said jaws through the width of one row, a clamp engaging and holding the stamps when released by the jaws, and means for releasing said clamp when the jaws are closed and projected, substantially as described.

87. The combination with a stamp affixing mechanism, of a stamp carriage, means for reciprocating the stamp carriage past the affixing mechanism, jaws on said carriage between which the stamps are passed, a vibratory frame linked to said jaws, means for vibrating said frame to move the jaws at the limits of the carriage movement, a clamp engaging and holding the stamps when released by the jaws, and means for opening said clamp at the limits of the carriage movement, substantially as described.

88. The combination with a stamp affixing mechanism, of a stamp carriage, means for reciprocating said carriage past the affixing mechanism, means on the carriage for intermittingly advancing said stamps, a clamp normally engaging and holding the stamps, sliding frames on the carriage connected with the clamp, and cam surfaces engaging said frames to release the clamp at the limits of the carriage movement, substantially as described.

89. The combination with a stamp affixing mechanism, of a stamp carriage, means for reciprocating the carriage past the affixing mechanism, means on the carriage for intermittingly advancing the stamps, pivoted clamps on the carriage normally engaging and holding said stamps, levers supporting a transverse bar engaging said stamps, sliding frames engaging said levers, springs applied to normally close the clamps, and cam surfaces engaging the frames to open the clamps at the limits of the carriage movement, substantially as described.

90. The combination with a stamp affixing mechanism, of means for advancing the stamps thereto row by row, comprising a pair of jaws, means for projecting and retracting said jaws, means normally closing said jaws, oppositely arranged bell cranks with their adjacent ends projecting between parts on the jaws, and connections between the outer ends of said bell cranks, and a relatively stationary part for oscillating the bell cranks to separate the jaws when the latter are projected, substantially as described.

91. The combination with a stamp affixing mechanism, of a stamp carriage, means for reciprocating the carriage past the affixing mechanism, jaws on said carriage, means for closing and projecting and for opening and retracting said jaws, locking devices for holding the jaws apart when opened, and means operated at the end of the carriage movement to withdraw the locking devices.

92. The combination with a stamp affixing mechanism, of a stamp carriage, means for reciprocating said carriage past the affixing mechanism, jaws on said carriage, means for closing and projecting and for opening and retracting said jaws, spring pressed locking devices arranged to project between parts on the jaws when opened, and means operated at the ends of the carriage movement to withdraw the locking devices, substantially as described.

93. The combination with a stamp affixing mechanism, of a stamp carriage, means for reciprocating the carriage past the affixing mechanism, jaws on said carriage, means for closing and projecting and for opening and retracting said jaws, locking devices for holding the jaws apart when open, a sliding bar on the carriage, cam surfaces on said bar arranged to engage and retract the locking devices, and contacts engaging and reciprocating said bar at the ends of the carriage movement, substantially as described.

94. The combination with a stamp affixing mechanism, of a stamp carriage, means for reciprocating said carriage past the affixing mechanism, pivotally mounted frames on said carriage, radial guides on said frames, jaws movably mounted on said guides, springs normally closing said jaws, means for oscillating the frames to project and retract the jaws, means for opening the jaws when projected, locking devices holding the jaws apart during the retraction, and means for withdrawing said locking devices before the jaws are projected, substantially as described.

95. The combination with a stamp affixing mechanism, of a stamp carriage, means for reciprocating the carriage past the affixing mechanism, pivotally mounted frames on said carriage, radial guides on said frames, jaws movably mounted on said guides, springs normally closing said jaws, means for oscillating the frames to project and retract the jaws, oppositely arranged bell cranks mounted on the frames with their adjacent ends projecting between parts on the jaws, connections between the outer ends of said bell cranks and a relatively stationary part on the carriage for oscillating the bell cranks to separate the jaws when projected, locking devices holding the jaws apart during retraction, and means for withdrawing said locking devices before the jaws are projected, substantially as described.

96. The combination with a stamp affixing mechanism, of a stamp carriage, pivotally mounted frames on the carriage, jaws movably mounted in said frame, means for oscillating the frames to project and retract the jaws, curved stamp guides concentric to the frame pivots passing between the jaws concentrically to the frame pivots, and means for opening and closing the jaws, substantially as described.

97. The combination with a stamp affixing mechanism, comprising a reciprocating plunger and platen, of a stamp carriage, means for reciprocating the carriage past the affixing mechanism, stamp guides on said carriage provided with fingers projecting between the plunger and platen and arranged for the plunger to reciprocate between them, and means on the carriage for feeding the stamps through said guides. substantially as described.

98. The combination with a stamp affixing mechanism, of a stamp carriage, means for reciprocating said carriage past the affixing mechanism, means for feeding a sheet of stamps forward row by row to the affixing mechanism, a clamp for engaging and holding the foremost row of stamps, and means for temporarily releasing said clamp at each end of the carriage movement.

99. The combination with a stamp affixing mechanism, of means for advancing the stamps thereto row by row, comprising a pair of jaws, means for closing and advancing the jaws and for opening and retracting them, a clamp engaging and holding the stamps when released by the jaws, means for releasing said clamp when the jaws are closed and projected, a clamp for engaging and holding the foremost row of stamps, means for temporarily releasing the latter clamp at each end of the carriage movement, substantially as described.

100. The combination with a stamp affixing mechanism, of means for feeding each individual stamp in a sheet of stamps to the affixing mechanism, comprising a carriage, means for moving the carriage step by step past the affixing mechanism in reverse directions with a dwell of one step interval at each reversal, means for moving the sheet forward row by row on the carriage, and a clamp engaging the body of the sheet when not otherwise constrained.

101. A stamp affixing mechanism comprising a plunger, an opposing platen, a die plate between the plunger and platen containing an aperture through which the head of the plunger may be projected, means for guiding an envelop between the platen and die plate, yielding means for projecting the platen to force the envelop against the die plate opposite the aperture, means for feeding a sheet or row of stamps between the plunger and die plate so as to bring the individual stamps of the sheet or row in succession opposite the aperture, means for holding stationary the individual stamps of the sheet surrounding the one opposite the aperture, means for projecting the plunger to force the one stamp on the sheet or row through the aperture in the die plate and against the envelop and to push the stamp, envelop and platen away from the die plate, thus pressing the stamp on the envelop and tearing it from the sheet of stamps.

102. A stamp affixing mechanism comprising a clamp consisting of a yielding platen and a movable plunger, means for guiding an envelop and sheet of stamps between the platen and plunger including an apertured die plate lying between the envelop and stamps, means for projecting the plunger to clamp a stamp against the envelop between the platen and plunger and through the aperture in the die plate, and means for clamping the surrounding stamps against the die plate when the plunger is projected, to permit the movement of the plunger to tear the opposing stamp from the sheet and affix it to the envelop.

103. A stamp affixing mechanism comprising a clamp, a die plate provided with an aperture through which the clamp is movable, means for feeding an envelop and sheet of stamps into the clamp on opposite sides of said die plate, means for clamping the sheet of stamps to the die plate around the aperture, and means for closing the clamp upon the envelop and stamp and moving it bodily within the aperture to tear the inclosed stamp from the sheet and affix it to the envelop.

104. The combination with a stamp affixing clamp, means for feeding envelops into the clamp, a stamp carriage, means for moving the carriage past the stamp affixing clamp step by step and for returning it step by step, means for advancing a sheet of stamps on the carriage at each end of its path of movement to present the succeeding row of stamps to the action of the clamp, and means for closing the clamp and moving it bodily to tear the inclosed stamp from the sheet and affix it to the envelop.

105. The combination with a stamp affixing clamp, of a carrier mechanism for moving the envelops one by one into the clamp, a stamp carriage, means for moving the carriage past the clamp step by step with each movement thereof and for returning it step by step, means for advancing the sheet of stamps on the carrier at each end of its path of movement, means for holding fast the sheet of stamps around the clamp, and means for closing the clamp and moving it bodily to tear the inclosed stamp from the sheet and affix it to the envelop.

In testimony that I claim the foregoing as my invention I affix my signature in presence of two subscribing witnesses, this 24th day of April A. D. 1899.

LOUIS J. HALL.

Witnesses:
HENRY W. CARTER,
ALBERT H. GRAVES.